US008788341B1

(12) United States Patent
Patel et al.

(10) Patent No.: US 8,788,341 B1
(45) Date of Patent: Jul. 22, 2014

(54) VENDING MACHINE SYSTEMS USING STANDARD INVENTORY CONTROL SYSTEM COMPONENTS

(75) Inventors: Paresh K. Patel, Portland, OR (US); Glenn D. Butler, Holliston, MA (US)

(73) Assignee: VendScreen, Inc., Portland, OR (US)

( * ) Notice: Subject to any disclaimer, the term of this patent is extended or adjusted under 35 U.S.C. 154(b) by 23 days.

(21) Appl. No.: 13/351,222

(22) Filed: Jan. 16, 2012

Related U.S. Application Data

(63) Continuation-in-part of application No. 12/768,726, filed on Apr. 27, 2010.

(60) Provisional application No. 61/529,225, filed on Aug. 30, 2011.

(51) Int. Cl.

*G06Q 30/00* (2012.01)
*G06F 15/16* (2006.01)
*G06F 17/00* (2006.01)

(52) U.S. Cl.

USPC ........ 705/14.53; 709/217; 700/231; 700/232; 700/236; 700/237

(58) Field of Classification Search

USPC ........ 705/14.53; 709/217; 700/232, 236, 237, 700/231

See application file for complete search history.

(56) References Cited

U.S. PATENT DOCUMENTS 4,611,205 A 9/1986 Eglise
5,442,568 A 8/1995 Ostendorf et al.
5,844,808 A 12/1998 Konsmo et al.
5,924,081 A 7/1999 Ostendorf et al.
6,059,142 A 5/2000 Wittern, Jr. et al.
6,230,150 B1 5/2001 Walker et al.
6,298,972 B1 10/2001 Tedesco et al.
6,321,985 B1 11/2001 Kolls
6,324,520 B1 11/2001 Walker et al.
6,397,193 B1 5/2002 Walker et al.
6,457,038 B1 9/2002 Defosse
6,462,644 B1 10/2002 Howell et al.
6,505,095 B1 1/2003 Kolls
6,604,085 B1 8/2003 Kolls
6,609,102 B2 8/2003 Kolls
6,615,183 B1 9/2003 Kolls
6,658,323 B2 12/2003 Tedesco et al.

(Continued)

OTHER PUBLICATIONS

Michael L. Kasavana, "V-Commerce: Understanding Vending Machine Technology," Hospitality Net, www.hospitalitynet.com, Apr. 19, 2002, 7 pages.

(Continued)

*Primary Examiner* — Sun Li
(74) *Attorney, Agent, or Firm* — Smith Moore Leatherwood LLP

(57) ABSTRACT

A vending machine system includes at least one vending machine having a central coordinating unit, at least one management technology, and at least one communication technology facilitating communication between the at least one vending machine and the at least one management technology. Optional features that may be used alone or in combination with the vending machine system include: the ability to provide users with a promotional discount; the ability to provide users with multilevel pricing; the ability to track, time stamp, and keep records of activity at the at least one vending machine; a unique user interface; the ability to allow a user to report vending machine problems from a "report problem screen" on a unique user interface; unique vending machine-to-server communications; and the ability to remotely issue a refund to the user.

20 Claims, 22 Drawing Sheets

(56) References Cited

U.S. PATENT DOCUMENTS

| | | | |
|---|---|---|---|
| 6,732,014 | B2 | 5/2004 | Whitten et al. |
| 6,807,532 | B1 | 10/2004 | Kolls |
| 6,839,610 | B2 | 1/2005 | Carstens et al. |
| 6,844,813 | B2 | 1/2005 | Hardman |
| 6,854,642 | B2 | 2/2005 | Metcalf et al. |
| 7,013,337 | B2 | 3/2006 | Defosse et al. |
| 7,020,680 | B2 | 3/2006 | Defosse |
| 7,085,556 | B2 | 8/2006 | Offer |
| 7,110,954 | B2 | 9/2006 | Yung et al. |
| D531,626 | S | 11/2006 | Agrawal et al. |
| 7,131,575 | B1 | 11/2006 | Kolls |
| 7,139,616 | B2 | 11/2006 | May et al. |
| 7,164,884 | B2 | 1/2007 | Defosse et al. |
| 7,167,892 | B2 | 1/2007 | Defosse et al. |
| 7,233,912 | B2 | 6/2007 | Walker et al. |
| 7,286,901 | B2 | 10/2007 | Whitten et al. |
| 7,325,728 | B2 | 2/2008 | Arora et al. |
| 7,347,364 | B2 | 3/2008 | Walker et al. |
| 7,353,080 | B2 | 4/2008 | Walker et al. |
| 7,385,504 | B2 | 6/2008 | Agrawal et al. |
| 7,451,892 | B2 | 11/2008 | Walker et al. |
| 7,464,867 | B1 | 12/2008 | Kolls |
| 7,490,054 | B2 | 2/2009 | Reade et al. |
| 7,499,769 | B2 | 3/2009 | Walker et al. |
| 7,546,277 | B1 | 6/2009 | Tedesco et al. |
| 7,577,496 | B2 | 8/2009 | Walker et al. |
| 7,587,333 | B1 | 9/2009 | Walker et al. |
| 7,587,334 | B2 | 9/2009 | Walker et al. |
| 7,627,496 | B2 | 12/2009 | Walker et al. |
| 7,627,498 | B1 | 12/2009 | Walker et al. |
| 7,630,939 | B1 | 12/2009 | Kolls |
| 7,643,902 | B2 | 1/2010 | Tedesco et al. |
| 7,711,658 | B2 | 5/2010 | Tedesco et al. |
| 7,739,181 | B2 | 6/2010 | Breitenbach et al. |
| 7,783,381 | B2 | 8/2010 | Walker et al. |
| 7,783,508 | B2 | 8/2010 | Murray et al. |
| 7,784,643 | B1 | 8/2010 | Levine |
| 7,805,338 | B2 | 9/2010 | Kolls |
| 7,885,726 | B2 | 2/2011 | Walker et al. |
| 7,997,484 | B2 | 8/2011 | Godwin et al. |
| 2002/0107610 | A1 | 8/2002 | Kaehler et al. |
| 2003/0101262 | A1 | 5/2003 | Godwin |
| 2004/0249711 | A1 * | 12/2004 | Walker et al. .................. 705/14 |
| 2005/0131577 | A1 | 6/2005 | Ota et al. |
| 2005/0278065 | A1 | 12/2005 | Garza |
| 2006/0074777 | A1 | 4/2006 | Anderson |
| 2006/0219517 | A1 | 10/2006 | Cheng et al. |
| 2009/0157220 | A1 | 6/2009 | Walker et al. |
| 2009/0303982 | A1 | 12/2009 | Blachman et al. |
| 2010/0268792 | A1 | 10/2010 | Butler et al. |

OTHER PUBLICATIONS

Glenn Butler, “DEX: What it is, how you can use it, and why it will change our industry,” Automatic Merchandiser Magazine, www.vendingmarketwatch.com, Sep. 2004, 9 pages.
“MEI EASITRAX remote data port: Maximum Flexibility for Your Vending Machine,” MEI Corporate Headquarters, www.meigroup.com, Jun. 2007, 2 pages.
Gene Ostendorf, “Automatic Merchandiser: DEX and MDB: A Primer for Vendors,” Cygnus Business Media, Feb. 7, 2008, 4 pages.
“The Mind: Nutritional Information Touch Screen,” Vendors Exchange International, Incorporated, www.veii.com, 2008, 4 pages.
“Electronic Technologies Evolve, Working Together to Improve Efficiencies,” Automatic Merchandiser Magazine, www.vendingmarketwatch.com, Apr. 2, 2009, 9 pages.
“Tell Me About Intelligent Vending,” MEI Corporation, www.easitrax.com, viewed on Apr. 23, 2010, 1 page.
“Seed,” Cantaloupe Systems, www.cantaloupesys.com, viewed on Apr. 23, 2010, 1 page.
Intel Corporation, “Generating More Vending Machine Revenue”, pp. 1-4, 2011, USA.

* cited by examiner

| Screen example | Scr_size | Scr_dpi | Product thumbnail Image dimensions | Ad Image dimensions | "Touch to Start" bar height |
|---|---|---|---|---|---|
| **4.3" 272 x 480** | Normal | ldpi | 48 x 80 | 272 x 432 | 48 |
| - | Normal | mdpi | 48 x 80 | 272 x 432 | 48 |
| 4.3" 480 x 800 | Normal | hdpi | 84 x 140 | 480 x 720 | 80 |
| 7" 480 x 800 | Large | ldpi | 84 x 140 | 480 x 720 | 80 |
| - | Large | mdpi | 84 x 140 | 480 x 720 | 80 |
| - | Large | hdpi | 84 x 140 | 480 x 720 | 80 |

FIG. 19

VENDING MACHINE SYSTEMS USING STANDARD INVENTORY CONTROL SYSTEM COMPONENTS

The present application is an application claiming the benefit of U.S. Provisional Patent Application Ser. No. 61/529,225, filed Aug. 30, 2011, and a continuation-in-part of U.S. patent application Ser. No. 12/768,726, filed Apr. 27, 2010. The present application is based on and claims priority from these applications, the disclosures of which are hereby expressly incorporated herein by reference.

BACKGROUND OF INVENTION

Described herein are vending machine systems and, more specifically, vending machine systems that use standard inventory control system components.

Vending machines (or "automatic retailing" machines), in the broadest sense, have been around for thousands of years. The first simple mechanical coin operated vending machines were introduced in the 1880s. Modern vending machines stock many different types of products including, but not limited to drinks (e.g. water, juice, coffee, and soda) and edible food products (e.g. snacks, candy, fruit, and frozen meals). Typically, a user will look at the front face of the vending machine to determine which product he would like. From the front face the user may be able to see names of the products, logos indicating the products, pictures of the products, and/or products themselves (e.g. if the front face is typically glass so the contents of the vending machine can be seen). Once the user has determined which product he would like, he inserts payment (e.g. coins, bills, or payment cards). He then inputs his selection into the vending machine using a user interface such as a series of buttons, a key pad, touchscreen, or other input mechanism using, for example, the column ID at which the desired product is located. The column ID may be a number indicating a row and a letter indicating the left to right position within the row. So the top left column ID might be A1. Based on the user's inputted column ID, technology within the vending machine provides the desired product to the user. The term "vending machine" is meant to be inclusive and to include all types of vending machines, not only those shown and discussed herein.

In this fast paced world, vending machines are ubiquitous. For example, an office building or hotel (referred to generally as a "field site") having twenty floors might have one or more rooms for vending machines (either a dedicated room or a kitchen or lunchroom) on every floor. And in each room there is, on average, three to five vending machines. The location of each vending machine is referred to as a "machine site." Each vending machine route merchandiser (or "merchandiser") might service a hundred such field sites on a route, each field site having anywhere from one machine site to hundreds of machine sites. Merchandisers obtain inventory or products to stock the vending machines from a warehouse or distribution center that stocks many different types of products. A "vending service company" might service many routes from many warehouses or distribution centers. The location from which the vending service company manages its vending machine network is referred to as a "management site" that may be located at a warehouse or distribution center or it may be located in a separate or remote location.

To manage such a vending machine network, modern vending service companies have taken advantage of technological progress in the vending machines themselves. Inventory control systems have become common. These inventory control systems include components such as vending machines having processing units, vending machine audit technology, and management technology. These inventory control systems also use management programs and communication programs. Many companies (including COKE®, PEPSI®, CRANE®, MEI®, and others) have participated in the NAMA VDI standards to allow audit technologies to share vending sales and usage data with management systems according to the industry standard VDI protocols.

Many vending machines have processing units built into (or retrofitted into) them. These processing units can be accessed both to provide vending machine related data and to obtain vending machine related data. Typical "vending machine related data" (also referred to as "vending machine data") includes, for example, information about the funds (bills, coins, and cashless) received by the machine and the products stocked in and/or sold by the machine (e.g. the products and prices in the vending machine). Common or standard (industry standard) "vending machine protocols" used for communicating with vending machines in order to exchange the vending machine data include, for example, DEX/UCS, MDB, and DDCMP. These industry standard vending machine protocols have definitions that are readily available and not replicated herein.

To communicate with the vending machines' processing units, merchandisers use "vending machine audit technology" that is usually portable and/or handheld to obtain the vending machine data. Further, the audit technology is synchronized with "management technology" that is located at the management site so that the vending machine data from the vending machine can be used for management purposes at the management site. Exemplary audit technology is described in U.S. Patent Publication No. 2009/0303982 to Blachman et al. (the "Blachman reference"), U.S. Patent Publication No. 2006/0074777 to Anderson (the "Anderson reference"), and other references disclosed herein, all of which are hereby specifically incorporated by reference.

"Management programs" use the vending machine data in a variety of ways including, but not limited to cash management, inventory management (tracking or predicting), and/or remote management. "Communication programs" allow communications between the vending machines, the audit technology, and/or management technology at the management site. The communication programs use the vending machine protocols to assist in the exchange of the vending machine data.

In recent years, many improvements to modern vending machines have been suggested. Many of the innovations relate to means for communicating with the vending machine. Some of these communication innovations are detailed in U.S. Pat. No. 7,085,556 to Offer (the "Offer reference"), U.S. Pat. No. 6,462,644 to Howell et al. (the "Howell reference"), and U.S. Pat. No. 5,844,808 to Konsmo et al. (the "Konsmo reference"). These references are herein incorporated by reference.

The Offer reference is directed to a vending machine that is designed to communicate with a cellular phone. A user of the vending machine disclosed in the Offer reference would use his cellular phone to provide a signal that, when received by the vending machine, would cause the dispensing of a product.

The Howell reference is directed to networking technologies (including wireless technologies) that allow multiple vending machines to be networked together so that information from the vending machines can be used in the building of a database that can be made available to bottlers interested in individual vending machine routing needs and profitability.

The Konsmo reference is directed to two-way communications with networked remote vending machines. The Konsmo reference describes vending machines having sensors that detect the occurrence of specified events such as sales of goods, unauthorized entry into the vending machine, and notification of low inventory stock.

Users of traditional vending machines are unable to see product nutritional (including ingredient) information prior to purchase. The product is enclosed in the vending machine so users do not have access to the nutritional information from the product package. Even if the vending machine displays the product itself (e.g. through a glass face, glass window, or glass door), the users cannot touch the package nor see the backside of the package that usually provides the "nutrition facts label" (the nutritional information) as mandated by law.

Posting comprehensive nutritional information adjacent to the machine for products is impractical. While a typical vending machine merchandises about forty different products, there can be at any given time hundreds or thousands of potential products that a merchandiser could stock in the vending machine. Moreover, the list of available products is fluid and constantly changing so a static list would become out-of-date in short order. Moreover, from a user's perspective, finding the nutritional information in a list adjacent to the machine would be time consuming and inconvenient if hundreds or thousands of products were listed.

References such as U.S. Pat. No. 7,299,576 to Martin et al. (the "Martin reference"), U.S. Patent Publication No. 2005/0278065 to Garza (the "Garza reference"), and U.S. Pat. No. 7,490,054 to Reade et al. (the "Reade reference") disclose new types of displays for vending machines. These references are herein incorporated by reference.

The Martin reference is directed to a vending machine display and apparatus. The Martin reference teaches a display that is associated with user-manipulated control and/or with a product in the vending machine dispensed by operation of the user-manipulatable control. In some embodiments, the display is responsive to the controller by changing graphics and/or text displayed by the display.

The Garza reference is directed to remote posting of nutritional information. More specifically, the Garza reference relates to a vending machine equipped with a remote nutrition informing system in which nutritional information is displayed separate from the food or beverage product or its packaging; thereby making information available to consumers that otherwise would not have been available prior to purchase. The Garza reference also discloses that the nutrition informational display provides at least one category identifier representative of a dietary category of food along with a corresponding brief description and at least one food product that has a label associated to it, the label displaying all category identifiers that are represented in the at least one food product.

The Reade reference is directed to an RFID system and method for vending machine control. The Reade method and system seeks to aid consumers in making informed decisions prior to purchasing products from a vending. The Reade reference further discloses that product information may be visually displayed on a visual display screen.

Improvements have also been made to vending machine displays and user interfaces. For example, U.S. Pat. No. 7,784,643 to Levine (the "Levine reference") discloses a vending machine messaging system using a vending machine having a window, a display unit attached to an interior surface of the window, and a server in communication with the display unit via a communications network. The server communicates various messages to be displayed by the display unit such as advertisements, stock quotes, news, weather, nutritional content of the merchandise and the like. In addition, a coupon code, redemption offer or other type of code may be displayed in conjunction with a particular message along with a website address for a consumer to login into. When the consumer logs into the website to redeem their code, they provide the code to the website that then provides a coupon for the consumer to print out that may be used for a discount, a free product, or other benefit for the consumer.

Improvements have also been made to allow vending machines to provide some types of discounts. U.S. Pat. No. 6,397,193 to Walker et al. (the "Walker '193 reference"), for example, discloses a method and apparatus for automatically delivering a combination of products from a vending machine at a package price. U.S. Pat. No. 7,885,726 to Walker et al. (the "Walker '726 reference") discloses systems and methods for delivering products-on-demand to individuals and, more particularly, to delivery via vending machines in which a customer who makes an initial product selection may be presented with an alternate product offer including a discount. U.S. Pat. No. 7,711,658 to Tedesco et al. (the "Tedesco reference") discloses a method and apparatus for automatically managing a price of a product in a vending machine by implementing dynamic price adjustments at various times including after stocking, after a sale of a product, and at periodic intervals.

Still additional improvements have been made to allow vending machines to communicate with cellular phone technology. U.S. Pat. No. 6,844,813 to Hardman (the "Hardman reference"), for example, discloses a vending machine is equipped with a short range communication circuit for uploading vending machine data to passing mobile terminals. In exchange for this facilitation and the use of the mobile terminals, the users may receive a credit/value that may be implemented as a coupon for goods sold in the vending machine or an electronic discount on purchases made from the vending machine.

BRIEF SUMMARY OF THE INVENTION

Described herein are vending machine systems and, more specifically, vending machine systems that use standard inventory control system components. Described herein is a vending machine nutritional information display system and, more specifically, a vending machine nutritional information display system using standard inventory control system components.

Described herein is a method for using a vending machine nutritional information display system using standard inventory control system components including at least one vending machine and at least one management technology. The method includes the steps of transmitting vending machine data from the vending machine to the management technology using standard vending machine protocol, the vending machine data including inventory data; receiving the vending machine data from the vending machine at the management technology; merging the vending machine data with nutrition data from a nutrition facts data server based on the inventory data to obtain merged data; transmitting the merged data from the management technology to the vending machine using standard vending machine protocol; receiving the merged data from the management at the vending machine; and displaying nutrition data on a display of the vending machine based on user selection of products. Audit technology and/or communication technology may be used as an intermediary in the transmission of data.

Also described herein is a vending machine nutritional information display system using standard inventory control system components including at least one vending machine. The system includes a management program for receiving vending machine data from the at least one vending machine using standard vending machine protocol, the vending machine data including inventory data. The system also includes a nutrition facts data server including nutrition data for products listed in the inventory data. The management program merges the vending machine data with the nutrition data based on the inventory data to obtain merged data. The management program then transmits the merged data to the at least one vending machine for display of the nutrition data based on user selection of products. Audit technology and/or communication technology may be used as an intermediary for transmission performed between the management program and the vending machine.

Further, described herein is an apparatus for implementing a vending machine nutritional information display system using standard inventory control system components including at least one vending machine. The apparatus includes at least one communication program associated with the vending machine for controlling at least one communication interface technology associated with the vending machine. The apparatus also includes at least one management subprogram associated with the vending machine for controlling at least one processing unit associated with the vending machine. The at least one management subprogram and the at least one communication program use standard vending machine protocol for transmission of vending machine data including inventory data and receipt of merged data including nutrition data for products listed in the inventory data, the merged data being stored in at least one memory. At least one display associated with the vending machine displays nutrition data in response to user selection of product. The apparatus may further include a stand-alone device that includes the at least one management subprogram, the at least one communication program, and the at least one communication interface technology.

Described herein is an exemplary vending machine system that provides users with a promotional discount and a method for using a vending machine to provide a promotional discount. Providing users with a promotional discount is a preferred optional feature that may be used alone or in combination with other features described herein.

Described herein is an exemplary vending machine system has the ability to track, time stamp, and keep records of activity at a vending machine. Tracking, time stamping, and record keeping may be kept on activities such as displaying advertising, displaying nutritional information, and offering promotions on specific products, on products from specific manufacturers, or on a combination of products purchased. Tracking, time stamping, and record keeping is a preferred optional feature that may be used alone or in combination with other features described herein.

Described herein is an exemplary vending machine system with a unique user interface and a method for using a unique vending machine user interface. The unique user interface is a preferred optional feature that may be used alone or in combination with other features described herein.

Described herein is an exemplary vending machine system with the ability to allow a user to report vending machine problems from a "report problem screen" on a unique user interface. The ability to allow a user to report vending machine problems from the vending machine output technology is a preferred optional feature that may be used alone or in combination with other features described herein.

Described herein is an exemplary vending machine system with unique vending machine-to-server communications and an apparatus for implementing unique vending machine-to-server communications. The vending machine-to-server communications is a preferred optional feature that may be used alone or in combination with other features described herein.

Described herein is a vending machine having the ability to remotely issue a refund to the user and a method for remotely issuing a refund at a vending machine. The ability to remotely issue a refund to the user is a preferred optional feature that may be used alone or in combination with other features described herein.

Described herein is a vending machine system using standard inventory control system components, the system including: vending machine has an associated central coordinating unit, an associated machine controller, and an associated user interface. The user interface has input technology and output technology. The central coordinating unit is associated with and in communication with the associated machine controller. The central coordinating unit is associated with and in communication with the associated user interface. The management technology has a controlling server. The communication technology facilitates communication between the vending machine and the management technology.

The vending machine system described above may further include the central coordinating unit for displaying a promotional discount for product on the output technology of the user interface; the central coordinating unit for receiving a response pertaining to the promotional discount on the input technology of the user interface; and the central coordinating unit for applying the promotional discount if the response is acceptance of the promotional discount and an associated product is purchased.

The vending machine system described above may further include a promotion server associated with the management technology, the promotion server providing a promotional discount for product to the central coordinating unit; the central coordinating unit for displaying the promotional discount on the output technology of the user interface; the central coordinating unit for receiving a response pertaining to the promotional discount on the input technology of the user interface; the central coordinating unit for applying the promotional discount if the response is acceptance of the promotional discount and an associated product is purchased; the machine controller for controlling the release of the purchased product; and a settlement server associated with the management technology, the central coordinating unit for communicating settlement redemption data pertaining to application of the promotional discount to the settlement server.

The vending machine system described above may further include the output technology of the user interface for displaying a non-discounted price, a discounted price reflecting a passive promotional discount, and a required specified action; the passive promotional discount automatically receivable by a user and applied by the central coordinating unit upon the central coordinating unit receiving a signal confirming performance of the required specified action; and the central coordinating unit for applying the passive promotional discount and facilitating release of a product associated with the passive promotional discount upon receiving a signal confirming the purchase of the product.

The vending machine system described above may further include the output technology of the user interface for displaying a non-discounted price, a discounted price reflecting a active promotional discount, and a required specified action; the active promotional discount receivable by a user and applied by the central coordinating unit upon the central coordinating unit receiving a signal confirming a request for the active promotional discount and upon the central coordinating unit receiving a signal confirming performance of the required specified action; and the central coordinating unit for applying the active promotional discount and facilitating release of a product associated with the active promotional discount upon receiving a signal confirming the purchase of the product.

The vending machine system described above may further include a promotion server associated with the management technology, the promotion server providing to the central coordinating unit a promotional discount for product and a required specified action; the central coordinating unit for displaying on the output technology of the user interface a non-discounted price, a discounted price reflecting the promotional discount, and the required specified action. The promotional discount is selected from the group consisting of: a passive discount automatically receivable by a user upon the central coordinating unit receiving a signal confirming performance of the required specified action; and (ii) an active discount receivable by a user upon the central coordinating unit receiving a signal confirming a request for the active discount and a signal confirming performance of the required specified action. The central coordinating unit applies the promotional discount and confirms the purchase of a product associated with the promotional discount. The machine controller controls the release of the purchased product upon receipt of a release signal. The settlement server associated with the management technology, the central coordinating unit for communicates the settlement redemption data pertaining to application of the promotional discount to the settlement server.

The vending machine system described above may further include the central coordinating unit for performing activity selected from the group consisting of: (i) displaying advertisement on the output technology of the user interface; (ii) displaying nutritional information on the output technology of the user interface; and (iii) displaying offer of a promotional discount on the output technology of the user interface. The central coordinating unit may then be used for time stamping the activities; tracking the activities; and keeping records of the activities.

The vending machine system described above may further include the central coordinating unit for displaying a "report problem screen" that may be used to report problems with the vending machine on the output technology of the user interface; the central coordinating unit for receiving a reported problem on the input technology of the user interface; and the central coordinating unit for reporting the reported problem to the management technology via the communication technology.

The vending machine system described above may further include the management technology being accessible by an operator; and the management technology contacting the central coordinating unit via the communication technology and authorizing a refund at the vending machine.

The vending machine system may be used in methods to implement their intended purpose as described herein.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, that are incorporated in and constitute a part of this specification, illustrate various exemplary vending machine nutritional information display systems and components thereof.

FIG. 19 is a table showing exemplary display screen resizing data.

DETAILED DESCRIPTION OF THE INVENTION

Described herein are vending machine systems and, more specifically, vending machine systems that use standard inventory control system components. One specific vending machine system is a vending machine nutritional information display system.

Figure 6:
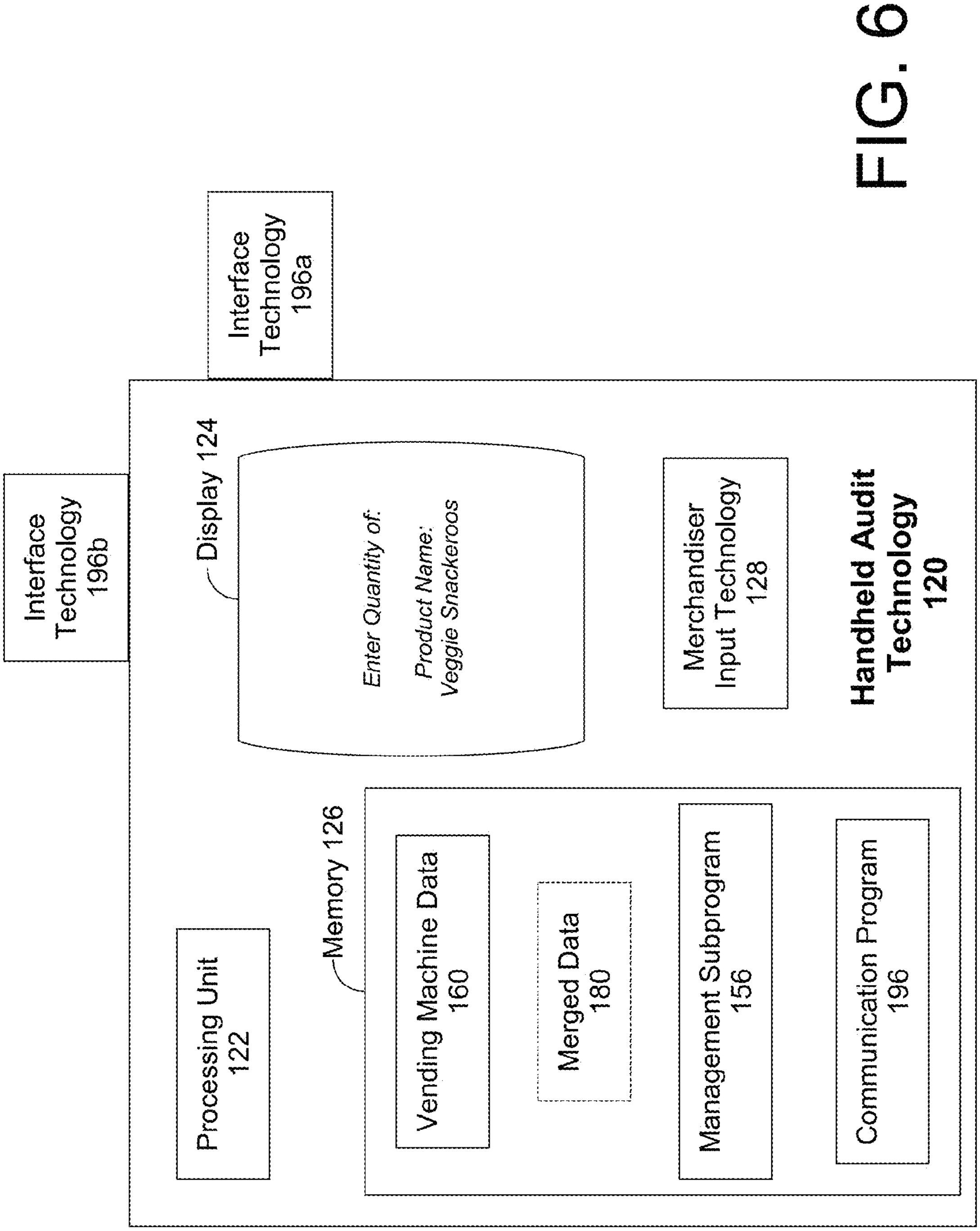
FIG. 6 is a simplified schematic diagram of an exemplary handheld audit technology that is usually portable and/or handheld.
Figure 7:
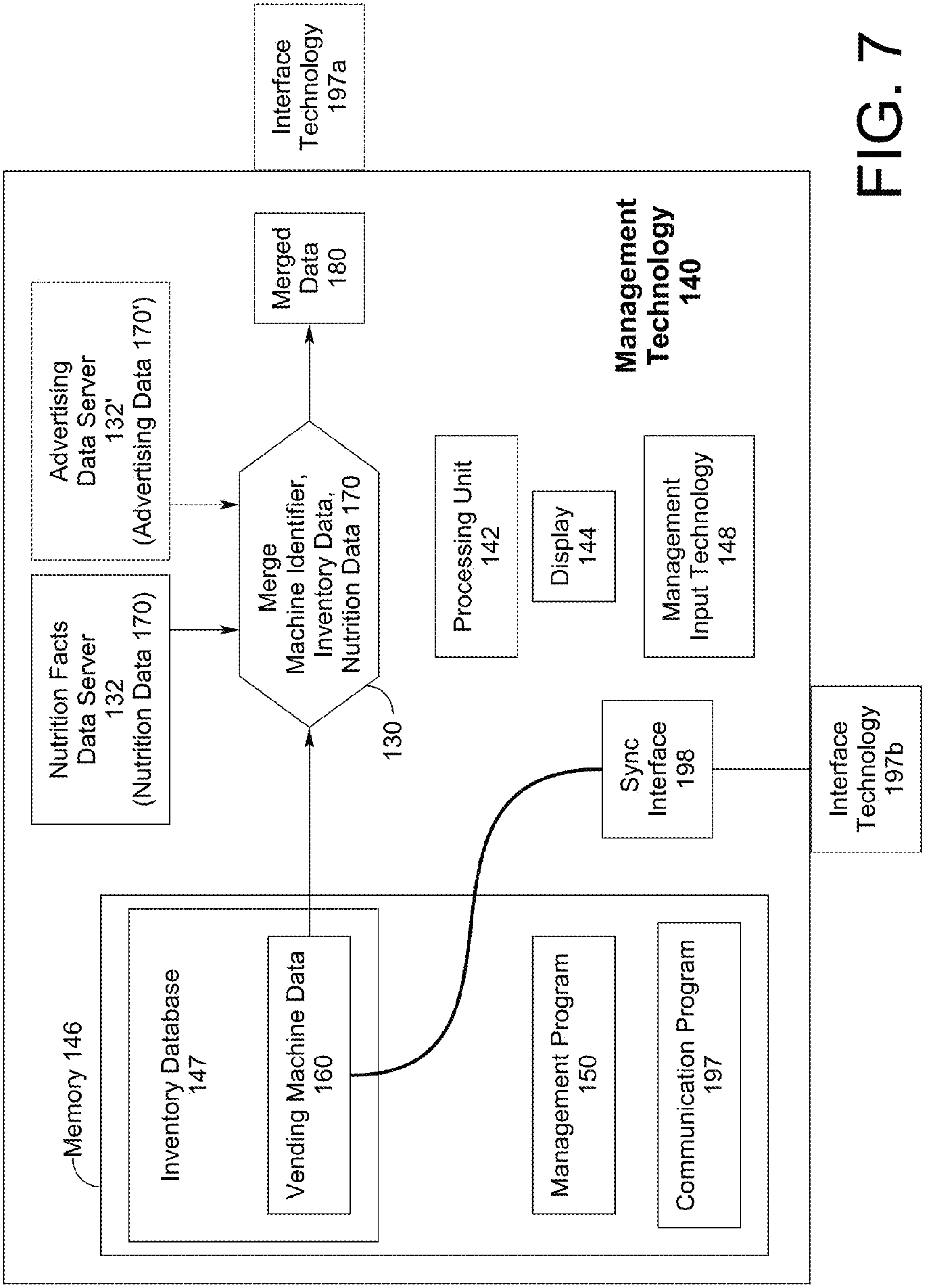
FIG. 7 is a simplified schematic diagram of management technology.

As shown in FIGS. 1-4, a vending machine nutritional information display system includes at least one vending machine 100 (FIG. 5), at least one audit technology 120 (FIG. 6), and management technology 140 (FIG. 7). The vending machine nutritional information display system uses standard inventory control system components such as vending machines, vending machine audit technology, and management technology as well as common or standard vending machine protocols. The vending machine nutritional information display system includes a method and apparatus by which nutritional information for products stocked within a vending machine 100 is displayed on a vending machine display 104. A management program 150 merges vending machine data 160 from the vending machine 100 with nutritional information (nutrition data 170) and transmits the merged data 180 (including the nutrition data 170) using communication technology 190 (and associated communication interface technology and communication programs) to the vending machine 100 for display to the user.

Before describing the vending machine nutritional information display system and components and features thereof, some of the terminology should be clarified. Please note that the terms and phrases may have additional definitions and/or examples throughout the specification. Where otherwise not specifically defined, words, phrases, and acronyms are given their ordinary meaning in the art. Exemplary components and features of the vending machine nutritional information display system may be better understood with reference to the drawings.

- The term "system" is used to describe the combination of the components and the interaction of the components. The components of the systems described herein include, for example, at least one vending machine, at least one audit technology, at least one management technology, and/or at least one communication technology. Components of the systems described herein may be standard components, modified components, or custom components. The interaction of the components may be implemented as methods, the steps of which may be controlled by programs.
- The terms "processing unit," "server" (computer, computer program, or other technology known or yet to be discovered/developed that manages access to a centralized resource or service in a network), "controller," "processor," and "computer" are defined as devices capable of executing instructions or steps and may be implemented as a programmable logic device or other type of programmable apparatus known or yet to be discovered/developed. The processing unit, server, controller, processor, and computer may have associated memory. Although shown as single units, it should be noted that the processing unit, server, controller, processor, and computer may be implemented as a plurality of separate processing units, servers, controllers, processors, and computers (sub-processing units, sub-servers, sub-controllers, sub-processors, and sub-computers). Similarly, multiple processing units, servers, controllers, processors, and computers may be combined. Although shown as single units, it should be noted that the processing units may be implemented as a plurality of separate processing units. Similarly, multiple processors may be combined. For example, the processing unit 142 may be a separate processor from the processing units (not shown) in the nutrition facts data server 132 and/or the advertising data server 132' or the functions of these processing units can be combined into a single processing unit. Another example is that the shown main server of the management technology 330 (e.g. the controlling server 340 of FIG. 9) may be a separate server from the promotion server 360 and/or the promotion settlement server 370 and/or the functions of these servers can be combined into a single server. The exemplary format of the shown processing units, servers, controllers, processors, and/or computers is meant to be exemplary and is not meant to limit the scope of the invention. These terms, therefore, should be considered interchangeable.
- The term "database" is defined to include any collection of data or information. Databases are typically stored in memory. Databases shown in the figures include memory on which the database is stored.
- The term "memory" is defined to include any type of computer (or other technology such as processing units, servers, controllers, and processors)-readable media (also referred to as technology- or machine-readable storage medium) including, but not limited to attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other storage media known or yet to be discovered/developed. Although shown as single/separate units (or databases), it should be noted that the memories may be implemented as a plurality of separate memories. Similarly, multiple memories (or databases) may be combined. For example, the management program 150 may be stored in a memory separate from the memory in which the communication program 197 is stored. Another example is that, the nutrition data 170 used by the nutrition facts data server 132 and/or the advertising data 170' used by the advertising data server 132' may be stored in distinct memories (not shown) accessible by the servers 130, 132', or the data may be stored in the shared memory 146 that would be made accessible by the servers 130, 132'. Another example is that the machine inventory database may be stored in a memory separate from the memory in which the promotions, ads, and/or nutrition information is stored. Yet another example is that the data pertaining to the machine inventory, promotions, ads, and/or nutrition information may be stored in a distinct memories (not shown) accessible by processing units, controllers, and/or servers. Alternatively, all the data may be stored in the shared memory would be made accessible by the processing units, controllers, and/or servers.
- It should be noted that the terms "programs" and "subprograms" are defined as a series of instructions that may be implemented as software (i.e. computer program instructions or computer-readable program code) that may be loaded onto a computer (or processing unit, server, controller, and/or processor) to produce a machine, such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. The shown programs and subprograms may be divided into multiple modules or may be combined.

The phrase "payment mechanism" include any means by which value may be transferred including, but not limited to cash, credit or debit cards (e.g. VISA®, MC®, AMERICAN EXPRESS®, DISCOVER®, and bank cards), or cashless payment technologies (e.g. PAY WAVE®, EXPRESS PAY®, PAY PASS®, PAYPAL®, and standards publicly made available by VISA®, MC®, AMERICAN EXPRESS®, DISCOVER®, and GOOGLE WALLET®), gift cards, coupons, and other payment mechanism means known or yet to be discovered/developed by which payment may be transferred from one party to another. Although discussed herein in terms of coins, cash, and credit, other payment mechanisms may be used both for payments and refunds.

The phrase "remote communication technology" includes, but is not limited to computers (including as broadly defined herein), smart phones, cell phones, personal digital assistants (PDAs), tablets, digital wallets, and any other known or yet to be discovered/developed devices that are able to remotely communicate with the vending machine 300 and/or the vending machine central coordinating unit 302.

The phrases "vending service company" or "vending machine operating company" describe entities (e.g. businesses or individuals). The vending service company may also be a vending machine operating company, or vice versa. Product manufacturers or other entities that perform stocking, monitoring, or accounting services related to vending machines are included in this definition.

Figure 1:
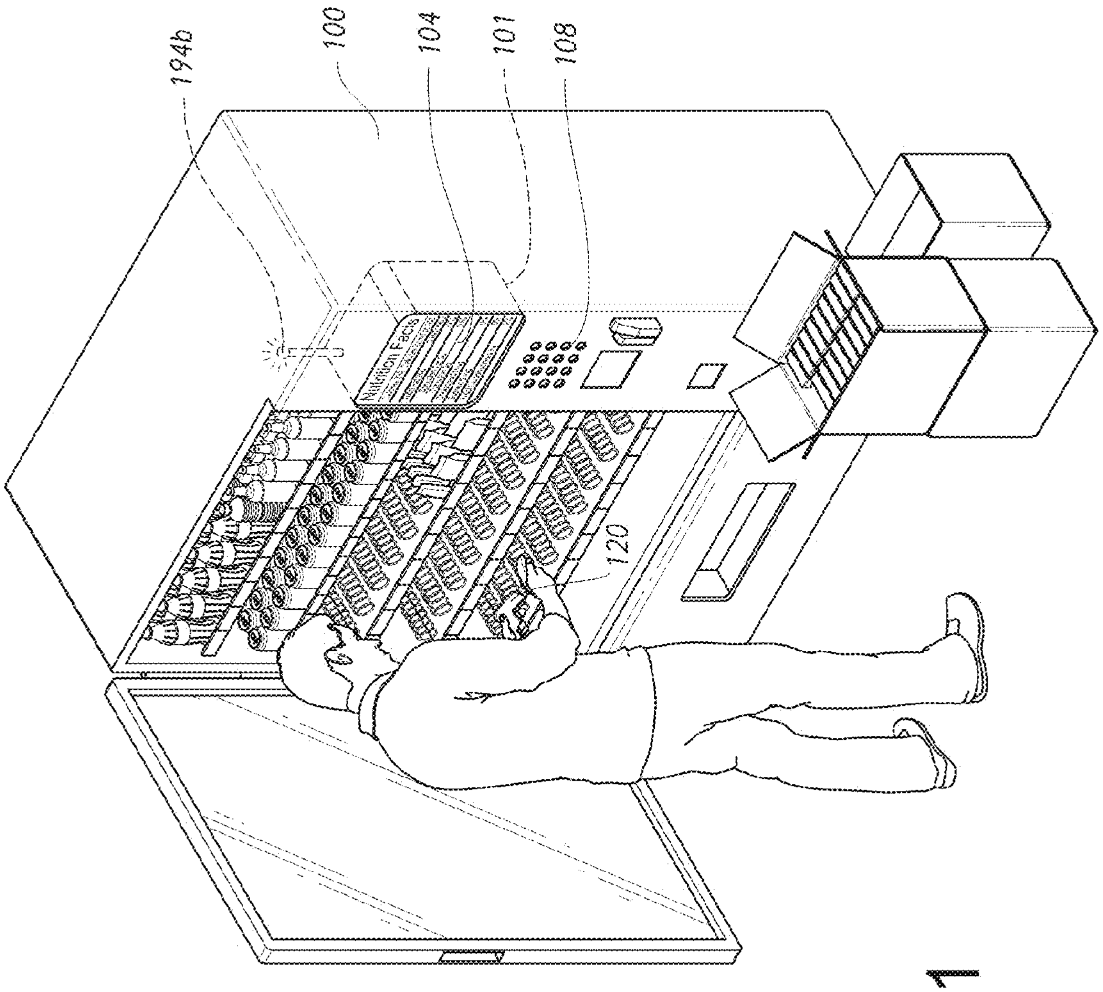
FIG. 1 is a front perspective view showing an exemplary vending machine with a display being audited by a merchandiser with a handheld audit technology, the vending machine and audit technology being vending machine nutritional information display system in which nutritional information about the products stocked in the vending machine is presented on the vending machine display.

FIG. 1 shows an exemplary vending machine 100 that is retrofitted with a stand-alone device 101 that includes, for this example, a processing unit (not shown), the display 104, memory (for storing, for example, merged data, a management subprogram, and a communication program, none of which are shown), and/or communication interface technology (shown as an antenna 194*b*). The user input technology 108 from the original vending machine 100 is used in this updated vending machine and is able to interface with the stand-alone device 101 communication interface technology (e.g. wired or wireless, none of which are shown here). The merchandiser is shown as using a handheld audit technology 120 to stock product in the vending machine 100 as he would stock product in a non-updated vending machine. For the merchandiser, the process of stocking the machine can be substantially or exactly the same. For the user who approaches the updated vending machine, however, the process can be very different if the user desires additional information that would not have been available using traditional vending machines. Rather than trying to guess the nutritional information of a favorite snack (or alternatives thereto), the user is able to select the product (using user input technology 108) and, in response to the selection, nutritional information related thereto is displayed on the display 104. The user may also be given the option to filter his search based on preferences (e.g. low calories, peanut allergies, vegetarian, maximum calories for energy, etc) using the user input technology 108 and the display 104. The display 104 may also display advertisements related to the selected product or similar products. In one scenario, the user might first select a high caloric chocolate bar and see the calorie information displayed on the nutritional information. Then the user might select the filter for low calories and be presented with several low calorie options on the display. The intelligent system described herein might surmise that the user would like a low calorie chocolate snack and display an advertisement next to the options of a low calorie carob bar that is also available in the vending machine. Information about the display of the advertisement and whether the user purchased the advertised product may be recorded and transmitted to the management technology for analysis.

Figure 2:
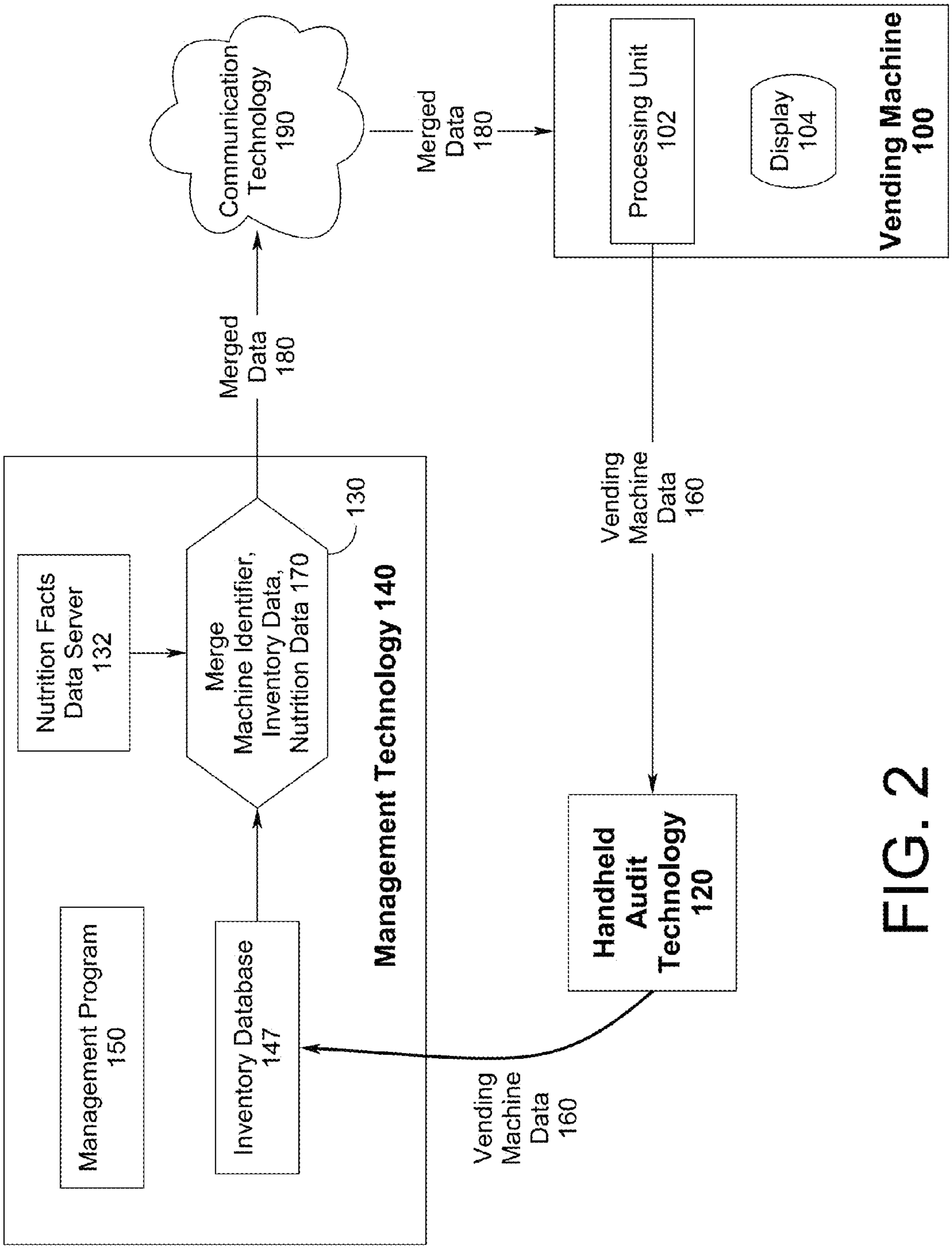
FIG. 2 is a simplified schematic diagram of a first preferred exemplary vending machine nutritional information display system.
Figure 3:
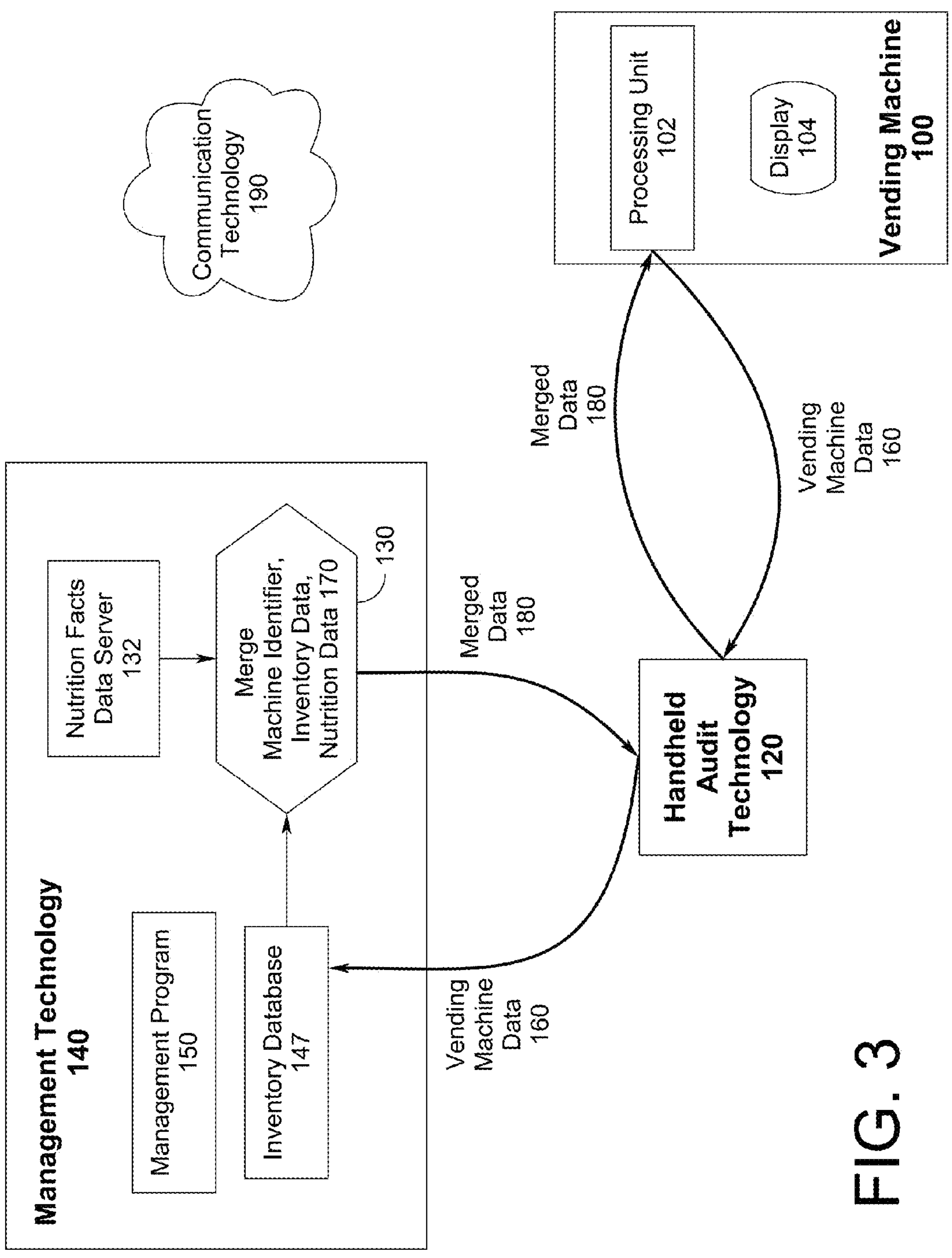
FIG. 3 is a simplified schematic diagram of a second preferred exemplary vending machine nutritional information display system.
Figure 4:
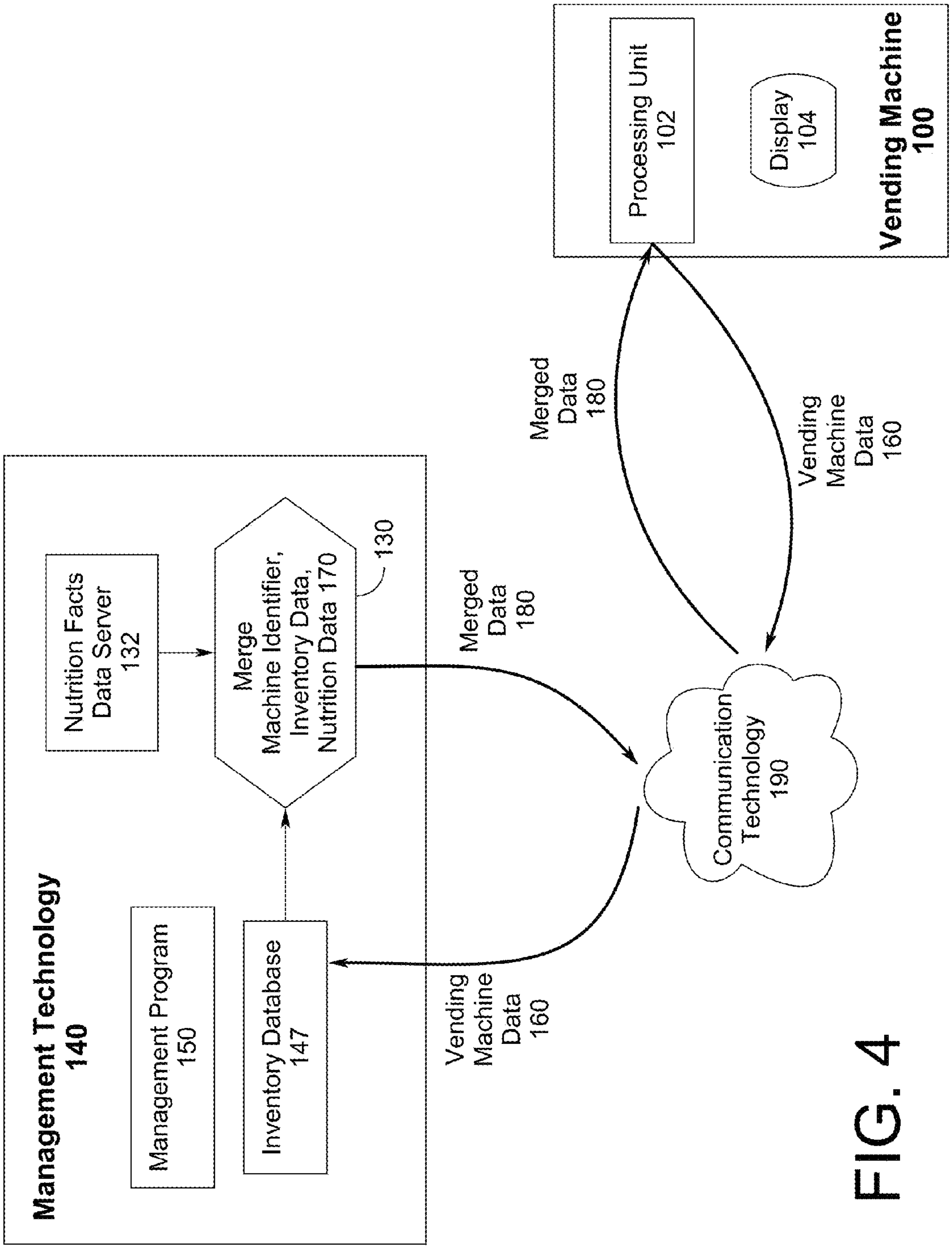
FIG. 4 is a simplified schematic diagram of a third preferred exemplary vending machine nutritional information display system.

FIGS. 2-4 show preferred exemplary vending machine nutritional information display systems. The first exemplary vending machine nutritional information display system shown in FIG. 2 shows vending machine data 160 flowing from the vending machine 100 to the audit technology 120 and then to the management technology 140 where it is merged to include nutrition data 170. The merged data 180 then flows through communication technology 190 (e.g. antennas, wireless networks, and/or the Internet) to the vending machine 100 where the nutrition data 170 can be displayed based on or in response to user selection of products. The second exemplary vending machine nutritional information display system shown in FIG. 3 shows vending machine data 160 flowing from the vending machine 100 to the audit technology 120 and then to the management technology 140 where it is merged to include nutrition data 170. The merged data 180 then flows through audit technology 120 to the vending machine 100 where the nutrition data 170 can be displayed based on or in response to user selection of products. The third exemplary vending machine nutritional information display system shown in FIG. 4 shows vending machine data 160 flowing from the vending machine 100 to the management technology 140 (via communication technology 190) where it is merged to include nutrition data 170. The merged data 180 then flows to the vending machine 100 (via communication technology 190) where the nutrition data 170 can be displayed based on or in response to user selection of products. This system eliminates the use of the audit technology.

It should be noted that for these exemplary systems, communication technology 190 (and associated communication interface technology and communication programs) includes all types of wired and wireless transfer of data between the components 100, 120, 140 (so FIG. 4 could be considered a wireless transfer of data between the vending machine 100 and the management technology 140).

Figure 5:
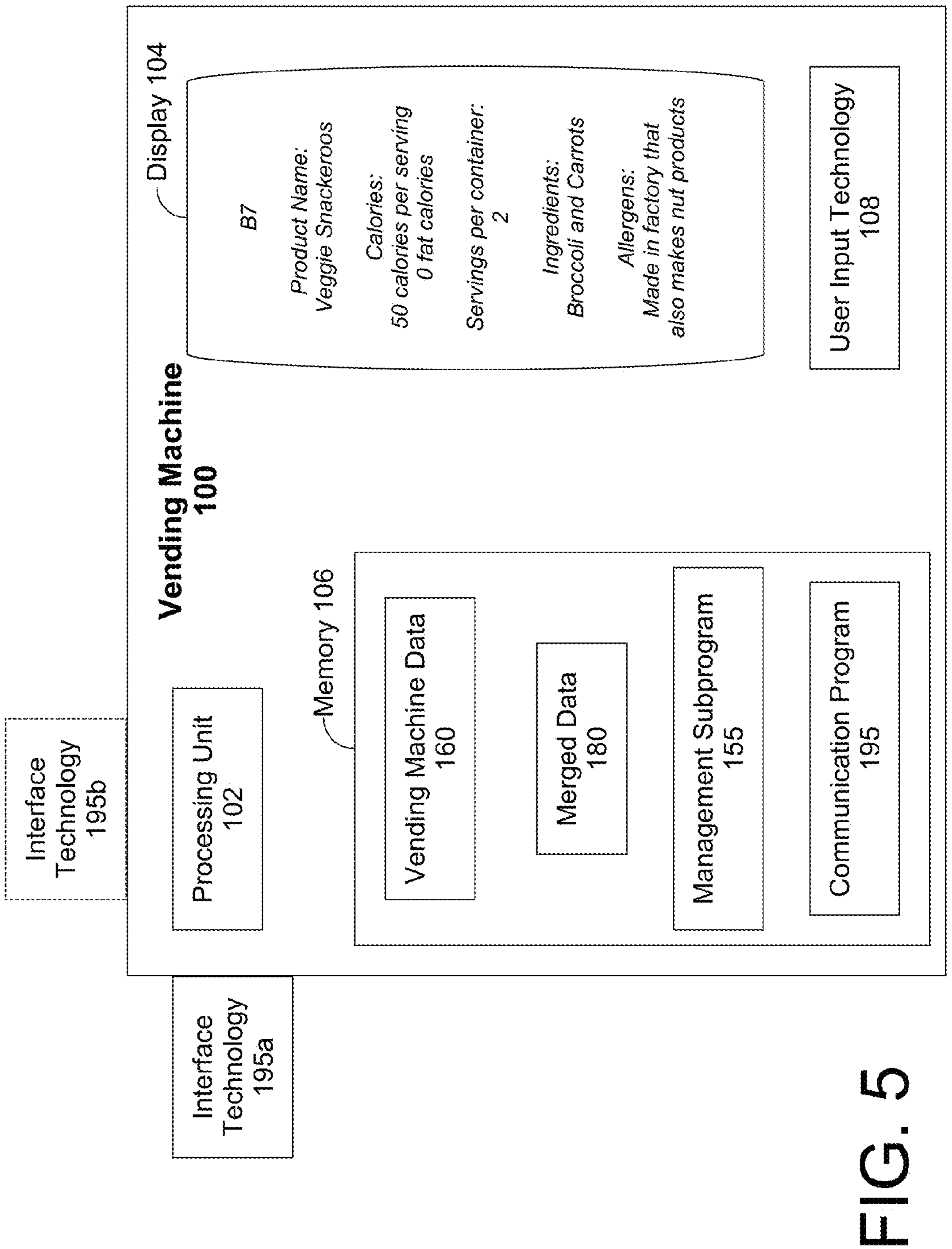
FIG. 5 is a simplified schematic diagram of a vending machine having a vending machine processing unit and a display.

Vending Machine 100 (FIG. 5)

A vending machine, as shown in FIG. 5, preferably has at least one associated processing unit 102, at least one associated display 104, at least one associated memory 106 (for storing, for example, vending machine data 160, merged data 180, at least one management subprogram 155, and/or at least one communication program 195), at least one associated user input technology 108, and/or at least one associated communication interface technology 195*a* and 195*b*. The processing unit 102, display 104, memory 106, user input technology 108, and/or communication interface technology 195*a* and 195*b* may be combined as a single package (e.g. all the components are sold as a stand-alone device 101 or "box"

that may be retrofitted into existing vending machines), may be separate components (e.g. each component is distinct so that if an original vending machine has almost all the necessary technology only the missing component(s) would need to be added), or may be a combination thereof (e.g. the display 104 could be a separate unit, but all the other components could be combined into a single package (stand-alone device 101), so that if a vending machine already had a suitable display, only the package of the other components would be needed). Although the system described herein could function with any vending machine for consumable products (e.g. food, drink, medicine), exemplary vending machines include the Crane National 167 Snack Machine and the Dixie Narco 5800 Beverage Machine.

The processing unit 102, in terms of the system described herein, is responsible for uploading and processing the vending machine data 160 and downloading and processing the merged data 180. The processing unit 102 (and the memory 106 therethrough) interacts with the audit technology 120 via communication interface technology 195*a* that is controlled or directed by communication program 195. The processing unit 102 (and the memory 106 therethrough) interacts with the management technology 140 via communication interface technology 195*b* that is controlled by communication program 195. (In the systems shown in FIGS. 3 and 4, there may be only one communication interface technology 195*a* because communications with the management technology 140 could take place via two-way communications with the audit technology 120 (FIG. 3) or via-two-way communications with the management technology 140 directly (FIG. 4).) The management subprogram 155, which is designed to interact with the management program 150, provides the instructions implemented by the processing unit 102. The management subprogram 155, for example, directs the specifics of the transfer and/or storage of data (e.g. what vending machine data 160 is transmitted from the vending machine 100 and/or where the merged data 180 received by the vending machine 100 is stored in memory 106). The processing unit 102 (as directed by the management subprogram 155) may also facilitate access to the nutritional information (received as nutrition data 170 in the merged data 180) such that, when a user selects a product using the user input technology 108, the processing unit 102 displays the nutritional information related thereto.

FIG. 1 and FIG. 5 show exemplary displays 104 that display nutritional information for products stocked within a vending machine 100. An additional preferred feature of the system described herein is that the display 104 may be able to display images of product packages (or a graphic image of the nutrition fact label on the product package), advertisements (e.g. logos, trademarks, and slogans of the products stocked in the vending machine 100), and/or "company" specific messages (e.g. messages about the service company or the company at which the vending machine is located). The display 104 would preferably be near the place where the user makes his selection (user input technology 108) and would be of a size and at a height so that it is easily readable by most users. Multiple displays 104 could be used to accommodate users of reduced stature (e.g. children). It should be noted that some of the figures, including FIG. 5, show displays 104 that are exaggerated in size or that are placed in alternative positions. The display 104 may be, for example, a liquid crystal display (LCD) display, a digital light processing (DLP) display, a plasma display panel (PDP) display, a field emission display (FED), or any other display known or yet to be discovered/developed that can display the nutritional information. In one preferred system, the display 104 is a touchscreen display.

The memory 106 is used to store vending machine data 160 (e.g. a vending machine data database) and merged data 180 (including the nutrition data 170). The memory 106 may also include programs necessary to run and/or completely control the vending machine (not shown), a management subprogram 155 (that would interface with the main management program 150), and/or at least one communication program 195 that is used to control the communication interface technology 195*a* and 195*b* and handle data input and output.

The user input technology 108 is the technology associated with the vending machine 100 by which the user inputs an indication of his product selection. The user input technology 108 may be, for example, buttons, knobs, a key pad, or a touchscreen display.

The communication interface technology 195*a* and 195*b* is any technology suitable for facilitating communications between the vending machine 100 and the handheld audit technology 120 and between the vending machine 100 and the management technology 140. The communication interface technology 195*a* and 195*b* may be controlled and/or accessed by the communication program 195. The communication interface technology may be for wired communication and/or for wireless communication. In the exemplary system shown in FIG. 2, the communication interface technology 195*a* between the vending machine 100 and the handheld audit technology 120 uses a physical sync whereas the communication interface technology 195*b* between the vending machine 100 and the management technology 140 is shown as wireless and may be implemented as a combination of an antenna (associated with the vending machine 100), a wireless network (e.g. cell or WiFi), and/or the Internet. (The wireless network and/or the Internet are shown as communication technology 190.) In the exemplary system shown in FIG. 3, the communication interface technology 195*a* is a two-way technology (that may be wired or wireless) that transmits vending machine data 160 to the management technology 140 via the handheld audit technology 120 and receives merged data 180 from the management technology 140 via the handheld audit technology 120. In the exemplary system shown in FIG. 4, the communication interface technology 195*a* is a two-way technology (that may be wired or wireless) that transmits vending machine data 160 directly to the management technology 140 and receives merged data 180 directly from the management technology 140.

In one exemplary system, a stand-alone device 101 (FIG. 1) includes at least the management subprogram 155, the communication program 195, and at least one interface technology 195*a*, 195*b*. The stand-alone device 101 could have its own display 104. The stand-alone device 101 would, most likely have its own memory 106 to store the programs 155, 195, but could either use its own memory to store data 160, 180 or could use memory of the vending machine 100. The programs 155, 195 can run a processor in the stand-alone device 101 or could use a processor of the vending machine 100. The stand-alone device 101 is associated with the vending machine 100 and configured to "tap into" the DEX data stream (or any standard vending machine protocol including MDB) from a processing unit (that may be processing unit 102) already equipped in the vending machine 100. The stand-alone device 101 is then able to monitor and record sales and usage. Information collected can include, but is not limited to, what product a user purchases after using the display (that may be display 104) to filter nutrition facts. For example, if the user was searching for a product that was 35-10-35 compliant (i.e. the product meets the following nutritional requirements: (1) it has less than 35% of its calories from fat; (2) it has less than 10% of its calories from saturated fat; and (3) it has less than 35% sugar by weight), did the user actually purchase a product that was 35-10-35 compliant and, if not, create a record of the actual product purchased. The stand-alone device 101 may also be used to log and monitor product sales, preferences, and usage on a geographic basis.

Audit Technology 120 (FIG. 6)

To communicate with the vending machines 100, merchandisers use vending machine audit technology 120 that is usually portable and/or handheld to obtain the vending machine data 160. Further, the audit technology 120 is synchronized with management technology 140 that is located at the management site so that the vending machine data 160 from the vending machine 100 can be used for management purposes at the management site. The system in FIG. 2 uses audit technology 120 as an intermediary for communicating vending machine data 160 from the vending machine 100 to the management technology 140. The system in FIG. 3 uses audit technology 120 as a two-way intermediary for communicating vending machine data 160 from the vending machine 100 to the management technology 140 and for communicating merged data 180 from the management technology 140 to the vending machine 100.

The audit technology 120 may be a specific purpose device or may be a general purpose device (e.g. a personal digital assistant) having the necessary capabilities and being specifically programmed (and sometimes physically enhanced and/or modified such as to have the proper technology such as a barcode scanner) to perform the functions of an audit device. Exemplary audit technology is described in U.S. Patent Publication No. 2009/0303982 to Blachman et al. (the "Blachman reference"), U.S. Patent Publication No. 2006/0074777 to Anderson (the "Anderson reference"), and other references disclosed herein, all of which are hereby specifically incorporated by reference.

A handheld audit technology, as shown in FIG. 6, preferably has at least one associated processing unit 122, at least one associated display 124, at least one associated memory 126 (for storing, for example, vending machine data 160, merged data 180 (for the system shown in FIG. 3), a management subprogram 156, and/or at least one communication program 196), at least one associated merchandiser input technology 128, and/or at least one associated communication interface technology 196*a* and 196*b*. The processing unit 122, display 124, memory 126, merchandiser input technology 128, and/or communication interface technology 196*a* and 196*b* may be existing audit technology without modification. Alternatively, for systems such as that shown in FIG. 3, merged data 180 and/or a management subprogram 156 may be stored in memory 126.

The processing unit 122, in terms of the system described herein, is responsible for uploading and downloading data (including the vending machine data 160 and, in the system shown in FIG. 3, the merged data 180). The processing unit 122 (and the memory 126 therethrough) interacts with both the vending machine 100 (via communication interface technology 196*a*) and with the management technology 140 (via communication interface technology 196*b*). The management subprogram 156, which is designed to interact with the management program 150, provides the instructions implemented by the processing unit 122. For example, the management subprogram 156 directs the specifics of the transfer and/or storage of data and directs what data is transferred and/or stored. For example, the management subprogram 156 would control the direction in which the vending machine data 160 is received and/or transmitted by the audit technology 120. In the system of FIG. 3, the management subprogram 156 would also control the direction in which the merged data 180 is received and/or transmitted by the audit technology 120.

The audit technology's display 124 and input technology 128 facilitate the merchandiser's interaction with the audit technology 120. An exemplary display 124 might be a liquid crystal display (LCD) display, but other technologies could be used. Exemplary merchandiser input technology 128 could include, key pads, buttons, knobs, fingerprint readers, scanners (e.g. scanners for reading bar codes on products or scanners for reading magnetic media on a merchandiser's identification card), and any other input technology known or yet to be discovered/developed. It should be noted that the display 124 may be a touchscreen display such that it would also function as input technology 128.

The memory 126 is used to store vending machine data 160 (e.g. a vending machine data database) and/or merged data 180 (in the system shown in FIG. 3). The memory 126 may also include programs (not shown) necessary to run the audit technology 120, a management subprogram 156 (that would interface with the main management program 150), and/or at least one communication program 196 that is used to control the communication interface technology 196*a* and 196*b* and handle data input and output.

The communication interface technology 196*a* and 196*b* is any technology suitable for facilitating communications between the audit technology 120 and the vending machine 100 and between the audit technology 120 and the management technology 140. The communication interface technology 196*a* and 196*b* may be controlled and/or accessed by the communication program 196. The communication interface technology may be for wired communication and/or for wireless (e.g. telemetry) communication. In the exemplary system shown in FIG. 2, the communication interface technology 196*a* between the audit technology 120 and the vending machine 100 requires a physical sync whereas the communication interface technology 196*b* between the audit technology 120 and the management technology 140 may be physical (e.g. using a sync cradle or hard wire interface) and/or wireless. In the exemplary system shown in FIG. 3, the communication interface technology 196*a* is a two-way technology (that may be wired or wireless) that receives vending machine data 160 from the vending machine 100 and transmits it to the management technology 140 and the communication interface technology 196*b* is a two-way technology (that may be wired or wireless) that receives merged data 180 from the management technology 140 and transmits it to the vending machine 100. It should be noted that some or all of the transmissions may take place using communication technology 190 including, but not limited to antennas, a wireless network (e.g. cell or WiFi), and/or the Internet.

An example of the audit technology may be the traditional handheld dedicated unit carried by merchandisers into the machine site of the field site (e.g. right next to the vending machine). Another example of the audit technology is a "curb side polling" device used by the merchandiser outside of the machine site and/or outside of the field site. In such a situation, the merchandiser is able to determine what products are needed to restock a vending machine before approaching the vending machine. For example, a merchandiser can sit in his truck in the parking lot of the field site and use the audit technology to determine what products are needed for all the vending machines in the field site without having to approach each vending machine.

Management Technology 140 (FIG. 7)

Management technology 140 is technology that the vending service company uses to manage its vending machine network. Management technology 140 generally includes at least one computer, workstation, or server having at least one processor 142, at least one display 144, and at least one management input technology 148 (e.g. keyboards, mice, scanners). The management technology 140 may be implemented as a network of computers, workstations, and/or servers. Although shown as a single memory, the memory 146 may be multiple memories and/or databases. Memory 146 may store, for example, vending machine data 160 (from multiple vending machines in an inventory database 147), a management program 150, and/or at least one communication program 197. The components of the management technology 140 may be located in whole or in part at the vending service company management site. For example, the memory 146 may be stored at a remote or virtual facility (e.g. cloud computing).

The unique management program 150 described herein is not only responsible for directing and/or controlling the management technology 140, but interacts with the vending machine management subprogram 155 and the audit technology management subprogram 156 to direct and/or control the entire system. It is these programs 150, 155, 156 that direct and/or control their respective processing units 142, 102, 122 to carry out the respective uploading and/or downloading of data (including the vending machine data 160 and the merged data 180) as appropriate by providing the instructions to be implemented by the processing unit(s). For example, the management program 150 (or a subprogram or a separate program that is included in the definition of management program 150) directs/controls specifics of the transfer and/or storage of data (e.g. where the data is transferred to) and directs/controls what type of data is transferred and/or stored (as opposed to the technical details of the transfer that would be directed/controlled by the communication program 197). Another example is that the management program 150 (or a subprogram or a separate program that is included in the definition of management program 150) preferably controls how the vending machine data 160 (e.g. machine identifiers and/or inventory data (including product identifiers)) is merged 130 with nutrition data 170 from the nutrition facts data server 132 (and/or with advertising data 170' from the advertising data server 132') to create merged data 180. It should be noted that “inventory data” is a list of products stocked in and/or sold by a vending machine 100 that may be identified by product identifying information (product identifier) such as Product Number, Barcode Number, and/or Product Name. Much of the flow of data in FIGS. 2-4 is controlled by the management program 150 (and its interaction with the vending machine management subprogram 155 and the audit technology management subprogram 156).

It should be noted that the management program 150 described herein could be implemented as a stand-alone program, as part of a custom management program that implements the functions described herein as well as the functions of traditional management programs, and/or as a subprogram or a separate program that works with traditional management programs. Known management programs, as set forth in the Background, use the vending machine data 160 in a variety of ways including, but not limited to cash management, inventory management (tracking or predicting), and/or remote management. MEI EASITRAX® (by MEI of West Chester, Pa. (www.meigroup.com)) is a known network technology solution that facilitates for remote monitoring, dynamic scheduling, and cashless solutions that is an example of known management programs. Additional management programs are produced by Crane Streamware, Validata, and Compuvend.

As shown in FIG. 7, the memory 146 may include an inventory database 147 that may include the vending machine data 160 from multiple vending machines to form a vending machine data database. The memory 146 may also include nutrition data 170 (that could also be in a separate memory in the nutrition facts data server 132) and/or advertising data 170' (that could also be in a separate memory in the advertising data server 132'). It is also possible that merged data 180 could be stored in the memory 146. Finally, the memory 146 may include programs (not shown) necessary to run the management technology 140, the management program 150, and the communication program 197 that is used to control the communication interface technology **197*a* and 197*b*** and handle data input and output.

The management technology’s display 144 and input technology 148 facilitate the vending service’s management team’s interaction with the management technology 140. The management technology’s display 144 and input technology 148 would be that found in standard computers, workstations, and/or servers.

The communication interface technology **197*a* and 197*b* is any technology suitable for facilitating communications between the management technology 140 and the vending machine 100 and between the management technology 140 and the audit technology 120. The communication interface technology 197*a* and 197*b* may be controlled and/or accessed by the communication program 197. The communication interface technology may be for wired communication and/or for wireless communication. In the exemplary system shown in FIG. 2, the communication interface technology 197*a* between the management technology 140 and the vending machine 100 is shown as wireless and may be implemented as a combination of an antenna (associated with the vending machine 100), a wireless network (e.g. cell or WiFi), and/or the Internet. (The wireless network and/or the Internet are shown as communication technology 190.) In the exemplary system shown in FIG. 2, the communication interface technology 197*b* between the management technology 140 and the audit technology 120 may be physical (e.g. using a hard wire interface or sync cradle (shown as sync interface 198) and/or wireless (e.g. a wireless sync). In the exemplary system shown in FIG. 3, the communication interface technology 197*b* is a two-way technology (that may be wired or wireless) that receives vending machine data 160 from the vending machine 100 (via the audit technology 120) and transmits merged data 180 to the vending machine 100 (via the audit technology 120). In the exemplary system shown in FIG. 4, the communication interface technology 197*b* is a two-way technology (that may be wired or wireless) that receives vending machine data 160 directly from the vending machine 100 and transmits merged data 180 directly to the vending machine 100. It should be noted that some or all of the transmissions may take place using communication technology 190** including, but not limited to antennas, a wireless network (e.g. cell or WiFi), and/or the Internet. Some of these communications may take place at night or during times that offer lower cost cellular communication.

FIGS. 2, 3, 4, and 6 show a nutrition facts data server 132 (and an optional advertising data server 132') and a merge block 130 representing the process of merging the vending machine data 160 with information from the nutrition facts data server 132 (and the advertising data server 132'). Merge 130 may be performed by the processing unit 142 (or by a subprocessor of processing unit 142 or a separate processor). The nutrition facts data server 132 may have its own memory and/or processing or it may use the memory 146 and/or processing unit 142. Similarly, the advertising data server 132' may have its own memory and/or processing or it may use the memory 146 and/or processing unit 142 (or share a memory and/or processing unit with the nutrition facts data server 132). Table 1 shows an exemplary simplified vending machine data table for Vending Machine A (including only the machine identifier and inventory data) before it is merged 130. Table 2 shows an exemplary simplified vending machine data table for Vending Machine B (including only the machine identifier and inventory data) before it is merged 130. Table 3 shows an exemplary simplified nutrition data database associated with the nutrition facts data server 132 (including only inventory data and nutrition data 170) before it is merged 130. Table 4 shows an exemplary simplified merged data table for Vending Machine A (including the machine identifier, inventory data, and nutrition data) after being merged 130. Table 5 shows an exemplary simplified merged data table for Vending Machine B (including the machine identifier, inventory data, and nutrition data) after being merged 130.

TABLE 1

Vending Machine Data Table For Vending Machine A

| Machine Identifier | Inventory Data (product identifier) |
|---|---|
| A | Veggie Snackeroos |
| A | Winkie Dinkies |
| A | Pretzels |

TABLE 2

Vending Machine Data Table For Vending Machine B

| Machine Identifier | Inventory Data (product identifier) |
|---|---|
| B | Veggie Snackeroos |
| B | Cookies |
| B | Apples |

TABLE 3

Nutrition Data Database

| Inventory Data (product identifier) | Nutrition Data (cal) | Nutrition Data (fat) |
|---|---|---|
| Apples | 100 calories | 0 grams fat |
| Cookies | 500 calories | 4 grams fat |
| Pretzels | 300 calories | 3 grams fat |
| Veggie Snackeroos | 100 calories | 2 grams fat |
| Winkie Dinkies | 900 calories | 8 grams fat |

TABLE 4

Merged Data Table For Vending Machine A

| Machine Identifier | Inventory Data (product identifier) | Nutrition Data (cal) | Nutrition Data (fat) |
|---|---|---|---|
| A | Veggie Snackeroos | 100 calories | 2 grams fat |
| A | Winkie Dinkies | 900 calories | 8 grams fat |
| A | Pretzels | 300 calories | 3 grams fat |

TABLE 5

Merged Data Table For Vending Machine B

| Machine Identifier | Inventory Data (product identifier) | Nutrition Data (cal) | Nutrition Data (fat) |
|---|---|---|---|
| B | Veggie Snackeroos | 100 calories | 2 grams fat |
| B | Cookies | 500 calories | 4 grams fat |
| B | Apples | 100 calories | 0 grams fat |

The Data

The management technology 140 receives vending machine data 160 from each vending machine 100. The management technology 140 merges the vending machine data 160 with nutrition data 170 from the nutrition facts data server 132 and/or the advertising data 170' used by the advertising data server 132'. (Although it is preferred that all the products have nutrition data 170 and/or the optional advertising data 170', some products may not have it. For example, a banana may not have advertising data 170'.) The management technology 140 then transmits the merged data 180 back to its respective vending machine 100.

In a standard system, vending machine data 160 includes, but is not limited to information about the machine identifier or Machine ID (e.g. a code or other identifying information to distinguish the vending machine from other vending machines), inventory data (e.g. products stocked in and/or sold by each vending machine that may be identified by product identifiers such as Product Number, Barcode Number, and/or Product Name), inventory level information (e.g. how much of each product was originally stocked and/or was sold), and fund data (e.g. the amount of money received by the vending machine). Common or standard vending machine protocol exists to identify vending machine data 160. Common vending machine protocols used for communicating with vending machines 100 in order to exchange the vending machine data 160 include, for example, DEX/UCS, MDB, and DDCMP, and other data formats or protocols known or yet to be discovered/developed. These industry standard vending machine protocols have definitions that are readily available and not replicated herein. Known systems include management programs that use the vending machine data 160 for purposes such as determining vending machine routing needs, determining profitability, managing cash flow (e.g. cash management), and/or managing inventory (e.g. inventory management, tracking, and/or predicting). It should be noted that the system described herein uses the vending machine data 160 and the common vending machine protocols that already exist in the industry.

A nutrition facts data server 132 includes nutrition data 170 such as that found on the back of food packages. The nutrition data 170 might be arranged, for example, by product identifiers such as Product Number, Barcode Number, and/or Product Name. For each product, nutrition data 170 might include one or more of the following types of data: serving size, calories, fat calories, total fat, saturated fat, trans fat, cholesterol, sodium, total carbohydrates, sugars, protein, vitamins and minerals, ingredients, warnings (e.g. product contains dairy or product may have been made in a factory that also processes nuts), and any other relevant nutritional data. The nutrition data 170 may be provided in any relevant denomination including weight, calories, grams, and percentages (e.g. of daily intake based on a 2,000 calorie diet). The nutrition data 170 might be part of a custom database or it might use information obtained from known sources of such information.

An advertising data server 132' includes advertising data 170'. The nutrition data 170 might be arranged, for example, by product identifiers such as Product Number, Barcode Number, and/or Product Name. For each product, advertising data 170' might include one or more of the following types of data: advertisements (e.g. video or still), trademarks, slogans, interactive communications (e.g. internet), photographs, animation, or any other form of communication or links thereto that would entice a user to buy a product. The advertising data 170' might be part of a custom database or it might use information obtained from known sources of such information.

The merged data 180 uses a common identifier (e.g. the product identifier) to link the vending machine data 160 with the nutrition data 170 (and/or the advertising data 170'). Pseudo-code for performing the merge might look like the following:

```
Create a blank merged data table for a specific vending
  machine;
Begin at the first product in the vending machine data for
  that vending machine;
For each product in the vending machine data:
  Create a row in the merged data table;
  Search for nutrition data for the product in a nutrition
    data database; and
  Add found nutrition data for the product to the new row
    of the merged data table.
```

The System

The vending machine nutritional information display system uses standard inventory control system components such as vending machines 100, vending machine audit technology 120, and management technology 140. It should also be noted that the system described herein uses the vending machine data 160 and the common vending machine protocols that already exist in the industry. Finally, it should be noted that the system may be designed to function with traditional management programs (e.g. it may be integrated into, work as a subprogram of, or be a separate program that works with traditional management programs).

The system described herein includes a method and apparatus by which nutritional information for products stocked within a vending machine 100 is merged with nutrition data 170 only for those products stocked in the vending machine 100. FIGS. 2, 3, 4, and 6 show a merge block 130 in which select information (e.g. inventory data representing the specific products stocked in the vending machine 100) is obtained from the vending machine data 160, nutrition data 170 is obtained from the nutrition facts data server 132 (and/or nutrition facts database stored in the server 132 or a memory associated therewith) only for products specified in the inventory data, and then the nutrition data 170 for the inventory of the machine is merged. (Optionally, the advertising data 170' can be obtained from the advertising data server 132' (and/or advertising database stored in the server 132' or a memory associated therewith) only for products specified in the inventory data, and then the advertising data 170' for the inventory of the machine is merged). Tables 1-5 show an example of how this might be accomplished. In preferred systems this merger of vending machine data 160 (or select information thereof) is handled on a machine-by-machine basis for each vending machine 100. In the preferred system, the extracted information from the vending machine data 160 that is to be merged includes, at minimum, unique product identifiers (inventory data) for all products in a given vending machine 100. The extracted information may also include the column identification within the machine for each product. The extracted data is merged with nutrition information that is maintained in a nutrition facts database containing the universe of products that are available for vending machines 100. The "universe of products" may be narrowed to only those products available from that vending service company or only available in the region, or only those products available at that specific vending machine.

The system described herein also includes a vending machine nutritional information display system in which nutrition data 170 may be displayed on a vending machine display 104 as nutritional information for those products stocked within the vending machine 100. Nutrition data 170 (provided in the merged data 180 from the management technology 140) is available to the vending machine user as nutritional information prior to purchase. For example, a vending machine user can use a touch-screen interface 104, 108 to select a particular product (e.g. selecting the veggie snackeroos in column B7 by simply entering "B7" on the touch-screen) and read the nutrition facts and ingredients for the veggie snackeroos on the same display. Alternatively, the user can search for a product by name or filter product choices in a vending machine 100 by one or more nutrition facts and/or ingredients (such as show all products that contain less than 35% fat, 10% saturated fat, and 35% sugar; or products under 200 calories), or other characteristics pertinent to an individual's dietary needs and choices (for example vegetarian or kosher products).

It should be noted that one preferred feature of the system described herein is that nutrition information for products in any given vending machine could be checked online prior to approaching the machine. Each vending machine already has a unique machine identifier. A user could go to a website that has access to the management technology 140 where the user inputs his location and is provided with a list of nearby vending machines, each of which has its real-time inventory online, and each product has nutritional information thereon. The user could search for specific products or search using filters based on the nutritional information. Alternatively, each vending machine could have its own website and be searchable online. The user would be able to view information about products in a specific vending machine from the convenience of their computer prior to approaching the vending machine. For example, if a user needed a peanut-free product, he could login to a vending service company website, input his location (e.g. by address), and use the peanut-free product filter. The user would be provided a list of all the vending machines 100 located nearby that had peanut-free products as well as a list of the specific products available. The user would have the ability to get additional nutritional information on each of the products as well as the ability to determine when that product was stocked (to verify freshness).

It should be noted that one preferred feature of the system described herein is that maintenance of inventory data can be performed such that when a product sells out in a vending machine 100, the nutrition information is removed from being displayed at that machine 100.

It should be noted that one preferred feature of the system described herein is that merchandisers can update product information directly at the vending machine level through the touchscreen interface 104, 108 after entering an administrative mode. If the stand-alone device 101 in the vending machine 100 is equipped with a barcode scanner (as a user input technology 108), the merchandiser scans the product being added to the vending machine 100 or removed from the vending machine 100. Once a product is scanned and added to the system, the nutrition information is then downloaded from the nutrition facts server 132 (and/or advertising data 170' is downloaded from the advertising data server 132').

Figure 8A:
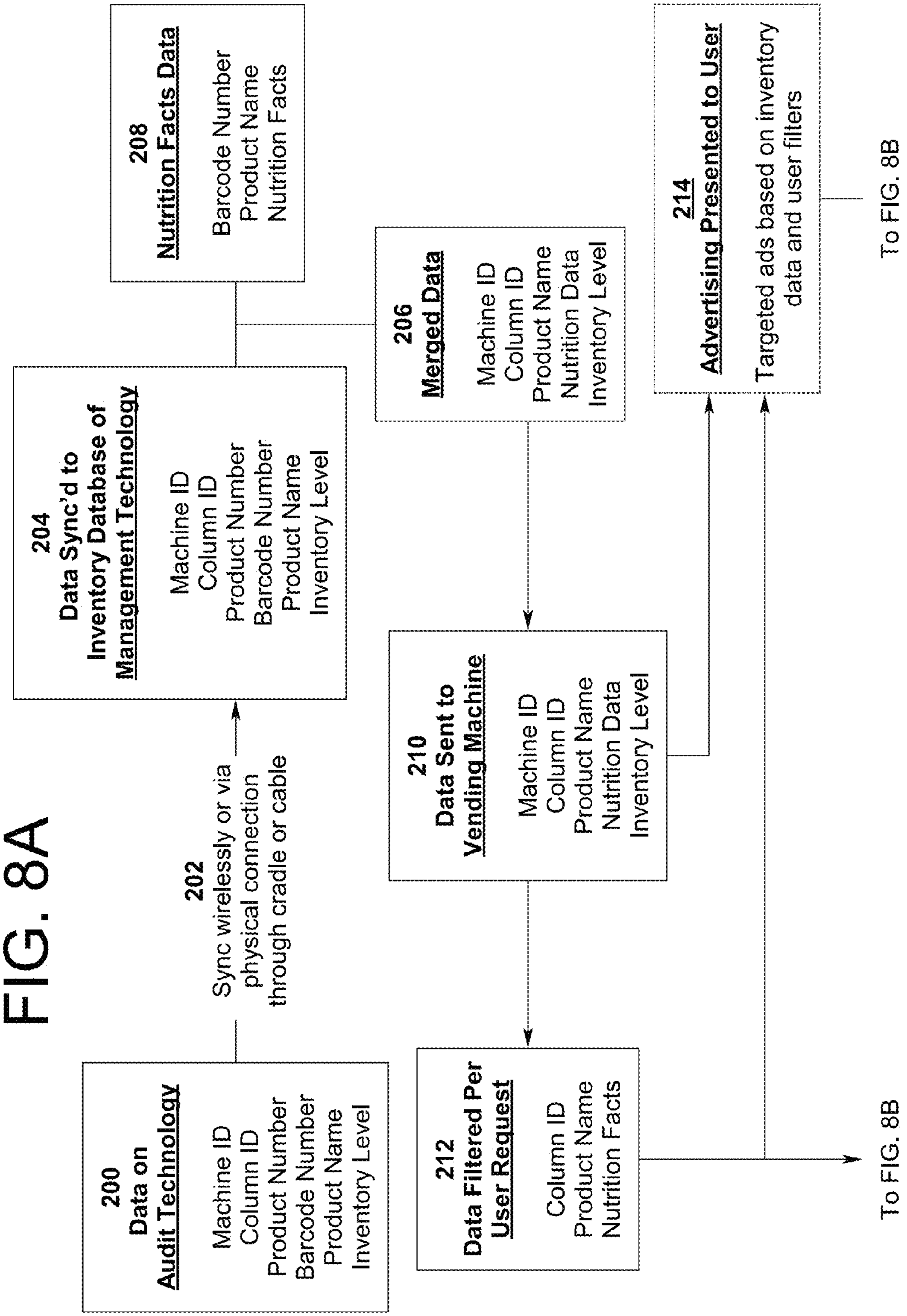
FIGS. 8A and 8B are a simplified data flow chart showing an exemplary flow of data for a vending machine nutritional information display system.
Figure 8B:
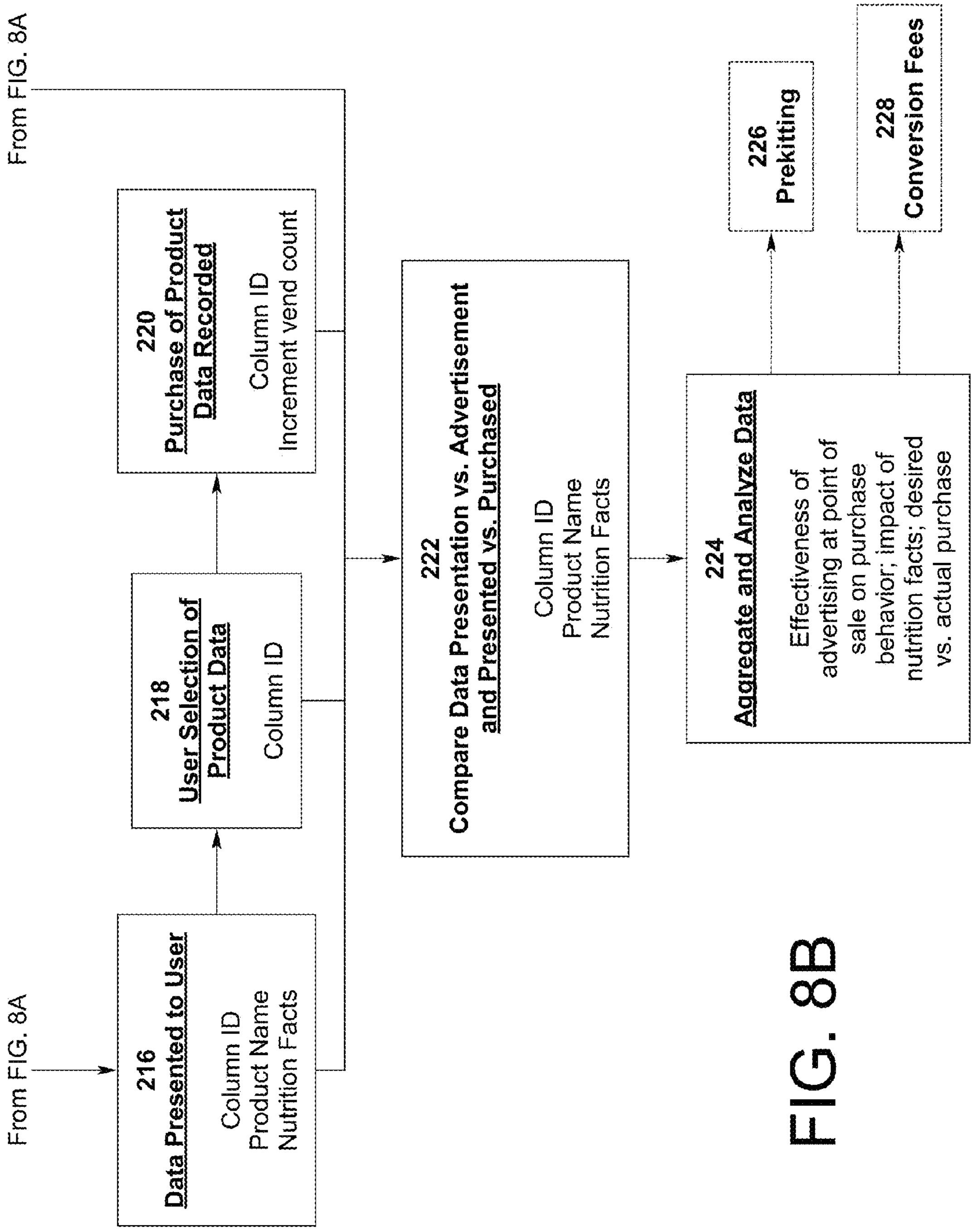

FIGS. 8A and 8B together are a flow chart illustrating the methods and systems disclosed herein. It will be understood that each block of this flow chart, components of all or some of the blocks of this flow chart, and/or combinations of blocks in this flow chart, may be implemented by software (e.g. computer program instructions, software programs, subprograms), by hardware (e.g. processors, memory), by firmware, and/or a combination of these forms. Block 200 shows the type of vending machine data the audit technology might have for a vending machine and its products. Blocks 202 and 204 show that the information on the audit technology may be synced (wirelessly or via a physical connection through a cradle or cable) to the vending machine data for that particular vending machine in the inventory database of the management technology. Block 206 shows the resulting merged data after some of the vending machine data (e.g. Machine ID, Column ID, Product Name, and Inventory Level) has been merged with nutrition facts data from block 208. At block 210 the merged data is transmitted to the vending machine processing unit (e.g. a central coordinating unit as discussed herein). As shown in the figures, the information from block 210 may be used for data filtering based on a user's request (block 212) or used in advertising presented to the user (block 214—that may be targeting advertising based on information block 214 receives from block 212). Block 216 shows that data is presented to the user and then, the user selects the product (block 218) and purchases the product (block 220). The data from blocks 214, 216, 218, and 220 are preferably recorded so that at block 22 comparisons can be made pertaining to advertising presented to the user (block 212), information presented to the user (block 216), the product selected by the user (block 218), and the purchase itself (block 220). At block 224 that data may be aggregated and analyzed. It should be noted that the functions of block 222 and block 224 may be performed at the management technology 140 after the information from blocks 214, 216, 218, and 220 is transferred. Alternatively, the functions of block 222 and block 224 may be performed at the vending machine 100 so that it is available to the merchandiser. Finally, blocks 226 and 228 show some of the practical uses for the information from blocks 222 and 224. Specifically, block 226 shows the information being used for "pre-kitting." Pre-kitting would most likely be used in a system such as shown in FIG. 4, where the management technology 140 handles product assignment. Block 208 shows the information's use with "conversion fees." Conversion fees are the fees collected by a vending service company when nutritional information and/or an advertisement is displayed to a user and the user purchases the product.

Promotional Discount

Described herein is an exemplary vending machine system that provides users with a promotional discount and a method for using a vending machine 300 to provide a promotional discount. Providing users with a promotional discount is a preferred optional feature that may be used alone or in combination with other features described herein. An additional preferred feature is the ability to offer a promotional discount on a product-specific basis.

"Promotions" are distinct from "advertisements." Advertisements are generally call attention to a product and may be displayed at a vending machine during periods when a vending machine is not in use to attract additional customers, They may also be displayed at interactive times when a user swipes a credit card (or other payment mechanism) to authorize a purchase. Promotions offer value, such as a refund, discount, and/or a rebate. Using these definitions, promotions generally function as an advertisement in that they can call attention to a product, but advertisements do not necessarily provide a value. Traditional vending machines may have advertisements of products such as large visual representations of the product, but they generally do not offer promotions.

Promotions may be static in that they always remain the same or the promotions may be dynamic in that they change based on factors including, but not limited to, promotions available, product demand, time, dates, locations, memberships, and the user involved in the transaction, or other factors. As an example, a promotion may be directed to a particular user. The user may be identified by his logging into the vending machine using an user interface integral with the vending machine 300 or a user interface that is remote (e.g. a remote communication technology from which the user texts a message to the vending machine 300). Alternatively a sophisticated detector (e.g. camera or sensor) associated with the vending machine 300 may recognize the user. Special promotions and loyalty programs may be identified as being available to the specific user and specific vending machine being utilized based on the user's known identification and the products placed in the specific vending machine.

Figure 9:
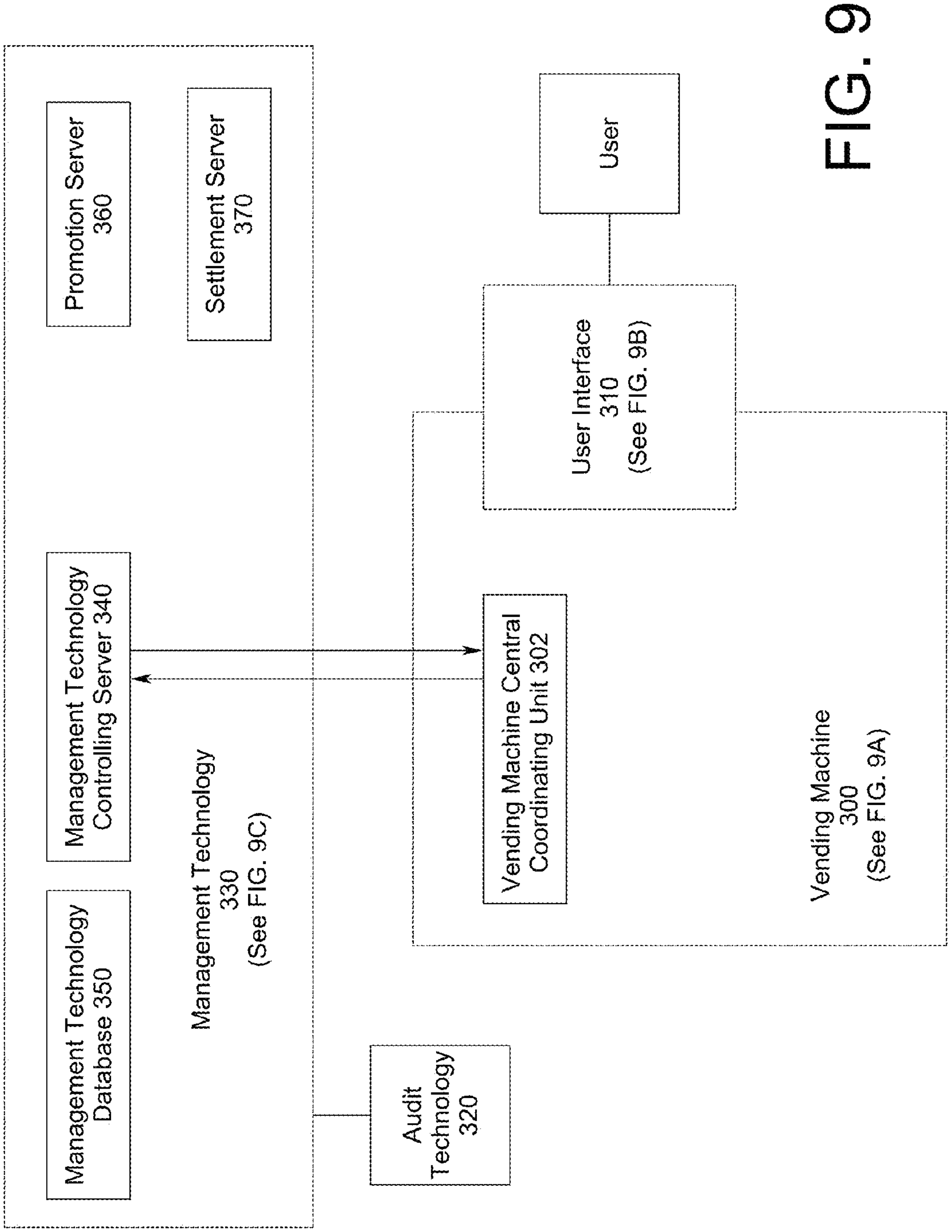
FIG. 9 is a simplified block diagram of a system including a vending machine with a user interface and management technology, the system being suitable for providing users with promotions on the user interface.
Figure 9A:
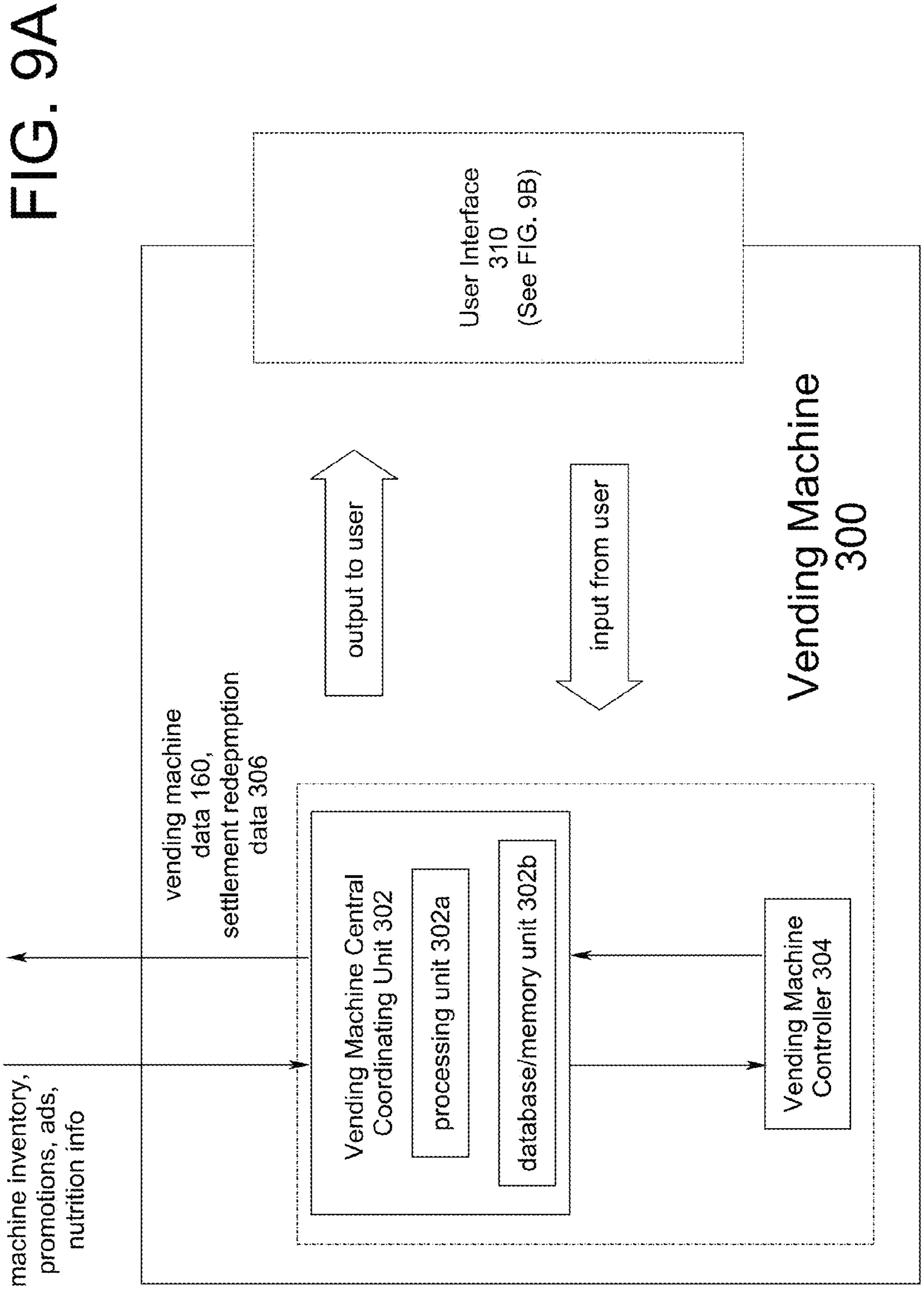
FIGS. 9A-9C are block diagrams that provide further details of the simplified block diagram of FIG. 9.
Figure 9B:
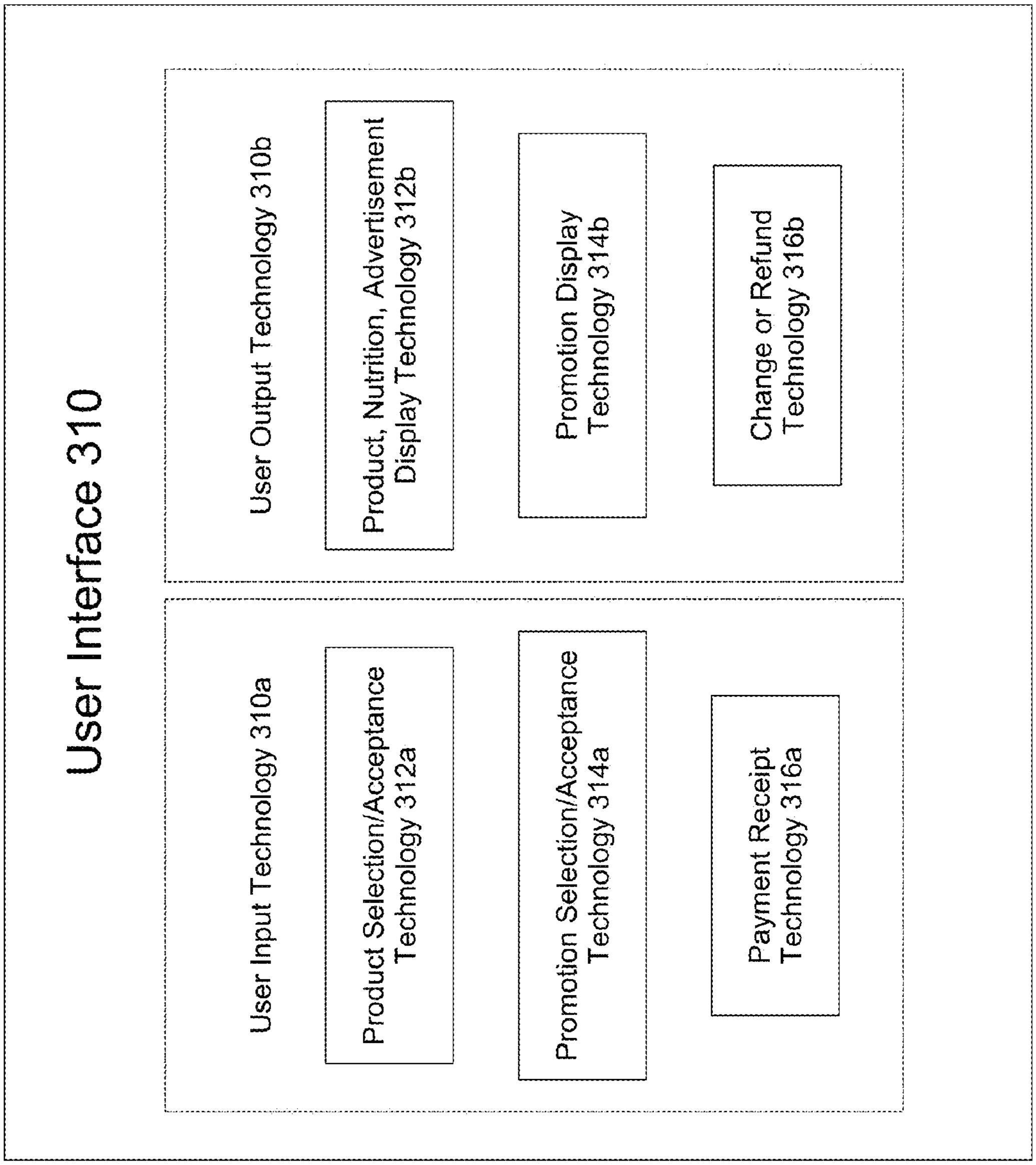
Figure 9C:
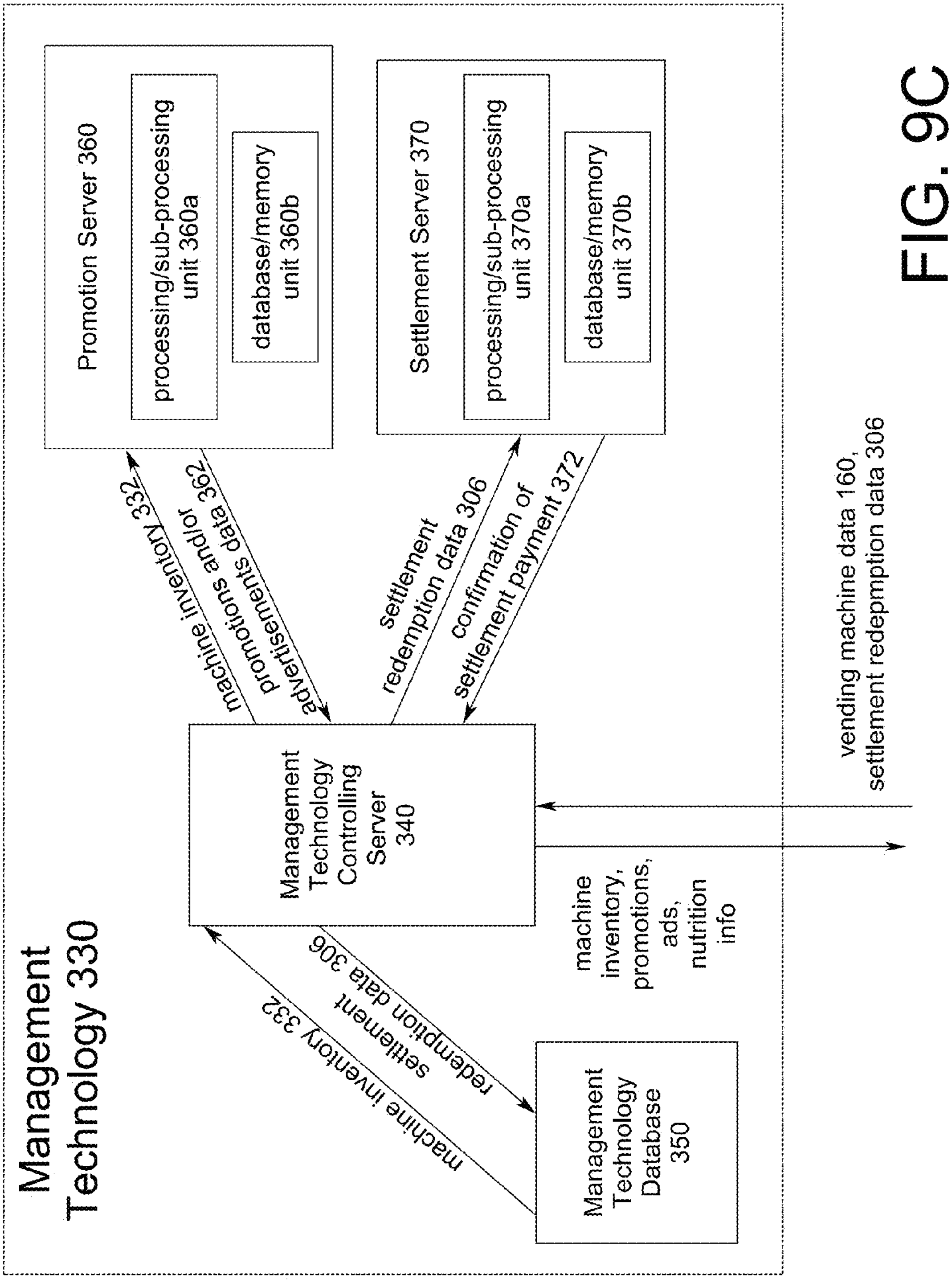

FIG. 9 (that, unless otherwise specified, includes the vending machine 300 detailed in FIG. 9A, the user interface 310 detailed in FIG. 9B, and the management technology 330 detailed in FIG. 9C) is a block diagram that shows exemplary data flow between components of an exemplary system that may be used to implement a promotional discount feature. In addition to at least one vending machine 300, at least one user interface 310, and at least one management technology 330, the system preferably includes additional components such as at least one audit technology 320 (e.g. a handheld computer) and may include other additional components (e.g. communication technology) described in relation to other systems and/or sub-systems described herein. These components may be associated with, incorporated into, similar to, modified versions of, or the same as system components discussed elsewhere herein. For example, the audit technology 320 may be equated to the handheld audit technology 120 although it may actually be a modified version thereof. As another example, the management technology 330 may be associated with, may be incorporated into, may be a modified version of, or may actually be management technology 140 at the vending machine operating company or controlled directly or indirectly by the vending machine operating company. It should be noted that the promotional discount feature may be implemented alone or in combination with other features described herein.

The vending machine 300 may be a new type of vending machine or it may be implemented as a modified standard vending machine (e.g. a standard vending machine with retrofitted components either inside the machine, outside the machine, and/or as a new door assembly). Using standard components associated with standard vending machines creates unique difficulties that would not be present with new and custom vending machines. Preferred vending machines described herein are able to overcome the difficulties associated with modifying a standard vending machine. Some of the processing units and/or database/memory units may be native (present in conventional, non-retrofitted vending machines) to a vending machine 300 (e.g. the vending machine controller 304 may be native). Some of the processing units and/or database/memory units may be in addition to or replace native vending machine processors and/or database/memory units (e.g. the shown vending machine central coordinating unit 302 may be a custom combination of subcomponents that are either added to a vending machine or replace native components of a vending machine, such as the native display). Although shown as separate components, the shown vending machine controller 304 may be integrated into or functionally replaced by the vending machine central coordinating unit 302. Finally, some of the processing units may be internal to the shown components (e.g. the vending machine central coordinating unit 302 may include one or more processing/sub-processing units and/or one or more database/memory units that are not specifically shown).

Turning first to the vending machine 300 as shown in FIG. 9A, the shown vending machine central coordinating unit 302 may include one or more subcomponents that together function as a central coordinating unit in or otherwise associated with the vending machine 300. The vending machine 300 and/or the vending machine central coordinating unit 302 preferably include at least one associated processing unit 302*a* (e.g. a single processor for implementing multiple processes and/or sub-processes, multiple processors/sub-processors each operating a single process or sub-process, or multiple processors/sub-processors some of which may be dedicated to a single process or sub-process) and at least one associated database/memory unit 302*b* (e.g. a single database/memory for storing multiple types of information, multiple databases/memories each for storing a single type of information, or multiple databases/memories some of which may be dedicated to a single type of information). The vending machine central coordinating unit 302 (including its associated processing unit 302*a* and/or database/memory unit 302*b*) may be associated with other components (e.g. the user interface 310 and the management technology 330). For example, the user interface 310 may be functionally controlled by the vending machine central coordinating unit 302 (although it could, alternatively, be controlled by its own internal processing unit and/or database/memory unit). Another example is that the vending machine central coordinating unit 302 may transmit signals (e.g. vending machine data 160 and/or settlement redemption data 306) and receive signals and/or data from the controlling server 340 of the management technology 330.

The user interface 310 associated with the vending machine 300 may be physically associated with the vending machine 300, remotely associated with the vending machine 300, or a combination of physically associated and virtually associated with the vending machine 300. An example of a physically associated user interface 310 is the traditional user interface of a vending machine. Examples of a virtually associated user interface 310 include remote communication technology such as computers, smart phones, cell phones, personal digital assistants (PDAs), tablets, digital wallets, and any other known or yet to be discovered/developed devices that are able to remotely communicate with the vending machine 300 and/or the vending machine central coordinating unit 302. A virtually associated user interface 310 may communicate with the vending machine 300 (or subcomponents thereof) through an internet connection, radio transmission, WiFi hotspot, local area network, a wide area network, broadband network (e.g. 2G, 3G, or 4G), or other means of remote communication known or yet to be discovered/developed. If a virtually associated user interface 310 were to be used, both the virtually associated user interface 310 and the vending machine 300 (or subcomponents thereof) would have the necessary technology (e.g. transmitters and/or receivers) to facilitate communications therebetween.

FIG. 9B shows an exemplary user interface 310 that includes user input technology 310*a* and user output technology 310*b*. Although shown as part of an integral user interface 310, each type of user interface may be otherwise associated (e.g. physically separated from) the remaining user interfaces. Some user interfaces have combined user input technology 310*a* and user output technology 310*b* (e.g. a touchscreen display). The user input technology 310*a* receives input from the user (e.g. product selection and/or promotion acceptance) and transmits it to the vending machine central coordinating unit 302 and/or the vending machine controller 304. The user output technology 310*b* transmits signals (e.g. nutritional information, promotions, and advertisements) from the vending machine central coordinating unit 302 and/or the vending machine controller 304. The vending machine central coordinating unit 302 may be the "brain" (transmitting and receiving signals and interpreting them) while the vending machine controller 304 functions primarily to control the subcomponents of the vending machine 300 based on instruction signals from the vending machine central coordinating unit 302.

As shown, user input technology 310*a* (that may be or include user input technology 108) may include product selection/acceptance technology 312*a* (technology that allows the user to select a product), promotion selection/acceptance technology 314*a* (technology that allows the user to select and/or accept a promotion), and payment receipt technology 316*a* (technology that allows the user pay for the product). Exemplary user input technology 310*a* includes, for example, buttons, key boards, keypads, touch pads, touchscreens, mice, and other input means known or yet to be discovered/developed. Additional user input technology 310*a*, particularly that suitable for payment receipt technology 316*a*, may include technology for accepting payment such as bill acceptors, coin acceptors, and/or card readers. The same user input technology 310*a* may function in multiple capacities. For example, the same buttons or touchscreen could function as both the product selection/acceptance technology 312*a* and the promotion selection/acceptance technology 314*a*. The various types and locations of user input technology 310*a* may depend on or be dictated by the particular functions and features of the vending machine 300 with which it is associated.

As shown, user output technology 310*b* (that may be or include the display 104) may include product, nutrition, and advertisement display technology 312*b* (technology that displays information about the product, nutrition, or advertisements to the user), promotion display technology 314*b* (technology that displays a promotion to the user), and change or refund technology 316*b* (technology that allows change or other type of refund to be provided to the user). Exemplary user output technology 310*b* includes, for example, computer displays, liquid crystal displays, projectable displays, and other input means known or yet to be discovered/developed. Additional user output technology 310*b*, particularly that suitable for change or refund technology 316*b*, may include technology for returning funds (e.g. change) to a user such as coin return slots. The same user output technology 310*b* may function in multiple capacities. For example, the same display or touchscreen could function as both the product, nutrition, and advertisement display technology 312*b* and the promotion display technology 314*b*. The various types and locations of user output technology 310*b* may depend on or be dictated by the particular functions and features of the vending machine 300 with which it is associated.

To illustrate the interplay between the user input technology 310*a* and the user output technology 310*b*, the following example is provided. First, the product, nutrition, and advertisement display technology 312*b* displays information about at least one product (possibly including information about its nutrition and/or an advertisement related to the product) to the user on a display screen that is either physically associated with the vending machine 300 or remote therefrom (e.g. remote communication technology). The user may then select/accept a product using the product selection/acceptance technology 312*a* that may be physically associated with the vending machine 300 or remote therefrom (e.g. remote communication technology). Either before or after the user selects/accepts a product, the promotion display technology 314*b* may display a promotion to the user about one or more of the products in the vending machine 300, the promotion display technology 314*b* being either physically associated with the vending machine 300 or remote therefrom (e.g. remote communication technology). The user may then select/accept a promotion using the promotion selection/acceptance technology 314*a* that may be physically associated with the vending machine 300 or remote therefrom (e.g. remote communication technology). The user may then pay for the product using payment receipt technology 316*a* that may be physically associated with the vending machine 300 or remote therefrom (e.g. remote communication technology). Change or another type of refund may be provided to the user using the change or refund technology 316*b* that may be physically associated with the vending machine 300 or remote therefrom (e.g. remote communication technology).

FIG. 9C shows details pertaining to the management technology 330 that includes an associated management technology controlling server 340 (e.g. a VSM2M Server) and an associated management technology database 350 (e.g. a VMS database). The shown management technology controlling server 340 may incorporate some or all of the features and capabilities discussed in relation to the management program 150 and may incorporate or have access to servers, programs, and functions associated with the other components and subcomponents of management technology 140. The shown management technology database 350 may be a stand-alone database or may incorporate other databases (e.g. an inventory database, a nutrition facts database, and/or an advertising database). The management technology 330 and/or the management technology controlling server 340 preferably include at least one processing unit (e.g. a single processor for implementing multiple processes and/or sub-processes, multiple processors/sub-processors each operating a single process or sub-process, or multiple processors/sub-processors some of which may be dedicated to a single process or sub-process). The management technology 330 and/or the management technology database 350 preferably include at least one database/memory unit (e.g. a single database/memory for storing multiple types of information, multiple databases/memories each for storing a single type of information, or multiple databases/memories some of which may be dedicated to a single type of information). Some of the processing units and/or database/memory units may be native to known management technology or the management technology 140. Some of the processing units and/or database/memory units may be in addition to or replace native management technology processors and/or database/memory units (e.g. the management technology database 350 may be a custom combination of components that is either added to known management technology or management technology 140 or replaces native components of known management technology or management technology 140). Additional processing units and database/memory units may be internal to the shown components (e.g. the promotion server 360 and promotion settlement server 370 may include one or more processing/sub-processing units 360*a*, 370*a* and/or database/memory units 360*b*, 370*b*) or may be implemented using shared resources. Although shown as separate servers, the management technology controlling server 340, the promotion server 360, and the promotion settlement server 370 may be implemented as a single unitary server, combined into fewer servers (e.g. the promotion server and the settlement server may be a single unitary server), or each of the separate servers can be divided into multiple units (e.g. there may be multiple promotion servers designed to handle different types of promotions).

The exemplary interaction of the components of FIG. 9 and the dataflow therebetween is described in the following paragraphs. For the most part, functions described pertaining to the vending machine 100, the handheld audit technology 120, the management technology 140, the communication technology 190, and related components and subcomponents are incorporated here without repetition. It should be noted that, unless otherwise specified or logically impossible, the functions described herein may occur in alternative orders.

1. Set-up:
   - a. The vending machine inventory and the relevant vending machine location (shown together as machine inventory data 332) are preferably transmitted to the promotion server 360 directly or indirectly by the management technology controlling server 340. Alternatively, machine inventory data 332 may be obtained directly and/or dynamically from the vending machine central coordinating unit 302 or components or subcomponents associated therewith.
   - b. The promotion server 360 directly or indirectly transmits promotions 362 (e.g. eligible discounts) for the products based on current negotiated deals for the products stocked in the vending machine 300 to the management technology controlling server 340 and/or to the vending machine central coordinating unit 302. The promotion server 360 may also transmit advertisements in addition to the promotions 362. The promotion server 360 may transmit promotions and/or advertisements 362 specifically based on the received machine inventory data 332 of a specific vending machine 300. Alternatively, the promotion server 360 may transmit promotions and/or advertisements 362 as a batch process for multiple vending machines for which it has received machine inventory data 332. Alternatively, the promotion server 360 may transmit promotions and/or advertisements 362 along with other qualifying restrictions (e.g. type of location, demographics, geography, memberships, specific user, etc.) to the management technology controlling server 340, and management technology controlling server 340 may use the machine inventory data 332 to associate promotions and/or advertisements 362 with specific vending machines based on the qualifying restrictions.
   - c. The management technology controlling server 340 preferably logs the promotions and/or advertisements 362 available for a specific vending machine 300 and user.
   - d. The vending machine central coordinating unit 302 transfers (e.g. downloads) the promotions on a future sync (preferably the next sync, but alternatively any scheduled or requested sync) with the management technology controlling server 340. This can also be thought of as the management technology controlling server 340 uploading the promotions to the vending machine central coordinating unit 302. The vending machine central coordinating unit 302 may have an associated promotional database (e.g. database/ memory unit 302*b* or a distinct database associated with the central coordinating unit 302).

e. As an alternative to set-up steps b, c, and d, it should be noted that the promotion server 360 can communicate directly with the vending machine central coordinating unit 302 or the promotional database associated therewith.

2. Purchasing with a promotional discount:

a. The vending machine central coordinating unit 302 presents the user with promotions available at the vending machine 300 via a user interface 310 (e.g. through a touchscreen display associated with the vending machine 300 or through a remote communication technology). Promotions can be displayed grouped by category, visually displayed, flagged on nutrition or payment option pages, or otherwise displayed. Promotions that are available to all users may be displayed to all users whereas promotions that are available to only specific users (e.g. a member of a promotion club or an individual who has met a point requirement) when the user(s) has/have been identified b. The user, via the user interface 310 "accepts the promotion offer." For example the user may indicate that he wants to accept "$0.25 off Chipos" and/or a "10% cash discount on Chipos" via the user interface 310. The user's selected promotion is preferably transmitted to the vending machine central coordinating unit 302. The vending machine central coordinating unit 302 directly or indirectly receives the user's acceptance as an input signal.

c. The user provides the full price of product (for example, $1.00) into the vending machine 300. This payment may be made, for example, by inserting coins, bills, payment cards or other payment mechanisms directly or indirectly (e.g. via remote communication technology) into appropriate payment receipt technology 316*a*. The vending machine central coordinating unit 302 directly or indirectly receives confirmation of the user's payment as an input signal.

d. The user directly or indirectly (e.g. via remote communication technology) selects the products using the vending machine user input technology 310*a*. The vending machine central coordinating unit 302 directly or indirectly receives the user's selection as an input signal.

e. The vending machine central coordinating unit 302 directs the vending machine 300 to dispense the selected product. This may be accomplished directly by the vending machine central coordinating unit 302 or indirectly using the vending machine controller 304.

It should be noted that, alternatively, when the user is presented with and accepts a promotional offer, a separate user selection of the products is not necessary and that once the payment is received, the vending machine 300 dispenses the selected product.

It should be noted that, alternatively, the full price of the products is not inserted, but only the amount reflecting the price of the product after the promotional discount.

3. Verifying refund eligibility:

a. The vending machine central coordinating unit 302 monitors MDB communications or signals (for the vending machine controller 304) to verify which motor was turned (or that the purchased product was otherwise released from the vending machine 300 to the user). The machine controller 304 and/or the vending machine central coordinating unit 302 may control the actual release of the purchased product.

b. The vending machine central coordinating unit 302 confirms the motor that was turned belongs to the product of the user accepted promotion.

It should be noted that, if a separate user selection of the products is not necessary, then this verification step could be omitted.

4. Honoring the promotion (e.g. providing a refund): If the product dispensed is confirmed as matching the promotion product, the vending machine central coordinating unit 302 will honor the promotion, for example, by issuing the promotional refund, providing discounted or free additional products, or providing some other valuable consideration. The vending machine central coordinating unit 302 also preferably will "log" or record the honoring of the promotion and the details pertaining thereto so that the details pertaining to the promotion can be provided to the management technology controlling server 340 on a following sync (preferably the next sync, but alternatively any scheduled or requested sync). Honoring the promotion may be accomplished using one or more of the following exemplary procedures.

a. Coin Refund: The vending machine central coordinating unit 302 directly or indirectly (e.g. via the vending machine controller 304) transmits a coin return promotional discount signal (e.g. "dispense $0.25") (using MDB) to a coin return mechanism (shown as change or refund technology 316*b*) to have the coin return mechanism dispense the promotional discount (e.g. the $0.25 refund). From the user's perspective, the user views and accepts a promotion, inserts the full vending price (e.g. $1.00), makes a selection, and (after the selection is confirmed) receives the refund (e.g. $0.25) dispensed from the vending machine 300. The user sees this as a net cost of $0.75.

b. Reward Points: If the promotion does not allow a refund (or the vending machine is not capable of providing a refund), an alternative promotion settlement option is to have the credit/value in dollar value or in point value that can be accumulated on a loyalty system (like a rewards points system that might be associated with a membership or a point accumulation card) instead of being paid out in cash or coins.

c. Additional Product—Partial (User Selected): If the promotion does not allow a refund (or the vending machine is not capable of providing a refund), another alternative promotion settlement option is to have the vending machine central coordinating unit 302 transmit a credit/value directly to the vending machine controller 304 that permits the user to select another product. From the user's perspective he would receive a "credit/value" of the promotion amount on that vending machine 300. The user could then add additional funds to purchase another product. In this option, there is no control over what the user does with the credit/value.

d. Additional Product (User Selected): If the promotion does not allow a refund (or the vending machine is not capable of providing a refund), yet another alternative promotion settlement option is that the vending machine central coordinating unit 302 may transmit a free "vending signal" to the vending machine controller 304. From the user's perspective he would automatically receive the ability to get a free product (regardless of price). In this option, the user has control over what product he receives.

e. Additional Product (Predetermined): If the promotion does not allow a refund (or the vending machine is not capable of providing a refund), and the promotion is "buy #, get # free" (e.g. "buy 1 get 1 free"), yet another option is that the vending machine central coordinating unit 302 may transmit a "motor turn" signal (or other product release signal) to the vending machine controller 304. From the user's perspective he would automatically receive a predetermined promotional product (generally from that vending machine 300). In this option, the user has no control over what promotional product he receives. The user automatically gets the promotional product. The "free" product could be the same product ("buy a chipos and get one free"), or it could be another product ("buy a drinko energy drink and get a water free"), or it can even be a product from a different machine ("buy a chipos and get a drinko free.)

5. Follow-up: Information pertaining to the promotion may be used in a variety of ways and/or may have value in and of itself. As set forth, the vending machine central coordinating unit 302 preferably "logs" or records the honoring of the promotion and the details pertaining thereto so that the details pertaining to the promotion (the settlement redemption data 306) can be provided to the management technology controlling server 340 on a following sync (preferably the next sync, but alternatively any scheduled or requested sync). The vending machine central coordinating unit 302 may also "log" or record user specifics pertaining to the honoring of the promotion and the details pertaining thereto. This follow-up preferably includes the following exemplary steps.

a. The management technology controlling server 340 preferably transmits settlement redemption data 306 (received from the vending machine 300) to the promotion settlement server 370 (that may be associated with the management technology controlling server 340, associated with the promotion server 360, and/or a separate server as shown).

b. The promotion settlement server 370 transmits a confirmation of a promotion payment 372 (the actual promotion payment being a settlement) to the management technology controlling server 340 confirming that the appropriate party (e.g. the offeror of the promotion) has credited payment (settlement) to the appropriate party (e.g. the owner of the vending machine or the vending machine operating company). Confirmations of promotion payments 372 and/or the settlements themselves may be implemented individually or may be grouped together. Settlements may be made in the format of electronic payments. Settlements may be handled at the time of notification, may be paid periodically (e.g. daily, weekly, monthly), or after an appropriate amount of accumulation (e.g. after there are a certain number of promotions or after there is a predetermined amount due). Settlements may be substantially automatic or may require additional manual approval (at which point the confirmation of the promotion payment 372 will be sent). One result of this step (depending on the options set forth) could be that the vending machine operating company receives payment for settled promotions directly to its back account via EFT.

c. The management technology controlling server 340 may also transmit settlement redemption data 306 back to an appropriate database (the management technology database 350) to which the audit technology 320 syncs. The reason for this is that it allows the database to track the true value of the vending machine's sales since in most vending companies, commissions to locations and drivers are preferably paid from actual gross sales as logged in the database. This allows the database to know the actual value of the sale.

Multiple Price Levels

Described herein is an exemplary vending machine system that can display multiple price levels (e.g. a regular price and a discounted price) to users and a method for using a vending machine 300 that provides multiple price levels. Providing multiple price levels is a preferred optional feature that may be used alone or in combination with other features described herein. It should be noted that the multiple price level feature may be implemented using the structure shown and described in conjunction with FIG. 9 unless otherwise set forth herein.

From the user's perspective, he would see that there were multiple pricing levels. If the user were to select a particular product (e.g. "Winkie Dinkies") without regard to the discount, he would be prompted by the machine to pay the full amount ($1.50). If, however, the user wants to take advantage of the discount, he could either select the discount (active) and/or perform the specific action (passive) (depending on the capabilities of the vending machine 300 and/or the vending machine central coordinating unit 302). The user would then be prompted to pay the discounted amount or, alternatively, would be prompted to pay the full amount and then be refunded the discount (depending on the capabilities of the vending machine 300 and/or the vending machine central coordinating unit 302).

The multiple price level feature facilitates offering two or more different price levels for products in a vending machine 300. For example there may be a credit price, a cash price, and a separate price associated with a particular loyalty program. Using cash and credit as an example (although other payment mechanisms could be accommodated), depending on the implementation of the multiple price level feature the desires of the vending machine operating company, the cash price may be discounted as compared to the credit price (a candy bar is $0.95 if paid using a credit card, or $0.85 if paid with cash because of a cash discount in accordance with card associations rules). The discount may be, for example, a specified amount (e.g. $0.10) or it may be a percentage of the price of the product.

The multiple price level feature may be considered a type of promotional discount in which the discount is applied based on an action performed by the user or meeting a condition. Although actually different, performing "actions" or meeting "conditions" would be handled similarly and, therefore, examples using one or the other term may be assumed to include the omitted term and, unless specifically stated, the terms may be used interchangeably. Exemplary actions that may be performed to obtain the discounted price include, but are not limited to payment using a particular type of funds (e.g. cash/credit), the completion of a survey, the provision of an email address to which future promotions may be sent, the downloading of an application to a smart phone, the enrollment in a membership program or the confirmation of such a membership, the input of a promotion or coupon code, or any other predetermined action. The multiple price level feature may offer ongoing promotional discounts (e.g. the discounts are always available at a particular vending machine 300) or temporary or changing discounts (e.g. the discounts for one or more products changes based, for example, on factors such as inventory, time of day, and new offers). The discounts may be controlled by the promotion server 360 or by a similar server associated with the vending machine 300. The multiple price level feature may be implemented as an active discount or as a passive discount.

To implement the multiple price level feature, the vending machine 300 (or the central coordinating unit 302) may display on the user output technology 310*b* both the discounted (reflecting the promotional discount) and non-discounted (regular) simultaneously (or the user may be prompted to interact with the user interface 310 to see the discount). The vending machine 300 (or the central coordinating unit 302) preferably also displays on the user output technology 310*b* a required specified action. The non-discounted price, discounted price, and required specified action may be displayed simultaneously (e.g. in a table format such as shown and described herein) or separately with the discounted price and/or required specified action being displayed selectively, for example, upon user interaction with the user interface (e.g. the user pushing a "discounts available" button) or upon access of the vending machine by a "member" of a promotional discount club.

The discounted prices may be obtained by the vending machine central coordinating unit 302 as promotional discounts transmitted directly or indirectly from the promotion server 372 using appropriate signals to communicate the discounts. The transmitted promotional discounts may be provided in a singular format (e.g. an amount off or a percentage off) that can be used to calculate actual pricing of one or more discounted items or the transmitted promotional discounts may be in a multiple (or tabular format) that includes both the non-discounted price and the discounted price(s). Types of discounts may include flat discounts (e.g. $0.25 off Chipos), percentage discounts (e.g. 25% off Chipos), conditional discounts (e.g. $0.25 off Chipos when paying cash, or earn 25% off Chipos after completing a short survey), points or prizes (e.g. rewards points), products (e.g. a discount on a future product or free product dispensed upon purchase of a specified product, combination discounts (e.g. 10% off Chipos and an additional 10% when paying cash), or other types of discounts. The discounts may be static in that they always remain the same or the discounts may be dynamic in that they change based on factors including, but not limited to, promotions available, product demand, time, dates, locations, memberships, and the user involved in the transaction, or other factors.

Tables 6-8 show charts that might be presented to the user to show the multiple price levels and required specified action. Table 6 shows the discounts as percentages off the regular price being available if the user pays with cash. Table 7 shows the discounts as a fixed amount off the regular price being available if the user pays with a credit card (or other credit payment mechanism). Table 8 shows the flexibility of the multiple price level feature in that discounts may be available in a variety of formats and for a variety of desired actions or conditions.

TABLE 6

Promotional Discount Table (Based on Percentage)

| Inventory Data (product identifier) | Regular Price | Discount(s) Available | Cash Discounted Price |
|---|---|---|---|
| Veggie Snackeroos | $2.00 | 10% cash discount | $1.80 |
| Winkie Dinkies | $1.50 | 20% cash discount | $1.20 |
| Pretzels | $1.00 | 10% cash discount | $0.90 |
| Apples | $2.00 | 20% cash discount | $1.60 |

TABLE 7

Promotional Discount Table (Based on Fixed Amount)

| Inventory Data (product identifier) | Regular Price | Discount(s) Available | Credit Discounted Price |
|---|---|---|---|
| Veggie Snackeroos | $2.00 | $0.20 credit discount | $1.80 |
| Winkie Dinkies | $1.50 | $0.10 credit discount | $1.40 |
| Pretzels | $1.00 | $0.10 credit discount | $0.90 |
| Apples | $2.00 | $0.10 credit discount | $1.90 |

TABLE 8

Promotional Discount Table (Each Product Individually Discounted)

| Inventory Data (product identifier) | Regular Price | Discount(s) Available | Discounted Price |
|---|---|---|---|
| Veggie Snackeroos | $2.00 | 25% cash discount | $1.50 |
| Winkie Dinkies | $1.50 | N/A | $1.50 |
| Pretzels | $1.00 | $0.10 member discount | $0.90 |
| Apples | $2.00 | $0.50 discount on pretzels | $2.00 + $0.50 discount on pretzels |

For exemplary purposes only, the provision of multiple level pricing may be accomplished by a look-up table stored in memory (e.g. the database/memory unit 302*b*) that includes each product, a non-discounted (regular) price, a discounted price, and a condition bit (that may be, for example a 0 stored in memory that is replaced by a 1 if a signal is received that the condition has been met, although additional conditions would necessitate more than one condition bit or more than a simple 0/1 condition bit). The following pseudo code (which could also be stored in memory (e.g. the database/memory unit 302*b*) may be implemented by the processing unit 302*a* of the central coordinating unit 302 to implement a simple version in which, if cash is received, a $0.10 refund is returned to the user.

```
begin
  x=0000;  //Products are assigned numbers 0000 - 1111//
  y=0;     //Payment condition bit (y) is set to 0//
  user selection x=****; //Product selected, x = product number//
  receive payment signal;
    if payment signal = cash;
      then set y=1;
    endif;
  send signal to turn motor ****;  //The motor associated with
                                   product rotates and the product is
                                   released//
  if y=1;                          //Passive method - payment in
                                   cash is sufficient to trigger the
                                   discount//
    release $0.10 to coin return;
    send signal to report refund;
  endif;
end
```

The provision of a discount may then be accomplished, by the central coordinating unit 302 allowing the disbursement of the product when the user pays the discounted price (the regular price, less the discount). The provision of a discount may also be accomplished, for example, by having the user provide the full price of product and, in response, the vending machine central coordinating unit 302 may provide the discount in manners including, but not limited to those set forth herein (at least some of which are discussed in more detail in relation to promotional discounts):

1. Coin Refund: The vending machine central coordinating unit 302 transmits a coin return signal (e.g. "dispense $0.10") to a coin return mechanism (shown as change or refund technology 316*b*) to have the coin return mechanism dispense the promotional discount (e.g. the $0.10 refund). This could also be done virtually, for example, by returning fees (credit/refund) to a credit card or other payment mechanism.
2. Reward Points: The vending machine central coordinating unit 302 transmits (e.g. to a user's remote communication technology) a credit signal in dollar value or in point value that can be accumulated on a loyalty system (like a rewards points system associated with a membership in a loyalty program) instead of being paid out in cash or coins.
3. Additional Product (User Selected): The vending machine central coordinating unit 302 transmits (e.g. to a user's remote communication technology) a credit signal directly to the vending machine controller 304 that permits the user to select another product and either receive that product for free or at a discount, the credit already being applied to the purchase price.
4. Additional Product (Predetermined): The vending machine central coordinating unit 302 transmits a "motor turn" signal (or other release signal) to the vending machine controller 304 so that the user automatically receives a predetermined promotional product.

Information (including, for example, the product and the discount) about purchases made in which discounts were applied would be transmitted to the management technology 330. This may be done in conjunction with vending machine data 160 and/or in a format similar to the settlement redemption data 360. The settlement server 370, could perform an accounting function to make the necessary settlements for the benefit of the vending machine operating company, a credit card company (who is offering a discount if the user uses a credit card), or whatever entity benefits from the discount or has requested/initiated the promotion.

As mentioned, the multiple price level feature may be implemented by an active discount method (the user only receives the discount if he actively requests the discount and performs a specified action) or a passive discount method (the user automatically receives the discount when he performs a specified action).

Turning first to the active discount method, the user must actively request the discount in addition to performing a specified action. The prices displayed by the vending machine 300 may be displayed as multiple price levels (see Tables 6-8) or as only the non-discounted prices. If only the non-discounted prices are shown, the vending machine central coordinating unit 302 may provide the discounted prices in response to a request from the user. In order for a user to obtain the discount, however, the user must actively request/select it. For example, the user may use the user interface 310 (e.g. press a button or a touchscreen) to request his discount. A signal representing the request/selection of the discount (confirming the request for the discount) is transmitted to and received by the vending machine central coordinating unit 302. If the user then performs a specified action (e.g. pay with cash), a signal confirming the performance of the specified action is transmitted to and received by the vending machine central coordinating unit 302. Once the signals conforming the request and the performance are received by the vending machine central coordinating unit 302, the vending machine central coordinating unit 302 may log the discount (e.g. the $0.10 credit/discount) and/or transmit it directly or indirectly to the settlement server 370. The provision of a discount may then be accomplished by the central coordinating unit 302 allowing the disbursement of the product when the user pays the discounted price (the regular price, less the discount). The provision of a discount may also be accomplished, for example, by having the user provide the full price of product and, in response, the vending machine central coordinating unit 302 may provide the discount in manners including, but not limited to those manners discussed herein such as a coin refund, reward points, or additional product. The following pseudo code (which could also be stored in memory (e.g. the database/memory unit 302*b*) may be implemented by the processing unit 302*a* of the central coordinating unit 302 to implement a simple version in which, if cash is received, a $0.10 refund is returned to the user and the active mode is to be used.

```
begin
  x=0000;      //Products are assigned numbers 0000 - 1111//
  y=0;         //Payment condition bit (y) is set to 0//
  z=0;         //Active condition bit (z) is set to 0//
  user selection x=****; //Product selected, x = product number//
  wait;        //Wait for signals - also the beginning of a loop//
       check for active condition signal;
            if active condition signal is received; //User requests
                                                     discount//
                 then set z=1;
            endif;
       check for payment signal;
            if payment signal received and = cash;
                 then set y=1;
            else return to wait;      //Returns to wait for signal if
                                      payment has not been received//
            endif;
  endwait;
  send signal to turn motor ****;     //The motor associated with
                                      product rotates and the product is
                                      released//
  if y=1 and z=1;                     //This will only happen if both the
                                      user has actively requested the
                                      discount and has met the
                                      condition (paid in cash)//
                                      release $0.10 to coin return;
                                      send signal to report refund;
  endif;
end
```

In the passive discount method the user automatically receives the discount when he performs a predetermined specified action (e.g. paying using the appropriate payment method or completing a survey) or meets specified conditions (e.g. membership or $100^{th}$ customer). The discount is passive in that it does not need to be actively requested by the user. Instead, the user completes the specified action, a signal confirming the performance of the specified action is transmitted to and received by the vending machine central coordinating unit 302, and the discount is automatically applied without the user actively requesting the application of the discount. So when a user seeking a cash discount inputs cash into the payment receipt technology 316*a*, a signal is sent to the vending machine central coordinating unit 302 so that when the appropriate amount is reached, the vending machine central coordinating unit 302 triggers a signal to the vending machine controller 304 that, in turn, turns a motor (or otherwise releases the purchased product) to dispense the selected product. If the user does not seek the cash discount, he may use an alternative form of payment (e.g. using another type of payment technology such a credit card with a payment receipt technology 316*a* such as a credit card reader). In such a non-discount case, when enough funds are received from the alternative payment receipt technology 316*a*, the alternative payment receipt technology 316*a* sends a signal to the vending machine central coordinating unit 302 so that it is aware that the appropriate amount (the non-discounted amount) has been reached. The vending machine central coordinating unit 302 would trigger a signal to the vending machine controller 304 that, in turn, would turn the appropriate motor (or release mechanism) to dispense the selected product. Exemplary pseudo code has already been set forth herein.

Tracking, Time Stamping, and Record Keeping

Described herein is an exemplary vending machine system that has the ability to track, time stamp, and keep records of activity at a vending machine 300. Tracking, time stamping, and record keeping may be kept on activities such as displaying advertising, displaying nutritional information, and offering promotions on specific products, on products from specific manufacturers, or on a combination of products purchased. Tracking, time stamping, and record keeping is a preferred optional feature that may be used alone or in combination with other features described herein.

As discussed herein, the vending machine central coordinating unit 302 is capable of displaying advertising, displaying nutritional information, and offering promotions on specific products, on products from specific manufacturers, or on a combination of products purchased. A novel feature of the system described herein (and particularly the vending machine central coordinating unit 302 described herein or technology associated therewith) is the ability to track, time stamp, and keep records of activities including, for example:

1) When advertising was displayed.
2) When promotions were offered and/or redeemed.
3) When nutritional information was displayed, reviewed, and/or considered.
4) When products are purchased (that may be obtained using data acquired from the vending machine MDB interface).
5) Which consumer was engaged at a vending machine 300 if they have used a loyalty card or in any way provided their identification including, for example:
   a) Swiping a loyalty card.
   b) Swiping a payment card such as a credit card, debit card, or other cashless card.
   c) Texting message the "The Vending Machine."
   d) Typing in a loyalty code.
   e) Logging into the vending machine 300 with a user ID and password.
   f) Presenting a barcode image on smart phone to a camera or scanning technology on the vending machine 300 for scanning.

The vending machine central coordinating unit 302 or technology associated therewith is preferably able to time stamp (using the time from an internal or associated clock) all activity outlined herein. The vending machine central coordinating unit 302 or technology associated therewith is preferably also able to provide a single file detailing the activities (including time stamps). The single file can then be analyzed by back-end software to measure the effectiveness of advertising, promotions, nutritional information, and loyalty programs in influencing consumers' purchase decisions. This information may be specific to a particular vending machine 300 and/or group of vending machines. Many digital signage applications can suggest the number of impressions per day, week, or month, but the system described herein can actually measure impressions based on purchase activity at the vending machine 300.

One preferred vending machine central coordinating unit 302 monitors all promotional and advertising activity using an associated processing unit (e.g. processing unit 302*a*). Further, one preferred vending machine central coordinating unit 302 monitors all vending purchase activity at a vending machine 300 by monitoring the MDB bus (that is shown as the arrow between the vending machine controller 304 and the vending machine central coordinating unit 302 in FIG. 9B) for all sales activity (including cash or cashless) by column and price.

The actual product purchased can be determined either by the vending machine central coordinating unit 302 (if it has specific "planogram" data available—this shows which products are in each column/section of a vending machine 300), by a system associated with the management technology 330 and other systems described herein, or by a back-end "cloud-based" system that can correlate the data obtained from a third party system that can share which products were stored and sold in each column/row in a vending machine 300.

Exemplary components to which the vending machine central coordinating unit 302 may be associated for the purpose of tracking, time stamping, and record keeping are:

1. An associated clock for time stamping activity (not shown, but may be included in the vending machine central coordinating unit 302, a separate server associated with the vending machine central coordinating unit 302, or a unique server).
2. MDB in the vending machine(s) 300 (monitors all vending activity).
3. DEX in the vending machine(s) 300 (to collect all sales data in summarized form).
4. Data from an associated detector (e.g. camera or sensor) that indicates when a user is present and/or from programs designed to obtain the demographic profile of users (e.g. age, race, gender) even if the user was not identified via a membership program (loyalty engagement).
5. A planogram server (not shown, but may be included in the management technology controlling server 340, a separate server associated with the management technology controlling server 340, or a unique server) in Cloud over TCP/IP.
6. The promotion server 360 and/or the settlement server 370 in Cloud over TCP/IP.
7. Advertising data server 132' (e.g. as shown in FIG. 7 or incorporated into the promotion server 360) in Cloud over TCP/IP.
8. Nutritional facts data server 132 (e.g. as shown in FIG. 7) in Cloud over TCP/IP.
9. Cloud based media and analysis server (not shown, but may be included in the management technology controlling server 340, a separate server associated with the management technology controlling server 340, or a unique server) in Cloud over TCP/IP.

As noted, in systems in which the vending machine central coordinating unit 302 is the primary device in the vending machine 300 (and because such a central unit would manage connections), the vending machine central coordinating unit 302 can prepare a single file that itemizes the events that happen at a vending machine 300. This file can be used to determine the effectiveness of advertising, promotions, nutritional information, and loyalty programs in influencing consumers' purchase choices.

The following is a sample file showing the tracking, time stamping, and record keeping provided by a vending machine central coordinating unit 302 having this capability:

2010-01-03:12:59:03, Advertising displayed: "John's Chips.jpg"

2010-01-03:12:59:12, Customer loyalty login: User ID: "106846"

2010-01-03:12:59:20, Customer viewed promotion: User ID: "106846", product "John's Chips", promotion "17846"

2010-01-03:12:59:30, Customer viewed nutritional info: User ID: "106846", product "John's Chips", position: "Selection A1"

2010-01-03:12:59:45, Customer purchased product: User ID: "106846", product "John's Chips", promotion "17846", "Selection A1", "Price $1.25", Promotional Discount: "$0.25"

Back-end software can use this file (alone or in combination with other files from this vending machine 300 and/or other vending machines) to measure the effectiveness of advertising, promotions, nutritional information, and loyalty programs in influencing consumers' purchase decisions. The bank-end software could base its analysis on one or more degrees of granularity including by customer(s), vending machine(s), group(s) of vending machines (e.g. all the vending machines in a particular company's lunch room, vending machines at amusement parks, all the vending machines located on a particular driver's route), product(s) (e.g. chips, drinks, healthy snacks), manufacturer(s), advertising, and/or promotion(s). External information could also be provided to the software to provide meaningful analysis. Such exemplary external information may include weather, seasons (e.g. winter, summer), holidays, economic information (e.g. stock market positions), and any other meaningful information. Filters could be used to select a particular granularity. For example, using information from the file(s), it could be determined how many of a particular product (e.g. drinks) were purchased at a group of vending machines (e.g. vending machines at shopping malls) on weekends when a particular promotion (e.g. $0.25 refund) was used as compared with only the display of advertising. The results could be displayed numerically (e.g. as percentages) or graphically (e.g. as a bar graph or as a line chart showing purchases over time).

Unique User Interface Module

Described herein is an exemplary vending machine system with a unique user interface module 400 and a method for using a unique user interface module 400. A feature of the unique user interface module 400 is that it is automatically updated to include products in the vending machine 300 when the vending machine 300 is initially stocked (filled), as the vending machine 300 is re-stocked and/or serviced, and as product(s) has/have been purchased. In other words, the unique user interface module 400 is always kept current without human intervention. The unique user interface module 400 is a preferred optional feature that may be used alone or in combination with other features described herein. The unique user interface module 400 may be used in place of the user interface 310 described herein.

Figure 10A:
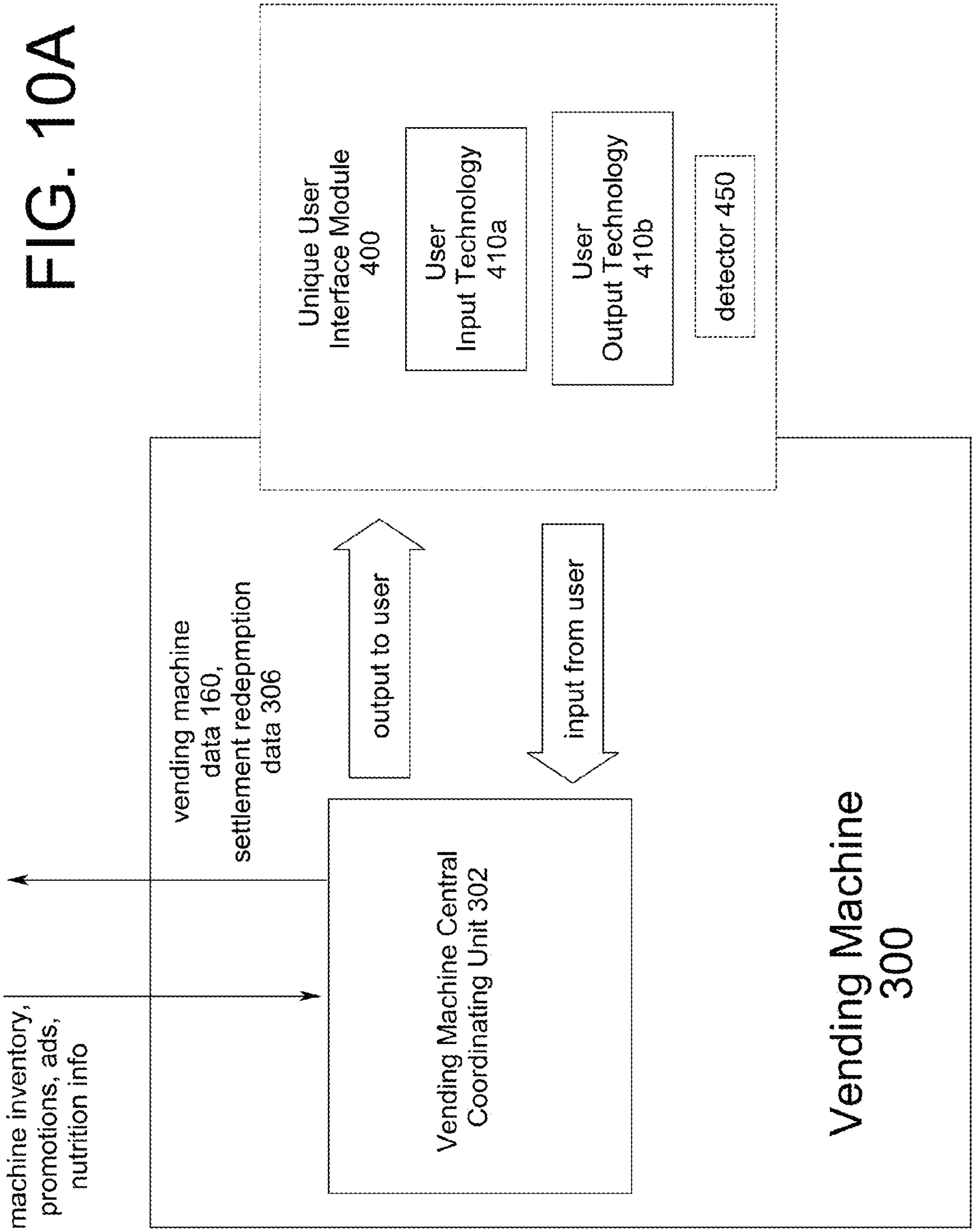
FIG. 10A is a simplified block diagram of an exemplary unique user interface module associated with a vending machine.

As shown in FIG. 10A, the unique user interface module 400 (that is associated with and in communication with the vending machine central coordinating unit 302 and may incorporate features such as the user input technology 310*a* and user output technology 310*b* of the user interface 310) displays nutrition information to vending machine users and accepts users' inputs through a user interface (e.g. user input technology such as a touchscreen display that functions as both user input technology 410*a* and user output technology 410*b*). The user can select a product of interest by touching displayed product images (or text). Using the unique user interface module 400, with as few as two touches, a user can purchase any product in the vending machine 300, view the nutrition information of any product in the vending machine 300, and/or report a problem with the vending machine 300. No physical buttons, stylus, or other implements are required for the user to operate the unique user interface module 400.

Figure 10B:
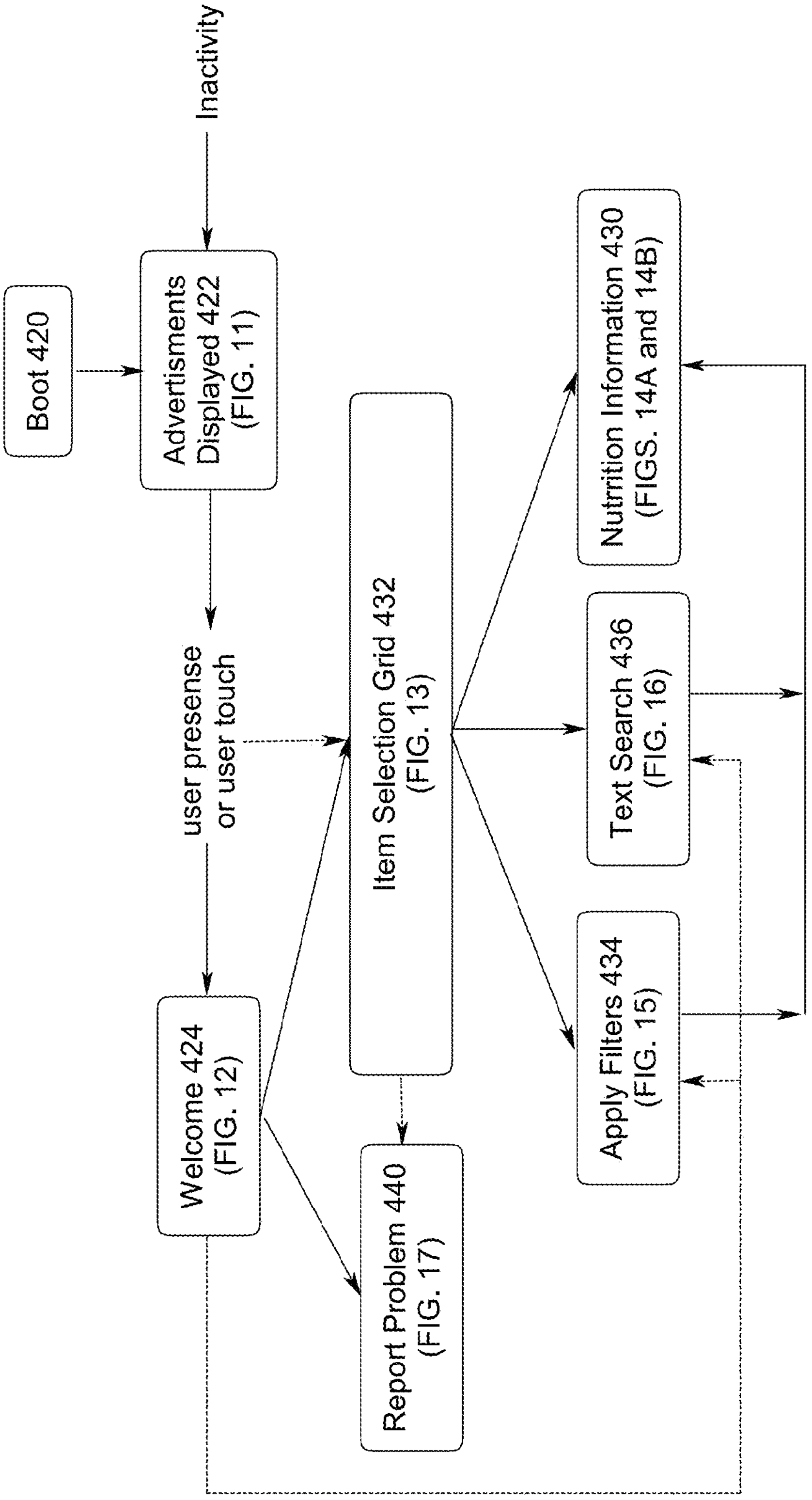
FIG. 10B is a simplified flow chart showing data flow for the exemplary unique user interface module.
Figure 11:
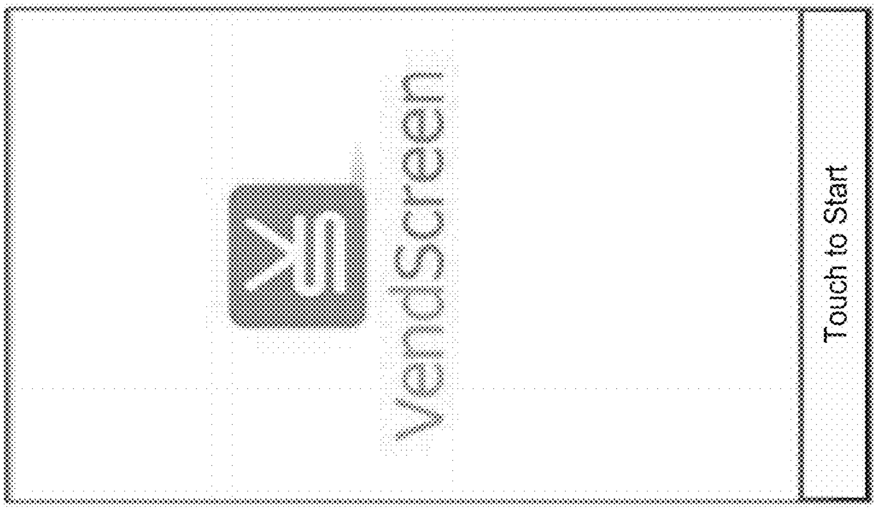
FIG. 11 is a screenshot showing a simplified exemplary idle screen.

As shown in FIG. 10B, there may be an initial "boot up" 420. Once booted up, the unique user interface module 400 preferably displays advertisements 422. FIG. 11 shows an exemplary advertisement screen, but it could include advertisements for any product and particularly for products in the vending machine 300. The display of advertisements may be the home or neutral state when the vending machine 300 is not in use. In other words, inactivity may cause the unique user interface module 400 to return to the display of advertisements 422.

Figure 12:
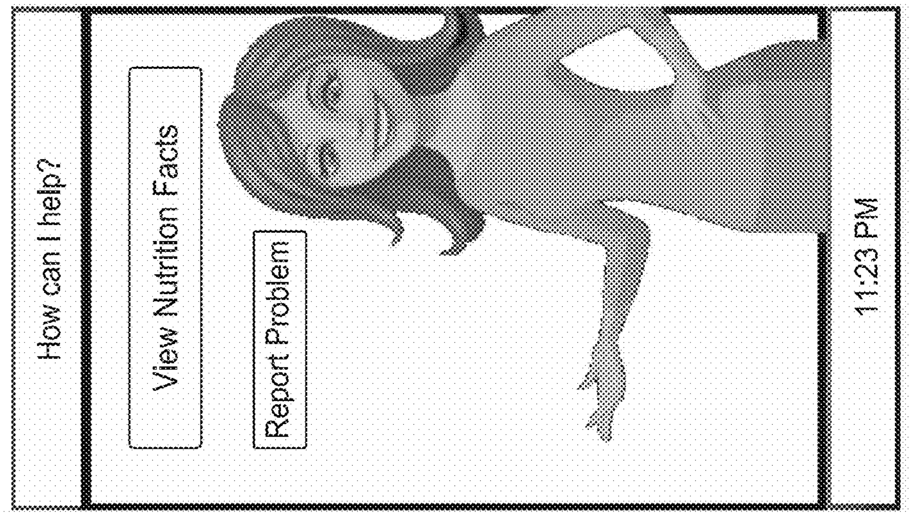
FIG. 12 is a screenshot showing a simplified exemplary welcome screen.

When activated either by a user touching the unique user interface module 400 or a user standing in front of the vending machine 300 for a defined period of time (determined, for example, by using an associated detector such as those described herein), the unique user interface module 400 automatically transitions to a welcome screen 424 such as that shown in FIG. 12. Preferably an optional known detector 450 (e.g. a motion detector, a light/dark detector, a camera, or some other sensor) may be used to determine the presence of a user. The detector may be associated with and in direct or indirect communication with the unique user interface module 400. From a welcome screen 424, the user can opt to explore product nutrition information 430 (FIG. 14A and FIG. 14B) using a grid search 432 (FIG. 13), a filter search 434 (FIG. 15), and/or a text search 436 (FIG. 16). The user may also report problems 440 (FIG. 17) with the vending machine 300 from the welcome screen 424. The welcome screen 424 also may include options for viewing promotions, purchasing products, and/or viewing advertisements.

Alternatively, the welcome screen 424 could be omitted. In such a case, the user's presence or user's touch would transition directly to a search screen (a grid search 432, a filter search 434, and/or a text search 436). This first screen might be the "main" search screen from which the user could transition to the other search screens using, for example, icons such as those shown at the bottom of FIG. 13.

After a user opts to view nutrition information from the welcome screen 424, the unique user interface module 400 may present the user with a grid view 432 of the products available in the vending machine 300. Alternatively, the user may select to search for product(s) using filters 434 or text searches 436 either from the welcome screen 424 (not shown) or from the grid view 432. The grid view is implemented as a series of rows, where each row is a scrollable image gallery and represents a shelf of products in the vending machine 300. Here the user can scroll each row to view the products on that row, and can drag the set of rows up or down for viewing of additional rows that may be off-screen. The user can also scroll each column to view the products on that column, and can drag the set of columns left or right for viewing of additional columns that may be off-screen. The user can also change/size the view so that all the rows/columns are shown. The "scrolling" may be accomplished using finger swipes, finger drags, scroll bars, arrows, and/or other scrolling means known or yet to be discovered/developed. The "sizing" may be accomplished using finger swipes, finger drags, menus, numerical options, and/or other scrolling means known or yet to be discovered/developed.

Using any of the product browse methods (e.g. the grid 432, the filter search 434, and/or the text search 436), the user can view the nutrition information 430 for a displayed product by tapping the product image. Within the nutrition information screen(s), the user can scroll up and down to view information that does not fully fit within the initial display. Alternatively, the nutrition information screen(s) can be scrollable and/or sizable.

Figure 14B:
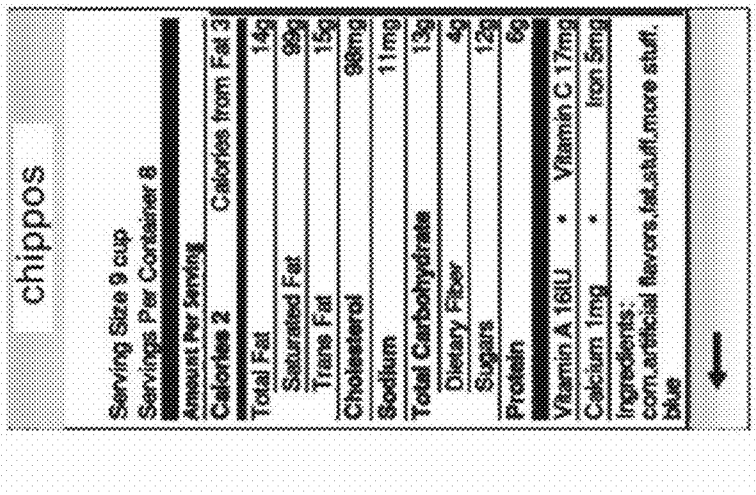
FIG. 14B is a screenshot showing a second part of a two part simplified exemplary nutrition information (facts and ingredients) screen.
Figure 14A:
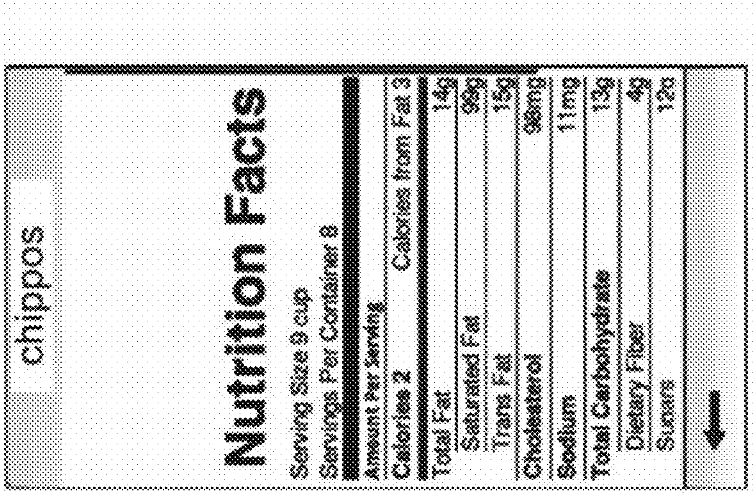
FIG. 14A is a screenshot showing a first part of a two part simplified exemplary nutrition information (facts and ingredients) screen.
Figure 15:
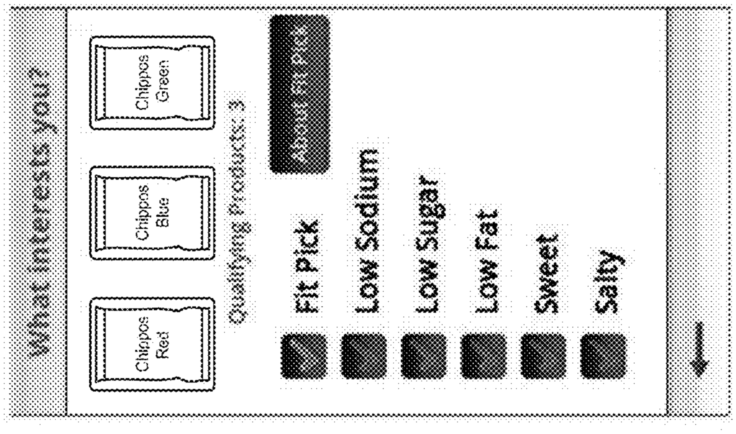
FIG. 15 is a screenshot showing a simplified exemplary filter screen.
Figure 16:
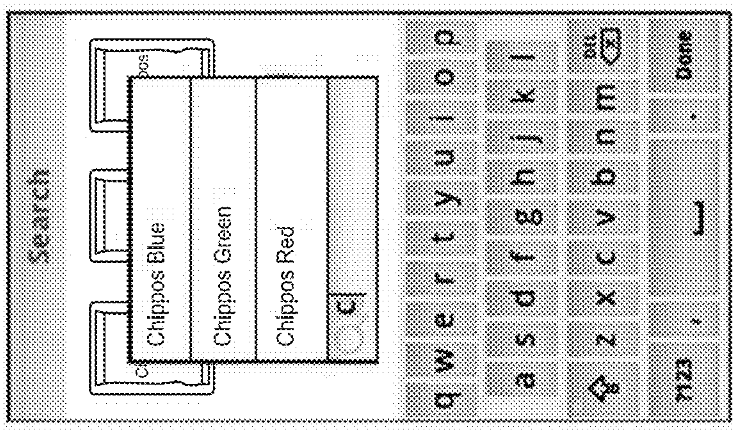
FIG. 16 is a screenshot showing a simplified exemplary search screen.

FIG. 15 shows an alternative screen that may be used for a filter browse method. Although this figure only shows filters directed to "fit pick," "low sodium," "low sugar," "low fat," "sweet," and "salty," other filters could be used (e.g. filters that related to calories, peanut allergies, vegetarian, energy, etc.). In this method, the user may select one or more filters that interest him. For example, he can select a "fit pick" that is also a salty snack. Submitting the filter search will result in either a list or a grid of images of products that meet the searcher's requirements. If no products meet the searcher's requirements, then alternatives can be provided. From the list or grid of products, the user can view the nutrition information for a displayed product by tapping the product name/image. Nutrition information screen(s), such as the exemplary screens shown in FIG. 14A and FIG. 14B, may then be displayed.

FIG. 16 shows an alternative screen that may be used for a text search browse method. In this method the user may use a text search for product names, product manufacturers, product types (e.g. drinks or snacks), key words, or other terms that interest him. For example, he can select a "chipos." Boolean searching may also be performed. Submitting the filter search will result in either a list or a grid of images of products that meet the searcher's requirements. If no products meet the searcher's requirements, then alternatives can be provided. From the list or grid of products, the user can view the nutrition information for a displayed product by tapping the product name/image. Nutrition information screen(s) such as shown in FIG. 14A and FIG. 14B may then be displayed.

Figure 17:
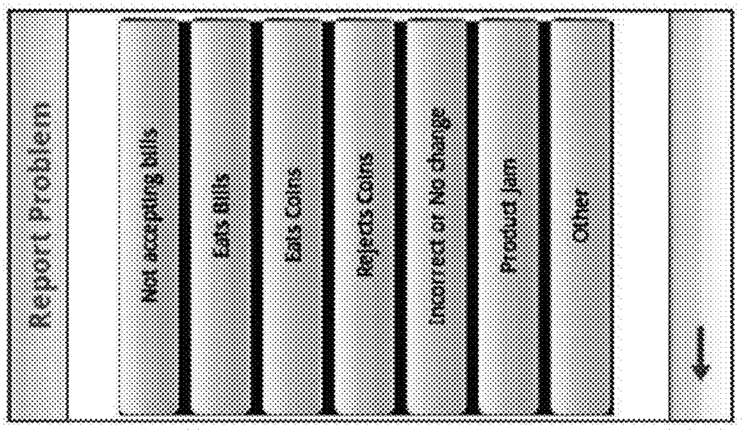
FIG. 17 is a screenshot showing a simplified exemplary report problem screen.

FIG. 17 shows a "report problem screen" that may be used by a user to report problems with the vending machine 300. The ability to report problems directly from the vending machine 300 is unique. The unique user interface module 400 may provide a plurality of options of problems that the user may be experiencing with the vending machine 300. Alternatively, the user could be provided with the ability to enter text (or that ability may be available from the "other" option). When the user submits the problem report at the report problem screen of the unique user interface module 400, the vending machine central coordinating unit 302 (or a component associated therewith) receives the information and transmits the submitted problem information (along with information pertaining to the vending machine 300, product, time, user, or other relevant information) to the management technology controlling server 340. This alerts the company that appropriate action (e.g. repairs, product replacement, or additional change) may need to be undertaken. Further, the submission of the report problem preferably initiates immediate customer resolution where possible. For example, if the vending machine 300 is eating coins or bills, an automatic refund may be provided at the vending machine 300. (This could be accomplished using technology similar to the promotion refunds discussed herein.) Using the ability to track, time stamp, and keep records of activity at a vending machine 300, the problem reports can also be logged. This gives the vending machine merchandiser the ability to deal appropriately with problematic vending machines, products, customers, or other recurring problems.

The following examples describe various preferred and exemplary features of the unique user interface module 400.

Figure 13:
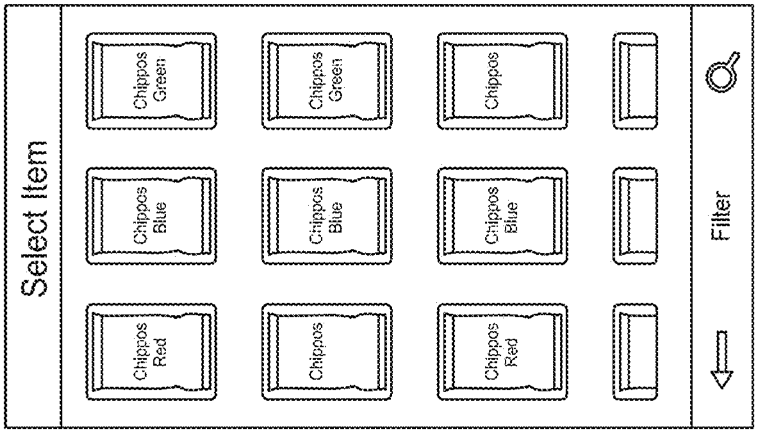
FIG. 13 is a screenshot showing a simplified exemplary select product grid screen.

1. Display of vending machine inventory products in a region of the user output technology 410*b* (e.g. the display screen) of unique user interface module 400 in a way that represents the products in a physical region of the vending machine 300.
   a. FIG. 13 shows a simplified version of the output technology 410*b* (e.g. the display screen) showing the products in a grid or as a "shelf" concept that presents the products within a shelf by a horizontal row on the output technology 410*b* (e.g. the display screen). The displayed "shelf" content spans the physical vending machine content from side-to-side and front-to-back of the vending machine 300.
      i. The displayed products represent stocking of the shelf products in physical positions from left to right, but because the products are preferably displayed in a continuous row in a way that the user can easily understand, the physically stocked products may be mixed left to right or front-to-back within the vending machine 300. This display method is intended to avoid user confusion when the physical position of the products in the vending machine 300 does not exactly match the display position of the products.
   b. Other methods may instead represent columnar (vertically oriented) regions of the vending machine 300 or other physical regions of the vending machine 300 such that the user can easily associate the physical region with the display representation of the unique user interface module 400.
   c. Other methods may represent each physical position of a product in the vending machine 300 with a corresponding product position on the display of the unique user interface module 400.
2. Method of browsing and selecting the products using touch actions.
   a. Rows are preferably horizontally scrollable with a drag or swipe action, to enable browsing of products available within a shelf, even if they span outside of the viewable screen area. The array of products viewed on the display is determined by user touch actions after entering the grid view, and may be a partial view of the total array of products that can be browsed.
   b. The horizontal scrolling of a row is continuous without stopping at the edge of the shelf contents; the content wraps around so that the user can view the products on the shelf by moving the row in one direction or the other.
      i. Alternatively, the edge of the shelf contents is demarcated with a visual break between product images, without halting scroll action at the demarcation.
      ii. Alternatively, the horizontal scrolling of a row stops at the right and left edge of the shelf contents.
   c. Individually scrollable horizontal rows, such that the products that align vertically in the physical vending machine 300 do not necessarily align on the display.
   d. The user can move between rows and beyond the displayed rows to explore the inventory products. To accomplish this, the user can (with a touch and drag action) vertically scroll the rows to bring off-screen rows into view.

e. For any product image currently viewed on the display, the user can view its nutrition information by touching the product image.

i. Alternatively, a user touch of the product image may lead to a set of options that may include viewing of product information or product-specific actions such as product purchase)

f. The user may also contract (to see more information) or expand (to see more detail) the display using methods known (e.g. pinch to zoom) or yet to be discovered/developed.

3. The user interface is scalable to vending machine configuration. Any number of shelves can be defined, and the design can accommodate vending machine configurations that have no physical shelf. For example a soda machine with a single column of physical selections shown in the vending machine 300 can be represented by a single row on the display.

4. Server-defined content allows customization of the display of the unique user interface module 400 to each vending machine 300 without modification of the unique user interface module 400 or software controlling the unique user interface module 400. The "server" may be the management technology controlling server 340 or a server associated therewith.

a. The selection grid is defined by the content of the server, with respect to:

i. The number of grid rows and/or columns.

ii. The number (quantity) of the products in each row and/or columns.

iii. The position of the products within each row and/or columns.

iv. The images that represent each product.

v. The labels of buttons or user prompts.

b. On the filter screen (not shown), the filter options and the displayed labels for the filter options are preferably defined by the content of the server.

5. The user can access nutrition information with simple touch action.

a. Preferably no instructions are required.

b. Minimal need for textual prompts.

c. Return from nutrition Info with a single tap anywhere on the screen, or by tapping the back-arrow button.

d. Can purchase the product directly from the nutritional information page (not shown).

6. An alternative method of browsing for nutrition information is moving a finger over a non-moving (but scrollable) grid of product thumbnail images, such that summary nutrition information for the touched product is provided on a portion of the display, and that summary information can be touched for expansion of product information.

Unique Vending Machine-to-Server Communications

Described herein is an exemplary vending machine system with unique vending machine-to-server communications and an apparatus for implementing unique vending machine-to-server communications. The vending machine-to-server communications is a preferred optional feature that may be used alone or in combination with other features described herein.

Figures 18, 18A:
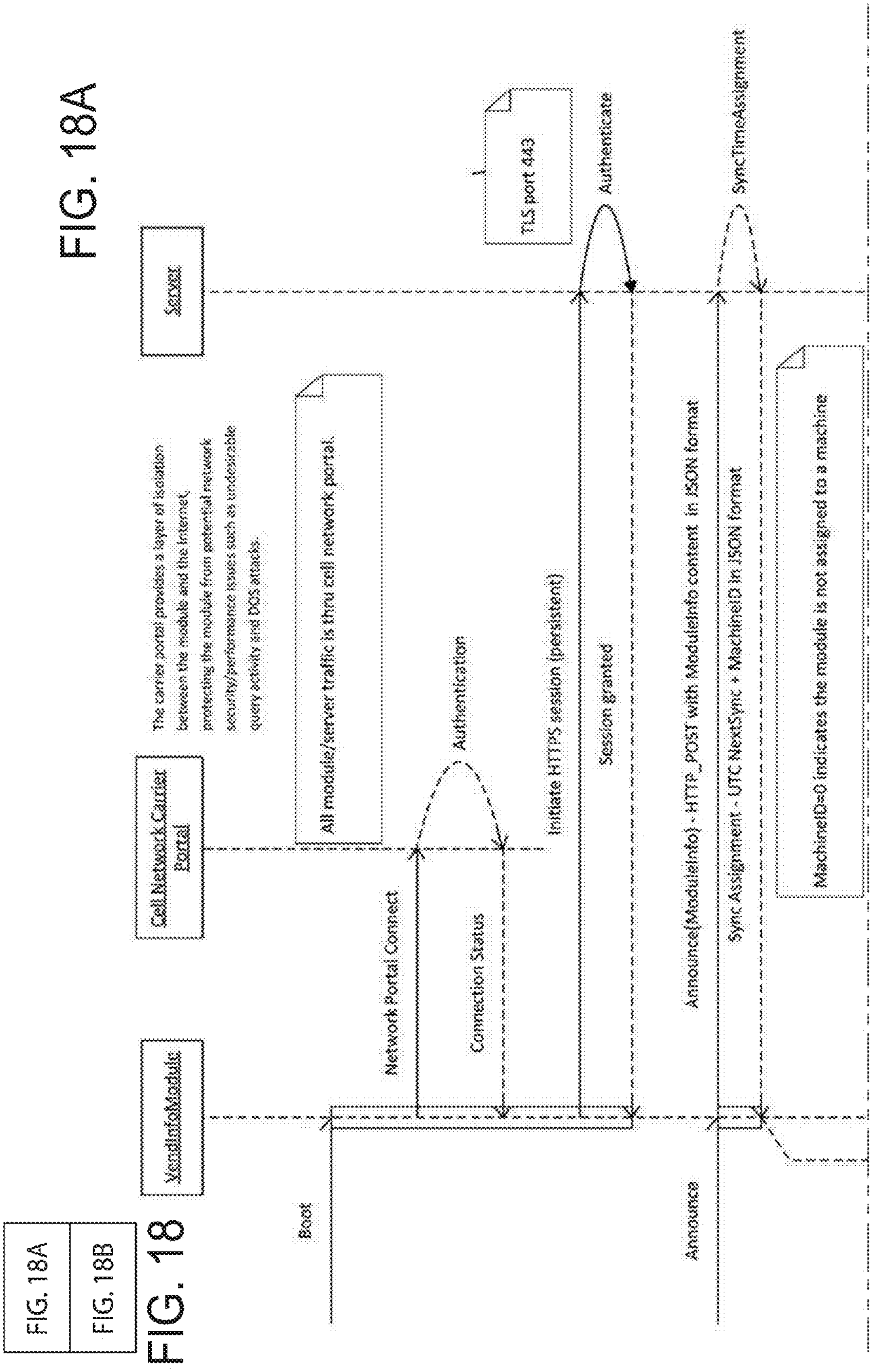
FIG. 18 is a graphical representation of the interaction of the unique user interface module and the server.
Figure 18B:
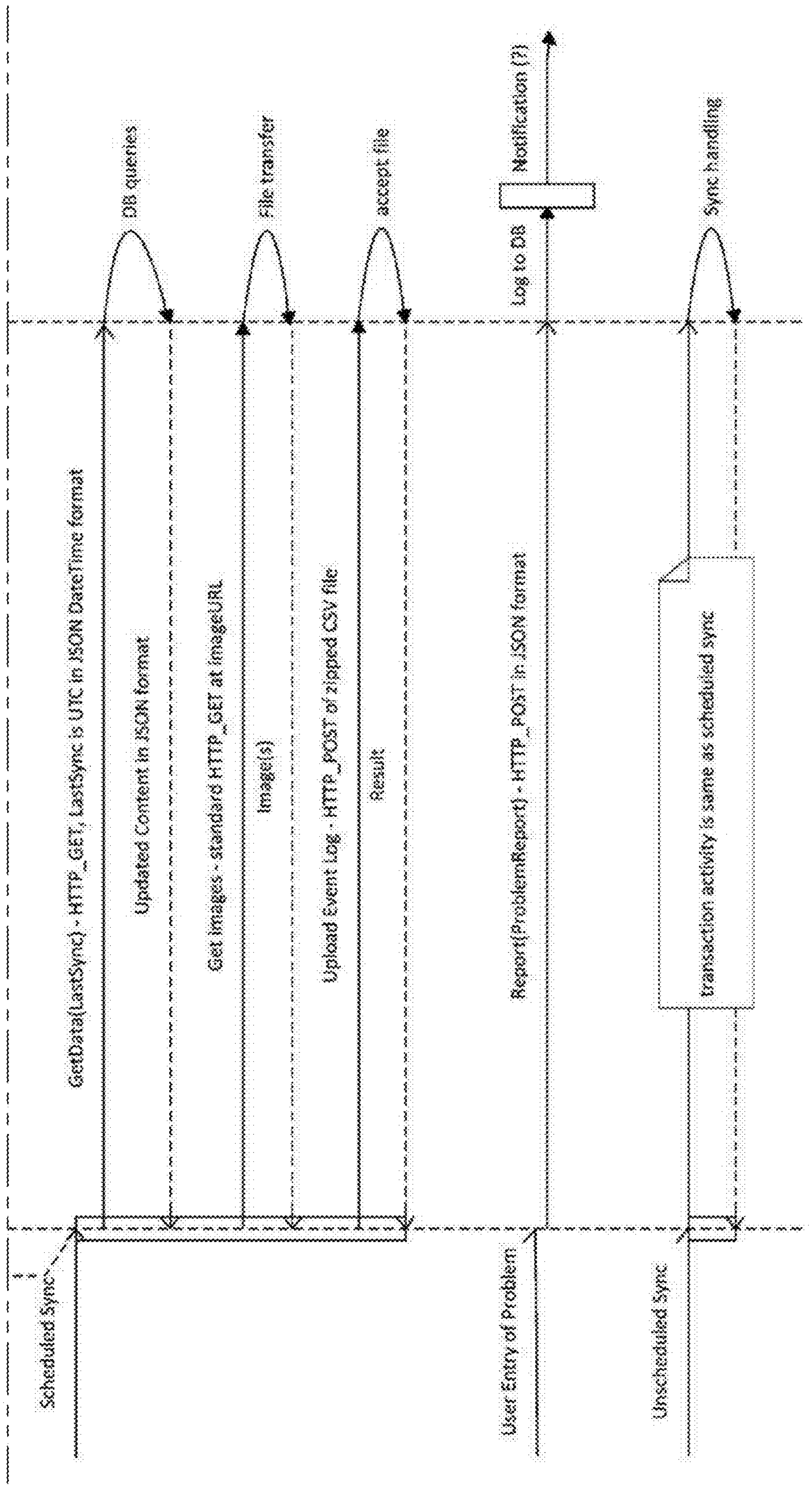

As shown in FIG. 18, the user interface 310 and/or the unique user interface module 400 (that is preferably associated with and/or in communication with the vending machine central coordinating unit 302) uses conventional web technologies to communicate with a web server (that is preferably associated with and/or in communication with the management technology controlling server 340) that hosts the product database (this may be the management technology database 350 shown in FIG. 9). The user interface 310 and/or the unique user interface module 400 preferably acts as a web client to the web server (and/or the management technology controlling server 340).

The following sections provide exemplary details of exemplary interactions of components of the system described herein. These details may be in addition to or as alternatives to those interactions described elsewhere herein.

A. Database Configuration

1. The system consists of central web server (management technology controlling server 340) and nutrition information modules installed in each of a number of vending machines. The nutrition information modules may be associated with and/or in communication with the vending machine central coordinating unit 302. (The nutritional information module may be a program stored in the database/memory unit 302*b* that controls functions of the processing unit 302*a* or the nutritional information module may be a stand-alone module.) The primary database (shown as the management technology database 350 in FIG. 9) is being associated with and/or in communication with the management technology controlling server 340. The primary database preferably stores nutrition information for products potentially stocked in any of the vending machines. Preferably, the primary database also stores the inventory information for each individual vending machine 300, including which products are nominally stocked in each slot of each vending machine 300.

2. The central server database may be based on a relational database management system such as MySQL™. Each nutrition information module (in each vending machine 300) may maintain a database for use with a local embedded relational management system such as a sqlLite™ database. This configuration allows a nutrition information module to provide vending machine users with information even when the server connection is temporarily down. It also minimizes data traffic with the server, as the nutrition information module needs to download the information only at startup or when re-syncing its local database with updated server data.

3. Although this discussion is focused on the communication between the nutrition information modules installed in each of a number of vending machines, similar communications may pertain to advertisement information modules and promotional information modules installed in each of a number of vending machines. The advertisement information modules may be associated with and/or in communication with the vending machine central coordinating unit 302. The advertisement information module may be a program stored in the database/memory unit 302*b* that controls functions of the processing unit 302*a* or the advertisement information module may be a stand-alone module. The promotional information modules may be associated with and/or in communication with the vending machine central coordinating unit 302. The promotional information module may be a program stored in the database/memory unit 302*b* that controls functions of the processing unit 302*a* or the promotional information module may be a stand-alone module. An important advantage of the vending machine system described herein is that it can continue to function offering nutritional information, promotions, and advertising even if an active connection to the management technology is unavailable.

B. Sync Process

1. Preferably there is local retention of inventory, nutritional information, advertisement information, and/or promotional information to minimize re-transmission of unchanging data content, and allow continued operation without a connection to the server (the management technology controlling server 340 or component associated therewith).
   a. This method offers minimal bandwidth demand for a network connection, which reduces operating cost.
   b. This method allows intermittent network connection without disruption of nutrition information module operation.
2. Periodic scheduled syncs with the server (the management technology controlling server 340 or component associated therewith), with flexible data sync timing. By assigning a sync time at the request of the nutrition information module, the server is able to control sync time on a module-by-module basis, even though module (or the vending machine central coordinating unit 302 associated therewith) initiates sync communication. The anticipated sync interval is once a day but can be any interval set from the server side. Alternatively, syncs may be requested by various components or entities at unscheduled times (e.g. upon the occurrence of a particular event).
3. The server (the management technology controlling server 340 or component associated therewith) has the logic to determine which information has changed since the previous module sync, and provides any new information to the nutrition information module at the each module sync, but does not transmit extra information that is already resident in the nutrition information module. It's important to note that each product in a vending machine 300 is time stamped, so only products changed since last sync will be updated.
4. The inventory is updated on a shelf-by-shelf basis. If inventory within a shelf changes, the new shelf inventory is downloaded at sync. This simplifies management of the module presentation to be on a row basis, and allows the server (the management technology controlling server 340 or component associated therewith) to transmit inventory updates only for the shelves that have changed content since the last sync. Updating on a shelf-by-shelf basis solves the problem where the quantity of the products in a shelf may vary from time to time depending on the number of products stocked at any particular time. For instance, while a shelf may have only 5 "slots," those five slots may contain 8 different products (because a couple products may be doubled up in the same slot). But as the products sell out (or are refilled), the quantity of the products in a slot and shelf may change. This system preferably detects any change on a shelf, and forces sync of just that shelf to ensure the products in shelf are displayed, and in an approximate order. In an alternate system, the update can be done in a slot-by-slot basis (i.e. individual products).
5. It is important to note that since available product and nutrition information is stored in a local database (e.g. a database stored in the database/memory unit 302*b*), when shelf-updates are performed, the update is efficient because it just references the unique product identifier. "Available product" is defined as product available at the warehouse, that is a subset of the universe of products available through distribution.

C. Server Connection: The nutrition information module (or the vending machine central coordinating unit 302 associated therewith) is preferably set up with the server URL, a user name, and a password. When the nutrition information module software starts, it will preferably establish cell communication to the carrier's internet portal, and then establish a network connection to the specified web server (the management technology controlling server 340 or component associated therewith). Each nutrition information module will preferably maintain a persistent secure web connection (HTTPS/SSL) with very low average data traffic per module.

D. Security: Appropriate security (e.g. TLS (Transport Layer Security), SSL (Secure Sockets Layer), and/or other types of security known or yet to be discovered/developed) is applied. For example, using TLS, the server (the management technology controlling server 340 or component associated therewith) holds a private certificate associated with a predetermined domain (e.g. the vsm2m.net domain).

E. Communication Method

1. Conventional web client protocols are preferably utilized for module/server communication. The nutrition information module will preferably obtain data from the server (the management technology controlling server 340 or component associated therewith) with the HTTP_GET method and transmit data to the server with the HTTP_PUT or HTTP_POST method. Although the sync communication is preferably client (module) initiated, alternatives include server initiated syncs and scheduled syncs.
2. Database data is converted to JSON for transmission between the nutrition information module (or the vending machine central coordinating unit 302 associated therewith) and server (the management technology controlling server 340 or component associated therewith). It is expected that conversion between SQL data and JSON is preferably performed by existing software libraries; e.g. PHP on the server side and Android on the module side.

F. Database Sync Process

1. The server database (e.g. the shown management technology database 350) content can be modified at any time. The nutrition information module maintains a copy of data in its local database, so to maintain equivalent database content, the nutrition information module will preferably periodically sync the databases by requesting new data from the server (the management technology controlling server 340 or component associated therewith). Because module/server communication may be via cell modem, it is preferably to minimize the amount of data transferred to the nutrition information module. The database sync requests are preferably infrequent and should initiate transfer of only a portion of data (not a full download of the database).
2. A time stamp attribute is applied to specific tables of product and inventory information. The time stamp provides a reference for the server software to determine which sections of the database have changed since the last sync with the nutrition information module.
3. The nutrition information module will preferably initiate the database sync process at startup and periodically or upon request thereafter, assuming a server connection is available. If a server connection is unavailable at the time of a scheduled sync, the nutrition information module will preferably retry periodically until the server (the management technology controlling server 340 or component associated therewith) is available.

G. Server Responsibility

1. The server (the management technology controlling server 340 or component associated therewith) is preferably responsible for selecting and formatting the data transmitted in response to a module-initiated sync request. The server preferably transmits only the data relevant to that nutrition information module, and preferably transmits only the recent data, based on a timestamp provided by the nutrition information module that was transmitted by the server at the time of the last sync.
2. The server determines "recent" data by comparing the "last sync" time stamp transmitted by the nutrition information module request against the time stamps of sections of data in the database. Each table and record that has content in the server is preferably time stamped when it is updated from any source. The nutrition information module only requests information that has changed since the provided time stamp that was provided by the server. For example, when changing inventory content of a vending machine 300, the server should update the inventory time stamp. During data sync the server provides URL references to images for ads and product searches. The nutrition information module downloads new images separately, preferably caches the images and assumes that each image is unique by URL. If the content of an image changes, the nutrition information module preferably will not update its cache unless the image URL changes. The server can accomplish an image update by renaming the file or moving it to a different path.

H. Scheduling of NextSync

1. The server (the management technology controlling server 340 or component associated therewith) is responsible for scheduling of periodic module sync. The server can also push information down to the nutrition information module using a cellular SMS "tickle" message or using standard TCP/IP or UDP protocols to communicate with the nutrition information module.
2. The server transmits the scheduled "NextSync" time in response to a nutrition information module "Announce" message. For a daily sync, this time is based on a time of day "Preferred Sync Time" stored in the Vending Machine data table.
3. There may be many nutrition information modules accessing the server, so it is advisable to store various "Preferred Sync Times" for modules to avoid having all modules requesting sync at the same time.

I. Module Responsibility: The nutrition information module is responsible for initiating data transfer requests, including the initial sync and subsequent scheduled syncs. The module is responsible for caching database content in its local database, and for downloading.

J. Full Download/Re-sync

1. The nutrition information module can initiate a full download of module-related database information by setting "last sync" time to zero in the data request. Exemplary conditions for the nutrition information module to request a full re-sync include:
   a. Initial installation of the nutrition information module.
   b. If the module detects a change in the MachineID.
   c. If it loses integrity of its local database.

K. Image Caching On The Nutrition Information Module

1. The module stores local copies of the images for URLs in the Product_Info table. Local caching of these images minimizes data transfer to the nutrition information module. It should be noted that if an image is updated on the server, but the same filename is used, the module preferably will not download the updated image. The filename preferably changes for the module to detect that it has to download the image. An alternative update process could determine if the image has changed by checking a predetermined value (e.g. the date/time stamp or a hash value).

L. Non-Stocked Products: A vending machine's inventory database tables may reference products that are not actually stocked in the vending machine 300. In that case these products are preferably placed in a separate nonexistent row of the vending machine 300, and that row can be identified with a label such as "Out of Stock" and/or "Available by Request." Preferably these products will then appear as such in the nutrition information module user's view. An option may be available on all vending machines 300 to view products not stocked on that vending machine on the vending machine's product, nutrition, and advertisement display technology **312*b***. A user selecting the non-stocked product would be notified of locations of other vending machines that stock the selected product.

M. Screen Format And Image Scaling—Preferred systems will have the ability to appropriately format and scale the display. The following disclosure pertaining to formatting and scaling is primarily for purposes of best mode and enablement and is not meant to be limiting.

1. An exemplary nutrition information module display may be designed to support, for example, a 4.3" 272×480 pixel display (low dpi, normal size), with interface defined to allow for other possible future screens. Two fields may inform the management technology controlling server 340 about the module display/screen.
   Module.scr_dpi: Screen density (dpi range) using Android guidelines, with possible settings shown in bold: Idpi (~120 dpi), mdpi (~160 dpi), hdpi (~240 dpi)
   Module.scr_size: Screen size using Android guidelines, with possible settings shown in bold: normal (3-4.5"), large (4-7")
2. The server (the management technology controlling server 340 or component associated therewith) can return images based on these settings, as indicated in FIG. 19. If the images do not exactly match the allocated dimensions, the module will preferably resize them for display.

Remote Issuance of Refund

Described herein is a vending machine 300 having the ability to remotely issue a refund to the user and a method for remotely issuing a refund at a vending machine 300. The ability to remotely issue a refund to the user is a preferred optional feature that may be used alone or in combination with other features described herein.

As an example, a remotely issued refund may be provided to the user at the vending machine 300 by the management technology sending signals (commands) to the vending machine to cause the change or refund technology **316*b* to release coins. Another example is that a remotely issued refund may be provided to the user at by the management technology sending signals (e.g. a text message with a generated coupon code) to the user (e.g. to the user's remote communication technology) so that the user may enter the coupon code at a user interface 310 of a vending machine 300**.

Figure 20:
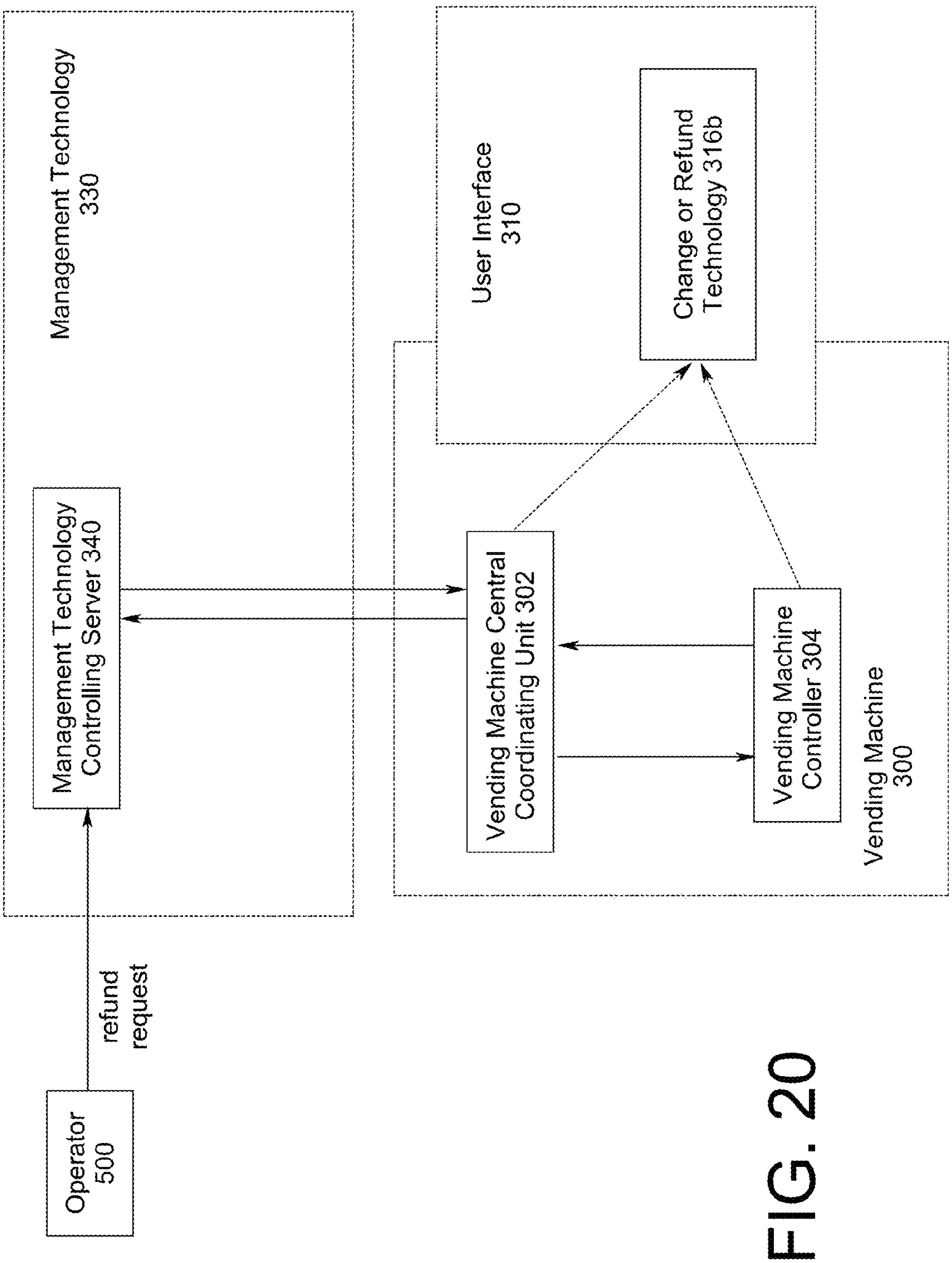
FIG. 20 is a simplified flow chart showing an exemplary remote credit/refund to machine flow.

FIG. 20 shows the flow of how a user could be able to request and receive a credit/refund at the vending machine 300. Further, this figure shows the flow of how a credit/refund can be remotely transmitted to the vending machine 300. If a user loses money in the vending machine 300 (ex: bill jam, product hung-up, etc.), the user can contact (e.g. using his remote communication technology) a number or a website listed on the vending machine 300 and give the machine ID to the operator 500 (that can be an automated operator 500). The operator 500 can then validate the user, and instantly transmit a credit/refund to the vending machine 300 so the user can either purchase another product, or optionally hit the coin return button to get a coin refund. The option to be able to get a coin refund is determined by the operator/company, not the user.

It should be noted that the user interface 310 and/or the unique user interface module 400 may have technology by which the user can contact the operator 500 (e.g. an automated operator 500 associated or in communication with the management technology controlling server 340) without the need for the user to use his own communication device. In such a case, the machine ID (that may be, for example, a static IP (VPN)) may be entered automatically. This process would also allow some remote diagnostics of the vending machine 300 to determine the veracity of the user's claim.

It should be noted that the vending machine central coordinating unit 302 (or a component associated therewith) may directly or indirectly (e.g. via the vending machine controller 304) provide the ability to issue a coin refund. For example, the vending machine central coordinating unit 302 (or a component associated therewith) may transmit a signal (using, for example, MDB) to a change or refund technology **316*b* (e.g. a coin return mechanism) to have the change or refund technology 316*b*** dispense the refund.

The operator 500 may be interfacing with the management technology 330 (or a component such as the management technology controlling server 340 associated or in communication with the management technology 330) that is remote from the vending machine 300. The management technology 330, in turn, interfaces with the vending machine central coordinating unit 302 (or a component associated or in communication therewith).

Comparison to Existing Technology

It should be noted that the vending machine nutritional information display system described herein primarily uses standard inventory control system components such as vending machines 100, vending machine audit technology 120, and management technology 140 as well as common or standard vending machine protocols.

Existing systems maintain product and inventory data with the use of audit technology that synchronizes the vending machine data with an inventory database at a vending service company's management site (e.g. the distribution center). The audit technology can synchronize the vending machine data through a cradle physically connected to the network at the operator's office or wirelessly from the field. These databases typically maintain a list of all products stocked in each vending machine (inventory data for each vending machine) along with the location within the machine and quantity (ex: 5 quantity Brand X Peanuts 1.75 oz package in column E6).

The Reade reference is directed to an RFID system and method for vending machine control. The Reade method and system seeks to aid consumers in making informed decisions prior to purchasing products from a vending. The Reade reference further discloses that product information may be visually displayed on a visual display screen. The Reade reference, it should be noted, requires that the products in the machine be associated with an added smart tag or label that contains information regarding the product that may be of interest to a consumer prior to purchasing the product. A smart tag scanner is incorporated with the dispensing machine and used to retrieve the product information from the smart tags.

As compared to the system described herein, the Reade system's use of smart tags requires significantly more work. In the Reade system, the smart tags must be programmed and/or provided to the merchandiser that would require a change in the industry or additional work for the merchandiser or the vending service company. The system described herein makes absolutely no changes to the process currently used by most merchandisers and/or vending service companies. In the Reade system, the appropriate smart tags must be attached to each individual product or placed at each column of a vending machine (and moved or replaced if the product arrangement changes or if the products being stocked changes). Again, the system described herein avoids this extra work and makes absolutely no changes to the process currently used by most merchandisers and/or vending service companies. In the Reade system, the smart tags would have to be removed and replaced if the product information contained thereon changes. Again, the system described herein avoids this extra work and makes absolutely no changes to the process currently used by most merchandisers and/or vending service companies. In the Reade system, the additional programming, attachment of smart tags, placement of smart tags, and removal or replacement of smart tags all introduce steps where errors can occur (e.g. errors in programming of smart tag, errors in attaching the wrong smart tag to a product, errors in forgetting to transfer the smart tag based on product changes, etc.) Because the system described herein eliminates these added steps, it is more accurate. It eliminates many steps in which the errors occur because it is more automatic and requires little interaction by the merchandiser. Further, the Reade system would require significant additional technology such as a smart tag scanner.

Supplemental Information

Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "associated" is defined to mean integral or original, retrofitted, attached, or positioned near. For example, if a display 104 (or other component) is associated with a vending machine (or other technology), the display may be an original display built into the vending machine 100, a display that has been retrofitted into the vending machine 100, an attached display that is attached to the vending machine 100, and/or a nearby display that is positioned near the vending machine 100. In some cases, an associated device is the device itself or part of the device. The term "associated" may also mean functionally associated such that two components are able to work together. For example, a program may be associated with the component(s) it controls. Another example is that if a first component transmits a signal to a second component, the two components can be said to be associated because they can function together.

The processing unit, server, controller, processor, and computer may be implemented using a general purpose processor (e.g. microprocessor, controller, microcontroller, or state machine), a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein.

The terms "provide" and "providing" (and variations thereof) are meant to include standard means of provision including "transmit" and "transmitting," but can also be used for non-traditional provisions as long as the data is "received" (that can also mean obtained). The terms "transmit" and "transmitting" (and variations thereof) are meant to include standard means of transmission, but can also be used for non-traditional transmissions as long as the data is "sent." The terms "receive" and "receiving" (and variations thereof) are meant to include standard means of reception, but can also be used for non-traditional methods of obtaining as long as the data is "obtained."

Unless specifically stated otherwise, the terms "first," "second," and "third" are meant solely for purposes of designation and not for order or limitation. For example, the "first preferred exemplary vending machine nutritional information display system" has no order relationship with the "second preferred exemplary vending machine nutritional information display system."

It should be noted that the terms "may," "might," "can," and "could" are used to indicate alternatives and optional features and only should be construed as a limitation if specifically included in the claims. For example, the phrase "the exemplary display 124 might be a liquid crystal display (LCD) display" indicates that the display could be an alternative type of display. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessary mean the best or most desired of the type. For example, a "preferred exemplary feature" is just one example of that feature, but another feature could be just as desirable.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B). It should be noted that, unless otherwise specified, the singular forms "a," "an," and "the" refer to one or more than one, unless the context clearly dictates otherwise.

It is to be understood that the inventions, examples, and embodiments described herein are to be considered preferred inventions, examples, and embodiments whether specifically identified as such or not.

It is to be further understood that the inventions, examples, and embodiments described herein are not limited to particularly exemplified materials, methods, and/or structures.

It is to be still further understood that all publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. An apparatus associated with a vending machine, and comprising a processor and a memory storing executable instructions that in response to execution by the processor cause the apparatus to at least:

transmit vending machine data uploaded to management technology using standard vending machine protocol, the vending machine data including inventory data listing products stocked in or sold by the vending machine, and at least one of inventory level information indicating an amount of the products listed in the inventory data, or fund data indicating an amount of funds received by the vending machine, the vending machine data being transmitted for storage in an inventory database with machine data from other vending machines to permit the management technology to perform one or more management operations for the respective vending machines using the vending machine data, the one or more management operations including at least one of determining vending machine routing needs, determining profitability, managing cash flow or managing inventory, and the management technology being configured to transmit inventory data from the inventory database to a separate promotion server, and in response thereto, receive one or more promotions applicable to one or more products listed in the inventory data;

receive the promotions from the management technology in a communication separate from the upload of the vending machine data; and direct a user interface of the vending machine to display one or more of the promotions to a user at the vending machine, the vending machine data being transmitted to the management technology, and the promotions being received from the management technology, before and independent of the one or more of the promotions being displayed to the user.

2. The apparatus of claim 1, wherein the memory stores further executable instructions that in response to execution by the processor cause the apparatus to further:

receive a response pertaining to a particular promotion of the one or more of the promotions displayed to the user;

apply the particular promotion in an instance in which the response indicates acceptance of the particular promotion, and a particular product to which the particular promotion is applicable is purchased from the vending machine;

and with the response or separate selection of the particular product, direct the vending machine to dispense the particular product.

3. The apparatus of claim 2, wherein the particular promotion includes a required specified action, the memory storing further executable instructions that in response to execution by the processor cause the apparatus to further:

direct the user interface to display a non-discounted price, a discounted price reflecting the particular promotion, and the required specified action, wherein the apparatus being caused to receive the response includes being caused to receive confirmation of performance of the required specified action, the confirmation indicating acceptance of the particular promotion.

4. The apparatus of claim 2, wherein the memory stores further executable instructions that in response to execution by the processor cause the apparatus to further:

communicate settlement redemption data pertaining to application of the particular promotion to a settlement server remote from the apparatus.

5. The apparatus of claim 2, wherein the memory stores further executable instructions that in response to execution by the processor cause the apparatus to further:

direct the user interface to display a non-discounted price, a discounted price reflecting the particular promotion, and a required specified action, wherein the apparatus being caused to receive the response includes being caused to receive confirmation of performance of the required specified action without a separate request for the particular promotion, the confirmation indicating acceptance of the particular promotion.

6. The apparatus of claim 2, wherein the memory stores further executable instructions that in response to execution by the processor cause the apparatus to further:

direct the user interface to display a non-discounted price, a discounted price reflecting the particular promotion, and a required specified action, wherein the apparatus being caused to receive the response includes being caused to receive confirmation of performance of the required specified action and a separate request for the particular promotion, the confirmation and request indicating acceptance of the particular promotion.

7. The apparatus of claim 2, wherein the memory stores further executable instructions that in response to execution by the processor cause the apparatus to further:

receive confirmation of payment of a non-discounted price of the particular product before the vending machine is directed to dispense the particular product, and wherein the apparatus being caused to apply the particular promotion includes being caused to direct the vending machine to provide a refund in an amount of the particular promotion.

8. The apparatus of claim 2, wherein the apparatus being caused to apply the particular promotion includes being caused to direct the vending machine to provide a credit in an amount of the particular promotion for purchase of another product from the vending machine, or direct the vending machine to provide another product from the vending machine without payment.

9. The apparatus of claim 2, wherein the apparatus being caused to apply the particular promotion includes being caused to direct the vending machine to provide a value to an accumulated loyalty system in an amount of the particular promotion.

10. The apparatus of claim 1, wherein the management technology is further configured to transmit inventory data from the inventory database to a separate nutrition server, and in response thereto, receive nutrition data for products listed in the inventory data, and merge the vending machine data with the nutrition data to obtain merged data, the merged data including at least the inventory data and the nutrition data, and wherein the memory stores further executable instructions that in response to execution by the processor cause the apparatus to further:

receive the merged data from the management technology in a communication separate from the upload of the vending machine data; and direct the user interface to display of the nutrition data in response to user selection of products at the vending machine, the vending machine data being transmitted and merged with the nutrition data, and the merged data being received from the management technology, before and independent of the user selection.

11. A method comprising:

transmitting vending machine data uploaded to management technology using standard vending machine protocol, the vending machine data including inventory data listing products stocked in or sold by a vending machine, and at least one of inventory level information indicating an amount of the products listed in the inventory data, or fund data indicating an amount of funds received by the vending machine, the vending machine data being transmitted for storage in an inventory database with machine data from other vending machines to permit the management technology to perform one or more management operations for the respective vending machines using the vending machine data, the one or more management operations including at least one of determining vending machine routing needs, determining profitability, managing cash flow or managing inventory, and the management technology being configured to transmit inventory data from the inventory database to a separate promotion server, and in response thereto, receive one or more promotions applicable to one or more products listed in the inventory data;

receiving the promotions from the management technology in a communication separate from the upload of the vending machine data; and directing a user interface of the vending machine to display one or more of the promotions to a user at the vending machine, the vending machine data being transmitted to the management technology, and the promotions being received from the management technology, before and independent of the one or more of the promotions being displayed to the user, wherein the transmitting, receiving and directing are performed by an apparatus associated with the vending machine, and comprising a processor and a memory storing executable instructions that in response to execution by the processor cause the apparatus to perform the transmitting, receiving and directing.

12. The method of claim 11 further comprising:

receiving a response pertaining to a particular promotion of the one or more of the promotions displayed to the user;

applying the particular promotion in an instance in which the response indicates acceptance of the particular promotion, and a particular product to which the particular promotion is applicable is purchased from the vending machine; and with the response or separate selection of the particular product, directing the vending machine to dispense the particular product.

13. The method of claim 12, wherein the particular promotion includes a required specified action, the method further comprising:

directing the user interface to display a non-discounted price, a discounted price reflecting the particular promotion, and the required specified action, wherein receiving the response includes receiving confirmation of performance of the required specified action, the confirmation indicating acceptance of the particular promotion.

14. The method of claim 12 further comprising:

communicating settlement redemption data pertaining to application of the particular promotion to a settlement server remote from the apparatus.

15. The method of claim 12 further comprising:

directing the user interface to display a non-discounted price, a discounted price reflecting the particular promotion, and a required specified action, wherein receiving the response includes receiving confirmation of performance of the required specified action without a separate request for the particular promotion, the confirmation indicating acceptance of the particular promotion.

16. The method of claim 12 further comprising:

directing the user interface to display a non-discounted price, a discounted price reflecting the particular promotion, and a required specified action, wherein receiving the response includes receiving confirmation of performance of the required specified action and a separate request for the particular promotion, the confirmation and request indicating acceptance of the particular promotion.

17. The method of claim 12 further comprising:

receiving confirmation of payment of a non-discounted price of the particular product before the vending machine is directed to dispense the particular product, and wherein applying the particular promotion includes directing the vending machine to provide a refund in an amount of the particular promotion.

18. The method of claim 12, wherein applying the particular promotion includes directing the vending machine to provide a credit in an amount of the particular promotion for purchase of another product from the vending machine, or directing the vending machine to provide another product from the vending machine without payment.

19. The method of claim 12, wherein applying the particular promotion includes directing the vending machine to provide a value to an accumulated loyalty system in an amount of the particular promotion.

20. The apparatus of claim 11, wherein the management technology is further configured to transmit inventory data from the inventory database to a separate nutrition server, and in response thereto, receive nutrition data for products listed in the inventory data, and merge the vending machine data with the nutrition data to obtain merged data, the merged data including at least the inventory data and the nutrition data, and wherein the method further comprises:

receiving the merged data from the management technology in a communication separate from the upload of the vending machine data; and directing the user interface to display of the nutrition data in response to user selection of products at the vending machine, the vending machine data being transmitted and merged with the nutrition data, and the merged data being received from the management technology, before and independent of the user selection.

* * * * *